(12) United States Patent
Shiba et al.

(10) Patent No.: US 10,633,470 B2
(45) Date of Patent: Apr. 28, 2020

(54) METHOD OF PRODUCING A CONJUGATED DIENE POLYMER, A MODIFIED CONJUGATED DIENE POLYMER, AND A VINYL CIS-POLYBUTADIENE COMPOSITION

(71) Applicant: Ube Industries, Ltd., Ube-shi (JP)

(72) Inventors: Koji Shiba, Ichihara (JP); Masato Murakami, Ichihara (JP); Michinori Suzuki, Ichihara (JP); Naomi Okamoto, Ichihara (JP); Mitsuharu Anbe, Ichihara (JP); Masahiro Tanaka, Ichihara (JP)

(73) Assignee: Ube Industries, Ltd., Ube-shi (JP)

( * ) Notice: Subject to any disclaimer, the term of this patent is extended or adjusted under 35 U.S.C. 154(b) by 0 days.

(21) Appl. No.: 16/403,880

(22) Filed: May 6, 2019

(65) Prior Publication Data

US 2019/0256628 A1  Aug. 22, 2019

Related U.S. Application Data

(60) Continuation of application No. 15/801,872, filed on Nov. 2, 2017, now Pat. No. 10,508,163, which is a
(Continued)

(30) Foreign Application Priority Data

Mar. 13, 2013 (JP) ................................ 2013-049885
Mar. 28, 2013 (JP) ................................ 2013-067979
(Continued)

(51) Int. Cl.
C08F 136/06 (2006.01)
C08F 36/06 (2006.01)
C08F 36/04 (2006.01)
C08F 8/00 (2006.01)
C08K 3/36 (2006.01)
C08C 19/12 (2006.01)

(52) U.S. Cl.
CPC .............. *C08F 136/06* (2013.01); *B60C 1/00* (2013.01); *C08C 19/12* (2013.01); *C08C 19/22* (2013.01);
(Continued)

(58) Field of Classification Search
CPC ........... C08F 136/06; C08F 36/04; C08F 8/00
See application file for complete search history.

(56) References Cited

U.S. PATENT DOCUMENTS

2009/0105401 A1  4/2009  Suzuki et al.
2009/0292043 A1  11/2009  Kurazumi et al.
(Continued)

FOREIGN PATENT DOCUMENTS

EP   1086957 A1   3/2001
EP   1647571 A1   4/2006
(Continued)

*Primary Examiner* — Catherine S Branch
(74) *Attorney, Agent, or Firm* — The Webb Law Firm

(57) ABSTRACT

A method for producing a conjugated diene polymer having a high content of cis-1,4-structures with a high activity, a conjugated diene polymer, and a modified conjugated diene polymer. The catalyst for conjugated diene polymerization in the method includes: a non-metallocene type gadolinium compound (A) represented by the general formula (1); an ionic compound (B) formed of a non-coordinating anion and a cation; and an organic metal compound (C) of an element selected from the group consisting of a group 2, a group 12, and a group 13 of the periodic table.

24 Claims, 1 Drawing Sheet

Related U.S. Application Data division of application No. 14/775,961, filed as application No. PCT/JP2014/056779 on Mar. 13, 2014, now abandoned.

(30) Foreign Application Priority Data

| | | | |
|---|---|---|---|
| Jun. 21, 2013 | (JP) | ................................ | 2013-130224 |
| Jun. 21, 2013 | (JP) | ................................ | 2013-130228 |
| Dec. 25, 2013 | (JP) | ................................ | 2013-266700 |
| Dec. 25, 2013 | (JP) | ................................ | 2013-266704 |
| Jan. 24, 2014 | (JP) | ................................ | 2014-011567 |
| Jan. 24, 2014 | (JP) | ................................ | 2014-011576 |
| Jan. 24, 2014 | (JP) | ................................ | 2014-011577 |

(51) Int. Cl.
*C08C 19/22* (2006.01)
*B60C 1/00* (2006.01)
*C08F 4/54* (2006.01)
*C08K 3/04* (2006.01)
*C08L 47/00* (2006.01)

(52) U.S. Cl.
CPC ................ *C08F 4/54* (2013.01); *C08F 8/00* (2013.01); *C08F 36/04* (2013.01); *C08F 36/06* (2013.01); *C08K 3/04* (2013.01); *C08K 3/36* (2013.01); *C08L 47/00* (2013.01); *C08K 3/045* (2017.05)

(56) References Cited

U.S. PATENT DOCUMENTS

| | | |
|---|---|---|
| 2011/0269899 A1 | 11/2011 | Murakami et al. |
| 2014/0296376 A1 | 10/2014 | Sato et al. |

FOREIGN PATENT DOCUMENTS

| | | |
|---|---|---|
| JP | 4917666 B | 5/1974 |
| JP | 4917667 B | 5/1974 |
| JP | 5440890 A | 3/1979 |
| JP | 581709 A | 1/1983 |
| JP | 6023406 A | 2/1985 |
| JP | 631324 B2 | 1/1988 |
| JP | 6451404 A | 2/1989 |
| JP | 1230647 A | 9/1989 |
| JP | 7112989 A | 5/1995 |
| JP | 7268013 A | 10/1995 |
| JP | 1180222 A | 3/1999 |
| JP | 200044633 A | 2/2000 |
| JP | 200086719 A | 3/2000 |
| JP | 2001139634 A | 5/2001 |
| JP | 200427179 A | 1/2004 |
| JP | 2004238637 A | 8/2004 |
| JP | 2004346220 A | 12/2004 |
| JP | 200763240 A | 3/2007 |
| JP | 2007161799 A | 6/2007 |
| JP | 2007161921 A | 6/2007 |
| JP | 2007230266 A | 9/2007 |
| WO | 9504090 A1 | 2/1995 |
| WO | 2012003507 A1 | 1/2012 |

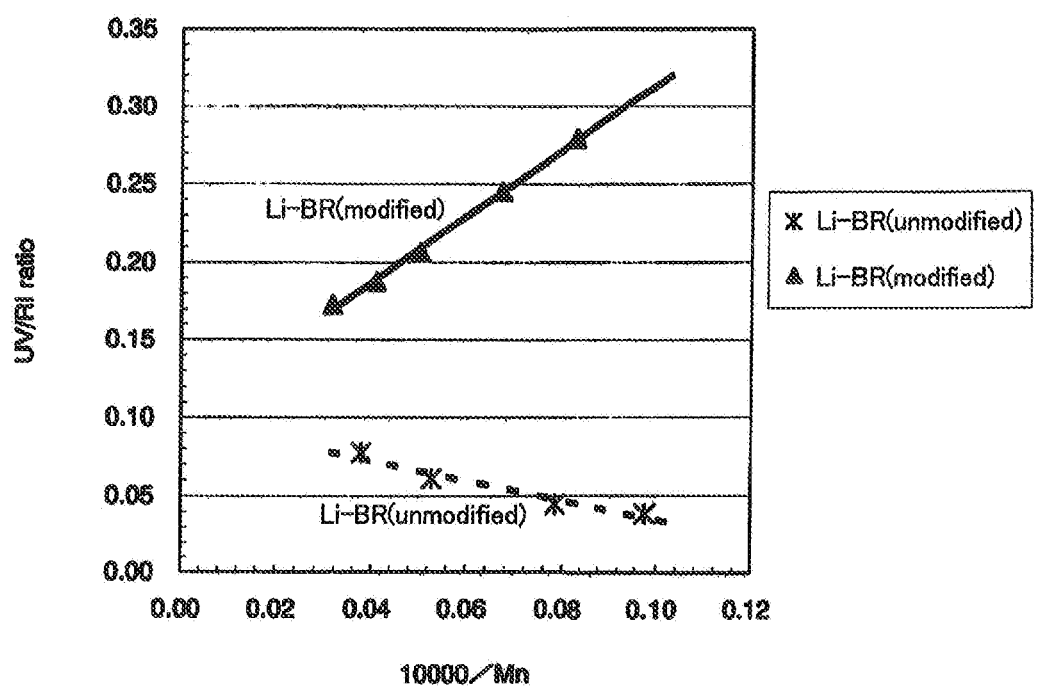

METHOD OF PRODUCING A CONJUGATED DIENE POLYMER, A MODIFIED CONJUGATED DIENE POLYMER, AND A VINYL CIS-POLYBUTADIENE COMPOSITION

CROSS REFERENCE TO RELATED APPLICATIONS

This application is a continuation of U.S. patent application Ser. No. 15/801,872, filed on Nov. 2, 2017, which is a divisional application of U.S. patent application Ser. No. 14/775,961, filed Sep. 14, 2015, which is the United States national phase of International Application No. PCT/JP2014/056779 filed Mar. 13, 2014, and claims priority to Japanese Patent Application Nos. 2013-049885 filed Mar. 13, 2013, 2013-067979 filed Mar. 28, 2013, 2013-130224 filed Jun. 21, 2013, 2013-130228 filed Jun. 21, 2013, 2013-266700 filed Dec. 25, 2013, 2013-266704 filed Dec. 25, 2013, 2014-011567 filed Jan. 24, 2014, 2014-011576 filed Jan. 24, 2014, and 2014-011577 filed Jan. 24, 2014, the disclosures of which are hereby incorporated by reference in their entirety.

TECHNICAL FIELD

The present invention relates to a catalyst for a conjugated diene polymerization containing a non-metallocene type gadolinium compound, a conjugated diene polymer and a modified conjugated diene polymer produced using the same, production methods thereof, a rubber composition for a tire, and a rubber composition for a rubber belt.

BACKGROUND ART

Various catalysts for a polymerization of a conjugated diene, such as 1,3-butadiene and isoprene, have conventionally been proposed, and some of them have been industrialized. For example, in production methods of a conjugated diene polymer having high cis-1,4 structures, combinations of a compound of a metal such as titanium, cobalt, nickel or neodymium with an organic aluminum compound are often used.

In addition, polymerizations of a conjugated diene using a catalyst containing a group 3 element of the periodic table are known, and various polymerization methods have hitherto been proposed. For example, Patent Literature 1 discloses a catalyst system including a salt of a rare earth metal, an organic metal compound of a group I to III element of the periodic table, and a fluorine-containing organic boron compound. Patent Literature 2 discloses a polymerization catalyst including a compound of a group IIIB metal of the periodic table, an ionic compound of a non-coordinating anion and a cation, and an organic metal compound of a group I to III element of the periodic table. Patent Literature 3 lists organic metal compounds including an element selected from groups 2, 12 and 13 of the periodic table. In addition, Patent Literatures 4 to 6 report polymerizations of a conjugated diene using a metallocene type gadolinium complex.

Among the catalysts described in Patent Literatures 1 to 3, however, ones showing their effects in Examples are mainly neodymium-based catalysts, and gadolinium compounds have not yet been made clear. In addition, the catalysts described in Patent Literatures 4 to 6 have defects that they have low catalytic activities of at most 540 g/mmol-Gd/hr.

A rubber composition containing a polybutadiene rubber (BR) or a styrene-butadiene rubber (SBR) as a main component, and including, in addition, a natural rubber, and the like has been conventionally been industrially produced and used mainly as a material for a tire, a crawler for a crawler type traveling apparatus, an industrial rubber belt, or the like, utilizing its characteristic (Patent Literatures 7 and 8).

Requirements for reducing fuel consumption in automobiles and requirements for running safety on snow and ice have recently been increased for tire materials, and thus it has been desired to develop a rubber material having a low rolling resistance, (i.e., a high rebound resilience) and a large grip on a road surface such as a snow or ice surface (i.e., a high wet skid resistance). However, rubbers having a high rebound resilience such as a polybutadiene rubber (BR) are likely to have a lower wet skid resistance; whereas a styrene-butadiene rubber (SBR) has a defect in which the wet skid resistance is high, but the rolling resistance is also high. In order to solve the problems described above, various methods in which a low cis-diene-based rubber is chemically modified with a modifier in the presence of a lithium catalyst have been proposed, but the low cis-BR has an insufficient abrasion resistance, and this problem cannot be solved even by the modification. In addition, the SBR also has a low rebound resilience, and this defect cannot be solved even after the modification.

Patent Literature 9 discloses, as an example of a modification of a high cis-diene-based rubber, a method in which cis-1,4-polybutadiene is produced using a titanium compound having a cyclopentadienyl backbone as a catalyst, and then the product is modified by reacting it with 4,4'-bis (diethylamino)benzophenone, but the resulting product has a very small ratio of a weight average molecular weight (Mw) to a number average molecular weight (Mn), (Mw/Mn), of less than 1.5, thus resulting in a problem of processability.

A crawler type traveling apparatus, which is used in every field, such as a bulldozer, is configured by winding an endless belt-shaped elastic crawler around a drive sprocket, an idler, and multiple trunk rollers. It is often used in harsher conditions than those in wheels, and crawler structures have been improved in order to increase a running performance and durability. In addition, rubber compositions for a crawler, which are tougher, have a higher durability, and are excellent in low fuel consumption are required.

It is required, for a rubber composition used for a rubber belt, to have a high tensile strength, a moderate hardness, a softness, an elasticity, a high flexibility, and a high impact resistance, and further energy saving and weight saving are also required. In order to satisfy these requirements, reinforcement using an inorganic reinforcing agent or short fiber is proposed. In order to increase the hardness, tensile stress, breakage strength, abrasion resistance, and the like, however, if the amount is increased by addition of an inorganic reinforcing agent such as carbon black, then dynamic heat generation is increased, and a problem in which the weight saving is not attained is raised because of an increased specific gravity of the formulation. The rubber composition described in Patent Literature 8 has a problem in which the composition cannot necessarily obtain sufficient effects in the tensile stress and the elongation fatigue resistance, because microfine dispersion of 1,2-polybutadiene short fiber crystals in the butadiene rubber, which is a matrix component, is insufficient.

As for the polybutadiene, a vinyl•cis-polybutadiene in which syndiotactic 1,2-polybutadiene (hereinafter may sometimes be referred to as SPB) is dispersed in high cis-BR (hereinafter may sometimes be referred to as VCR) is known as a BR having higher functional characteristics, which utilizes the characteristics of the high cis-BR.

As the production method of VCR described above, for example, Patent Literatures 10 and 11 disclose methods for producing an SPB-containing high cis-BR composite using a cobalt catalyst. Patent Literature 12 discloses a method for producing an SPB-containing high cis-BR composite using a nickel catalyst.

In addition, Patent Literature 13 discloses a method for producing VCR in an inert organic solvent including mainly a $C_4$ fraction such as n-butane, cis-2-butene, trans-2-butene, or butene-1. However, a method for producing VCR using a gadolinium catalyst has not yet been reported.

CITATION LIST

Patent Literatures

Patent Literature 1: JP 7-268013 A
Patent Literature 2: JP 11-80222 A
Patent Literature 3: JP 2007-161921 A
Patent Literature 4: JP 2004-27179 A
Patent Literature 5: JP 2004-238637 A
Patent Literature 6: JP 2007-63240 A
Patent Literature 7: JP 2007-230266 A
Patent Literature 8: JP 2004-346220 A
Patent Literature 9: JP 2000-86719 A
Patent Literature 10: JP 49-17666 B
Patent Literature 11: JP 49-17667 B
Patent Literature 12: JP 63-1324 B
Patent Literature 13: JP 2000-44633 B

SUMMARY OF THE INVENTION

In view of the problems described above, the present invention has been made, and it is an object of the present invention to provide a catalyst for a conjugated diene polymerization containing a gadolinium compound, which can produce a conjugated diene polymer having a high content of cis-1,4 structures with a high activity.

Furthermore, it is an object of the present invention to provide a conjugated diene polymer, a modified conjugated diene polymer, and a vinyl•cis-polybutadiene (VCR), which have a high content of cis-1,4 structures, produced using the above-mentioned gadolinium catalyst easy to handle and having a high activity; production methods thereof; and a conjugated diene polymer composition and a modified conjugated diene polymer composition containing these polymers.

Furthermore, it is an object of the present invention to provide a rubber composition for a tire and a tire, which are tough, have excellent durability of an elongation fatigue resistance and an abrasion resistance, have a reduced energy loss, and can be used for a crawler; and a rubber composition for a rubber belt and a rubber belt, which are preferable for an industrial rubber belt.

Solution to Problem

In order to attain the objects described above, the present inventors have intensively researched; as a result, they have found that when a non-metallocene type gadolinium compound is used, a conjugated diene polymer having a high content of cis-1,4 structures can be produced with a higher activity than those in conventional methods, and have reached the present invention.

Furthermore, they have also found that when the gadolinium compound described above is used, a conjugated diene polymer and a modified conjugated diene polymer, which have a very high content of cis-1,4 structures, can be produced, and have reached the present invention.

Furthermore, they have also found that when the conjugated diene polymer or the modified conjugated diene polymer described above is used, a conjugated diene polymer composition having excellent rebound resilience and abrasion resistance, and a modified conjugated diene polymer composition having an excellent elongation fatigue resistance, in addition to the above, can be produced, and have reached the present invention.

Furthermore, they have also found that when a polybutadiene having a high content of cis-1,4 structures is produced with a high activity using the gadolinium compound described above, and then a SPB is synthesized in the polymerization system, vinyl•cis-polybutadiene (VCR) can be favorably produced, and have reached the present invention.

Furthermore, they have also found that a rubber composition for a tire and a tire using the conjugated diene polymer or the modified conjugated diene polymer are tough, have excellent durability of elongation fatigue resistance, abrasion resistance, and the like, have a reduced energy loss, and can be used for a crawler; and a rubber composition for a rubber belt and a rubber belt using the conjugated diene polymer or the modified conjugated diene polymer described above, are preferable for an industrial rubber belt, and have reached the present invention.

According to the present invention, there is provided a catalyst for a conjugated diene polymerization including: a non-metallocene type gadolinium compound (A) represented by the following general formula (1); an ionic compound (B) formed of a non-coordinating anion and a cation; and an organic metal compound (C) of an element selected from the group consisting of a group 2, a group 12, and a group 13 of the periodic table.

[Chemical Formula 1]

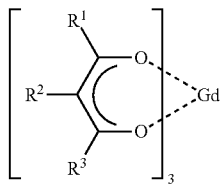

(1)

wherein $R^1$, $R^2$, and $R^3$ each shows a hydrogen or a substituent having 1 to 12 carbon atoms, O shows an oxygen atom, and Gd shows a gadolinium atom.

In the catalyst for a conjugated diene polymerization of the present invention, the organic metal compound (C) is preferably an organic aluminum compound, and the ionic compound (B) is preferably a boron-containing compound.

Furthermore, according to the present invention, there is provided a method for producing a conjugated diene polymer including polymerizing a conjugated diene compound using the catalyst for a conjugated diene polymerization.

Furthermore, according to the present invention, there is provided a method for producing a modified conjugated diene polymer including: polymerizing a conjugated diene compound using a catalyst for a conjugated diene polymerization including a non-metallocene type gadolinium compound (A) represented by the following general formula (1), an ionic compound (B) formed of a non-coordinating anion and a cation, and an organic metal compound (C) of an element selected from the group consisting of group 2, a group 12, and a group 13 of the periodic table to obtain a conjugated diene polymer; and modifying the conjugated diene polymer with an amino group-containing carbonyl compound to obtain a modified conjugated diene polymer.

[Chemical Formula 2]

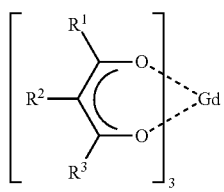

(1)

wherein $R^1$, $R^2$, and $R^3$ each shows a hydrogen or a substituent having 1 to 12 carbon atoms, O shows an oxygen atom, and Gd shows a gadolinium atom.

In the method for producing a modified conjugated diene polymer of the present invention, the amino group-containing carbonyl compound is preferably a 4,4'-bis-dialkylaminobenzophenone, and it is preferable to adjust the molecular weight using a compound selected from (1) a hydrogen, (2) a metal hydride compound, and (3) a hydrogenated organic metal compound in the polymerization of the conjugated diene compound.

Furthermore, according to the present invention, there is provided a method for producing a modified conjugated diene polymer including: polymerizing a conjugated diene compound using a catalyst for a conjugated diene polymerization containing a non-metallocene type gadolinium compound (A) represented by the following general formula (1), an ionic compound (B) formed of a non-coordinating anion and a cation, and an organic metal compound (C) of an element selected from the group consisting of a group 2, a group 12, and a group 13 of the periodic table to obtain a conjugated diene polymer; and modifying the conjugated diene polymer with a halogenated benzyl compound to obtain a modified conjugated diene polymer.

[Chemical Formula 3]

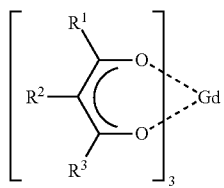

(1)

wherein $R^1$, $R^2$, and $R^3$ each shows a hydrogen or a substituent having 1 to 12 carbon atoms, O shows an oxygen atom, and Gd shows a gadolinium atom.

In the method for producing a modified conjugated diene polymer of the present invention, the halogenated benzyl compound is preferably a piperonyl chloride, a dimethoxybenzyl bromide, or a methoxybenzyl chloride, and it is preferable to adjust the molecular weight with a compound selected from (1) a hydrogen, (2) a metal hydride compound, and (3) a hydrogenated organic metal compound in the polymerization of the conjugated diene compound.

Furthermore, according to the present invention, there is provided a method for producing a modified conjugated diene polymer, which includes: polymerizing a conjugated diene compound using a catalyst for a conjugated diene polymerization containing a non-metallocene type gadolinium compound (A) represented by the following general formula (1), an ionic compound (B) formed of a non-coordinating anion and a cation, and an organic metal compound (C) of an element selected from the group consisting of a group 2, a group 12, and a group 13 of the periodic table to obtain a conjugated diene polymer; and modifying the conjugated diene polymer with an aldehyde compound to obtain a modified conjugated diene polymer.

[Chemical Formula 4]

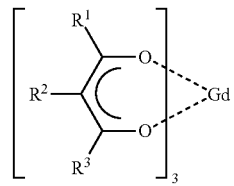

(1)

wherein $R^1$, $R^2$, and $R^3$ each shows a hydrogen or a substituent having 1 to 12 carbon atoms, O shows an oxygen atom, and Gd shows a gadolinium atom.

In the method for producing a modified conjugated diene polymer of the present invention, the aldehyde compound is preferably a heliotropin or a veratrum aldehyde, and it is preferable to adjust the molecular weight with a compound selected from the group consisting of (1) a hydrogen, (2) a metal hydride compound, and (3) a hydrogenated organic metal compound in the polymerization of the conjugated diene compound.

Furthermore, according to the present invention, there is provided a method for producing a vinyl•cis-polybutadiene, which includes performing a cis-1,4 polymerization of a 1,3-butadiene, and performing a subsequent syndiotactic-1,2 polymerization in the resulting polymerization system, wherein a catalyst for a conjugated diene polymerization containing a non-metallocene type gadolinium compound (A) represented by the following general formula (1), an ionic compound (B) formed of a non-coordinating anion and a cation, and an organic metal compound (C) of an element selected from the group consisting of a group 2, a group 12, and a group 13 of the periodic table is used as a catalyst in the cis-1,4 polymerization, and a catalyst system containing a sulfur compound is used as a catalyst in the syndiotactic-1,2 polymerization.

[Chemical Formula 5]

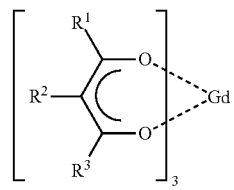

(1)

wherein $R^1$, $R^2$, and $R^3$ each shows a hydrogen or a substituent having 1 to 12 carbon atoms, O shows an oxygen atom, and Gd shows a gadolinium atom.

In the production method of the vinyl•cis-polybutadiene of the present invention, the organic metal compound (C) is preferably an organic aluminum compound, the ionic compound (B) is preferably a boron-containing compound, and it is preferable to use a catalyst system containing a cobalt compound, a trialkyl aluminum compound, and a sulfur compound as the catalyst in the syndiotactic-1,2 polymerization.

Furthermore, according to the present invention, there is provided vinyl•cis-polybutadiene obtained by a production method, which includes performing a cis-1,4 polymerization of 1,3-butadiene using a catalyst for a conjugated diene polymerization containing a non-metallocene type gadolinium compound (A) represented by the following general formula (1), an ionic compound (B) formed of a non-coordinating anion and a cation, and an organic metal compound (C) of an element selected from the group consisting of a group 2, a group 12, and a group 13 of the periodic table; and performing a syndiotactic-1,2 polymerization using a catalyst system containing a sulfur compound in the resulting polymerization system.

[Chemical Formula 6]

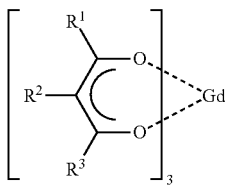

(1)

wherein $R^1$, $R^2$, and $R^3$ each shows a hydrogen or a substituent having 1 to 12 carbon atoms, O shows an oxygen atom, and Gd shows a gadolinium atom.

Furthermore, according to the present invention, there is provided a conjugated diene polymer composition including: a conjugated diene polymer (α) resulting from a polymerization of a conjugated diene compound using a catalyst for a conjugated diene polymerization containing a non-metallocene type gadolinium compound (A) represented by the following general formula (1), an ionic compound (B) formed of a non-coordinating anion and a cation, and an organic metal compound (C) of an element selected from the group consisting of a group 2, a group 12, and a group 13 of the periodic table; a diene polymer (β) other than the (α); and a rubber-reinforcing agent (γ).

[Chemical Formula 7]

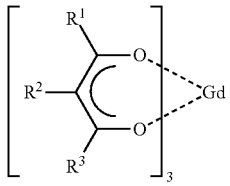

(1)

wherein $R^1$, $R^2$, and $R^3$ each shows a hydrogen or a substituent having 1 to 12 carbon atoms, O shows an oxygen atom, and Gd shows a gadolinium atom.

In the conjugated diene polymer composition of the present invention, the rubber-reinforcing agent (γ) is preferably a carbon black, it is preferable to adjust the molecular weight of the conjugated diene compound with a compound selected from the group consisting of (1) a hydrogen, (2) a metal hydride compound, (3) a hydrogenated organic metal compound, and the conjugated diene compound is preferably a 1,3-butadiene.

Furthermore, according to the present invention, there is provided a modified conjugated diene polymer composition including: a modified conjugated diene polymer (α') obtained by polymerizing a conjugated diene compound using a catalyst for a conjugated diene polymerization containing a non-metallocene type gadolinium compound (A) represented by the following general formula (1), a ionic compound (B) formed of a non-coordinating anion and a cation, and an organic metal compound (C) of an element selected from the group consisting of a group 2, a group 12, and a group 13 of the periodic table, and then modifying the resulting polymer with an amino group-containing carbonyl compound; a diene polymer (β) other than the (α'); and a rubber-reinforcing agent (γ).

[Chemical Formula 8]

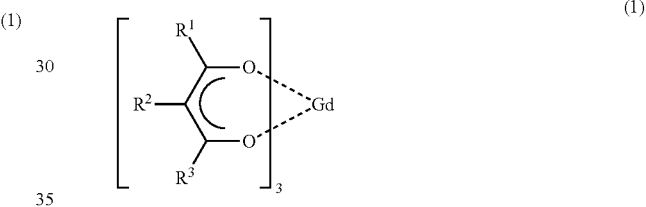

wherein $R^1$, $R^2$, and $R^3$ each shows a hydrogen or a substituent having 1 to 12 carbon atoms, O shows an oxygen atom, and Gd shows a gadolinium atom.

In the modified conjugated diene polymer composition of the present invention, the rubber-reinforcing agent (γ) is preferably a carbon black, the amino group-containing carbonyl compound is preferably a 4,4'-bis-dialkylaminobenzophenone, it is preferable to adjust the molecular weight of the conjugated diene compound with a compound selected from the group consisting of (1) a hydrogen, (2) a metal hydride compound, and (3) a hydrogenated organic metal compound, and the conjugated diene compound is preferably a 1,3-butadiene.

Furthermore, according to the present invention, there is provided a rubber composition for a tire including: rubber components (α)+(β); and a rubber-reinforcing agent (γ), wherein the rubber-reinforcing agent (γ) is included in an amount of 30 to 80 parts by mass based on 100 parts by mass of the rubber components (α)+(β). The rubber components (α) is a conjugated diene polymer (α) obtained by polymerizing a conjugated diene compound using a catalyst for a conjugated diene polymerization containing a non-metallocene type gadolinium compound (A) represented by the following general formula (1), an ionic compound (B) formed of a non-coordinating anion and a cation, and an organic metal compound (C) of an element selected from the group consisting of a group 2, a group 12, and a group 13 of the periodic table. The rubber component (β) is a diene polymer (β) other than the (α).

[Chemical Formula 9]

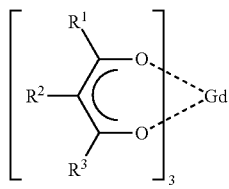

(1)

wherein $R^1$, $R^2$, and $R^3$ each shows a hydrogen or a substituent having 1 to 12 carbon atoms, O shows an oxygen atom, and Gd shows a gadolinium atom.

Furthermore, according to the present invention, there is provided a rubber composition for a tire including: rubber components (α')+(β); and a rubber-reinforcing agent (γ), wherein the rubber-reinforcing agent (γ) is included in an amount of 30 to 80 parts by mass based on 100 parts by mass of the rubber components (α')+(β). The rubber component (α') is a modified conjugated diene polymer (α') obtained by polymerizing a conjugated diene compound using a catalyst for a conjugated diene polymerization containing a non-metallocene type gadolinium compound (A) represented by the following general formula (1), an ionic compound (B) formed of a non-coordinating anion and a cation, and an organic metal compound (C) of an element selected from the group consisting of a group 2, a group 12, and a group 13 of the periodic table. The rubber component (β) is a diene polymer (β) other than the (α').

[Chemical Formula 10]

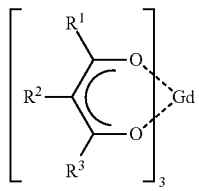

(1)

wherein $R^1$, $R^2$, and $R^3$ each shows a hydrogen or a substituent having 1 to 12 carbon atoms, O shows an oxygen atom, and Gd shows a gadolinium atom.

In the rubber composition for a tire of the present invention, the diene polymer (β) other than the (α) and (α') is preferably a natural rubber and/or a polyisoprene, and the rubber-reinforcing agent (F) is preferably a carbon black.

Furthermore, according to the present invention, there is provided a tire using the rubber composition for a tire as a rubber substrate.

Furthermore, according to the present invention, there is provided a rubber composition for a rubber belt including: rubber components (α)+(β); and a rubber-reinforcing agent (γ), wherein the rubber-reinforcing agent (γ) is included in an amount of 20 to 70 parts by mass based on 100 parts by mass of the rubber components (α)+(β). The rubber component (α) is a conjugated diene polymer (α) obtained by polymerizing a conjugated diene compound using a catalyst for a conjugated diene polymerization containing a non-metallocene type gadolinium compound (A) represented by the following general formula (1), an ionic compound (B) formed of a non-coordinating anion and a cation, and an organic metal compound (C) of an element selected from the group consisting of a group 2, a group 12, and a group 13 of the periodic table. The rubber component (β) is a diene polymer (β) other than the (α).

[Chemical Formula 11]

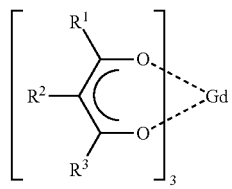

(1)

wherein $R^1$, $R^2$, and $R^3$ each shows a hydrogen or a substituent having 1 to 12 carbon atoms, O shows an oxygen atom, and Gd shows a gadolinium atom.

Furthermore, according to the present invention, there is provided a rubber composition for a rubber belt including: rubber components (α')+(β); and a rubber-reinforcing agent (γ), wherein the rubber-reinforcing agent (γ) is included in an amount of 20 to 70 parts by mass based on 100 parts by mass of the rubber components (α')+(β). The rubber component (α') is a modified conjugated diene polymer (α') obtained by polymerizing a conjugated diene compound using a catalyst for a conjugated diene polymerization containing a non-metallocene type gadolinium compound (A) represented by the following general formula (1), an ionic compound (B) formed of a non-coordinating anion and a cation, and an organic metal compound (C) of an element selected from the group consisting of a group 2, a group 12, and a group 13 of the periodic table, and then modifying the resulting polymer. The rubber component (β) is a diene polymer (β) other than the (α').

[Chemical Formula 12]

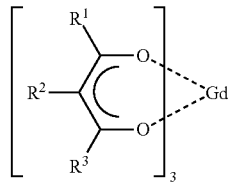

(1)

wherein $R^1$, $R^2$, and $R^3$ each shows a hydrogen or a substituent having 1 to 12 carbon atoms, O shows an oxygen atom, and Gd shows a gadolinium atom.

In the rubber composition for a rubber belt of the present invention, the rubber-reinforcing agent (γ) is preferably a carbon black and/or a silica, and it is more preferable that the rubber-reinforcing agent (γ) is a carbon black and a silica and the silica is included in an amount of 70% by mass or less in the rubber-reinforcing agent.

Furthermore, according to the present invention, there is provided a rubber belt using the rubber composition for a rubber belt as a rubber substrate.

Advantageous Effects of Invention

As described above, according to the present invention, there can be provided a catalyst for a conjugated diene polymerization capable of producing a conjugated diene polymer having a high content of cis-1,4-structures with a high activity.

In addition, according to the present invention, there can be provided a conjugated diene polymer, a modified conjugated diene polymer, and a vinyl•cis-polybutadiene (VCR), which have a very high content of cis-1,4 structures, using the catalyst which is easy to handle and have a high activity, and production methods thereof. There can be also provided a conjugated diene polymer composition, which has an improved filler dispersibility, and excellent rebound resilience and abrasion resistance, and a modified conjugated diene polymer composition, which has an excellent elongation fatigue resistance in addition to the above.

Furthermore, according to the present invention, there can be provided a rubber composition for a tire and a tire, which are tough, have excellent durability of elongation fatigue resistance and abrasion resistance, have a reduced energy loss, and can be used for a crawler, and a rubber composition for a rubber belt and a rubber belt preferable for an industrial rubber belt.

BRIEF DESCRIPTION OF DRAWING

FIG. 1 is a graph showing a relationship between a UV/RI value and $(1/Mn) \times 10^4$ for obtaining a degree of modification of the modified conjugated diene polymer of the present invention. In this FIGURE, UV denotes a peak area obtained from a UV absorbance at 274 nm obtained in a GPC measurement of a polymer, and RI denotes a peak area obtained from a differential refractive index. In addition, Mn denotes a number average molecular weight.

DESCRIPTION OF THE INVENTION (Catalyst for Conjugated Diene Polymerization) The non-metallocene type gadolinium compound (A) used in the catalyst for a conjugated diene polymerization in the present invention is a non-metallocene type gadolinium compound represented by the following general formula (1):

[Chemical Formula 13]

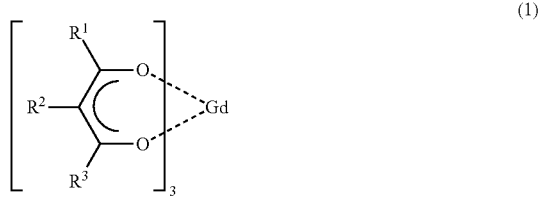

wherein IV, $R^2$, and $R^3$ each shows a hydrogen or a substituent having 1 to 12 carbon atoms, O shows an oxygen atom, and Gd shows a gadolinium atom.

Specific examples of the substituent having 1 to 12 carbon atoms in $R^1$ to $R^3$ in the general formula (1) may include saturated hydrocarbon groups such as a methyl group, an ethyl group, an n-propyl group, an isopropyl group, an n-butyl group, an s-butyl group, an isobutyl group, a t-butyl group, an n-pentyl group, a 1-methylbutyl group, a 2-methylbutyl group, a 3-methylbutyl group, a 1,1-dimethylpropyl group, a 1,2-dimethylpropyl group, a 2,2-dimethylpropyl group, a hexyl group, a heptyl group, an octyl group, a nonyl group, a decyl group, an undecyl group, and a dodecyl group; unsaturated hydrocarbon groups such as a vinyl group, a 1-propenyl group, and an allyl group; alicyclic hydrocarbon groups such as a cyclohexyl group, a methylcyclohexyl group, and an ethylcyclohexyl group; aromatic hydrocarbon groups such as a phenyl group, a benzil group, a toluyl group, and a phenethyl group, and the like. The substituent may also include groups which are substituted by a hydroxyl group, a carboxyl group, a carbomethoxy group, a carboethoxy group, an amide group, an amino group, an alkoxy group, a phenoxy group or the like at any position. Of these, saturated hydrocarbon groups having 1 to 12 carbon atoms are preferable, and saturated hydrocarbon groups having 1 to 6 carbon atoms are particularly preferable.

Specific examples of the non-metallocene type gadolinium compound (A) may include tris(2,2,6,6-tetramethyl-3,5-heptanedionato)gadolinium, tris(2,6,6-trimethyl-3,5-heptanedionato)gadolinium, tris(2,6-dimethyl-3,5-heptanedionato)gadolinium, tris(3,5-heptanedionato) gadolinium, tris(2,4-pentanedionato)gadolinium, tris(2,4-hexanedionato)gadolinium, tris(1,5-dicyclopentyl-2,4-pentanedionato)gadolinium, tris(1,5-dicyclohexyl-2,4-pentanedionato)gadolinium, and the like.

Of these, preferable examples may include tris(2,2,6,6-tetramethyl-3,5-heptanedionato)gadolinium, tris(2,6-dimethyl-3,5-heptanedionato)gadolinium, tris(2,4-pentanedionato)gadolinium, and the like. Particularly preferable examples may include tris(2,2,6,6-tetramethyl-3,5-heptanedionato)gadolinium, and tris(2,6-dimethyl-3,5-heptanedionato)gadolinium. The non-metallocene type gadolinium compound (A) may be used alone or as a mixture of two or more kinds.

The non-metallocene type gadolinium compound (A) can be used as a catalyst for a conjugated diene polymerization in combination with the ionic compound (B) including a non-coordinating anion and a cation, and the organic metal compound (C) of an element selected from the group consisting of a group 2, a group 12, and a group 13 of the periodic table.

In the component (B), or the ionic compound including the non-coordinating anion and the cation, the non-coordinating anion may include, for example, tetra(phenyl)borate, tetra(fluorophenyl)borate, tetrakis(difluorophenyl)borate, tetrakis(trifluorophenyl)borate, tetrakis(tetrafluorophenyl) borate, tetrakis(pentafluorophenyl)borate, tetrakis (3,5-bis-trifluoromethylphenyl)borate, tetrakis(tetrafluoromethylphenyl)borate, tetra(triyl)borate, tetra(xylyl)borate, triphenyl(pentafluorophenyl)borate, tris(pentafluorophenyl) (phenyl)borate, tridecahydride-7,8-dicarbaundecaborate, tetrafluoroborate, hexafluorophosphate, and the like.

The cation may include a carbonium cation, an oxonium cation, an ammonium cation, a phosphonium cation, a cycloheptatrienyl cation, a ferrocenium cation, and the like.

Specific examples of the carbonium cation may include tri-substituted carbonium cations such as triphenylcarbonium cation, and tri-substituted phenylcarbonium cation. Specific examples of the tri-substituted phenylcarbonium cation may include a tri(methylphenyl)carbonium cation, and a tri(dimethylphenyl)carbonium cation.

Specific examples of the ammonium cation may include trialkylammonium cations such as a trimethylammonium cation, a triethylammonium cation, a tripropylammonium cation, a tributylammonium cation, and a tri(n-butyl)ammonium cation; N,N-dialkylanilinium cations such as an N,N-dimethylanilinium cation, an N,N-diethylanilinium cation, and an N,N-2,4,6-pentamethylanilinium cation; and dialkylammonium cations such as a di(isopropyl)ammonium cation, and a dicyclohexylammonium cation.

Specific examples of the phosphonium cation may include allylphosphonium cations such as a triphenylphosphonium cation, a tetraphenylphosphonium cation, a tri(methylphenyl)phosphonium cation, a tetra(methylphenyl)phosphonium cation, a tri(dimethylphenyl)phosphonium cation, and a tetra(dimethylphenyl)phosphonium cation.

Any combination, obtained by arbitrarily selecting from the non-coordinating anions and the cations listed above respectively, may be preferably used as the ionic compound (B).

Of these, a boron-containing compound is preferable as the ionic compound (B), and triphenylcarbenium tetrakis (pentafluorophenyl)borate, triphenylcarbenium tetrakis (fluorophenyl)borate, N,N-dimethylanilinium tetrakis(pentafluorophenyl)borate, and 1,1'-dimethylferrocenium tetrakis(pentafluorophenyl)borate are particularly preferable among them. The ionic compound (B) may be used alone or as a mixture of two or more kinds.

Instead of the ionic compound formed of the non-coordinating anion and the cation as the component (B), an alumoxane may be used. The alumoxane is a compound obtained by contacting an organic aluminum compound with a condensing agent, which includes a linear alumoxane or cyclic alumoxane represented by the general formula: (—Al (R')O—)$_n$ wherein R' denotes a hydrocarbon group having 1 to 10 carbon atoms, including groups partially substituted by a halogen atom and/or an alkoxy group; and n is a degree of polymerization and 5 or more, preferably 10 or more. R' may include a methyl group, an ethyl group, a propyl group and an isobutyl group, and methyl group is preferable. An organic aluminum compound used as a starting material of the alumoxane may include, for example, trialkyl aluminum such as trimethyl aluminum, triethyl aluminum, and triisobutyl aluminum, and mixtures thereof, and the like. Of these, an alumoxane obtained using a mixture of trimethyl aluminum and triisobutyl aluminum can be preferably used.

Typical condensing agent may be water, and in addition it may include any agent capable of causing a condensation reaction of the above-mentioned organic aluminum compound, for example, adsorbed water in an inorganic substance, diols, and the like.

As the component (C), or the organic metal compound of an element selected from the group consisting of a group 2, a group 12, and a group 13 of the periodic table, for example, an organic magnesium compound, an organic zinc compound, an organic aluminum compound, and the like are used. Among these compounds, a dialkyl magnesium; alkyl magnesium halides such as an alkyl magnesium chloride and an alkyl magnesium bromide; a dialkyl zinc; a trialkyl aluminum; a dialkyl aluminum chloride, a dialkyl aluminum bromide; organic aluminum halides such as an alkyl aluminum sesqui-chloride, an alkyl aluminum sesqui-bromide, and an alkyl aluminum dichloride; hydrogenated organic aluminum compound such as a dialkyl aluminum hydride are preferable.

Specific compounds thereof may include alkyl magnesium halides such as methyl magnesium chloride, ethyl magnesium chloride, butyl magnesium chloride, hexyl magnesium chloride, octyl magnesium chloride, ethyl magnesium bromide, butyl magnesium bromide, butyl magnesium iodide, and hexyl magnesium iodide.

The compound may further include dialkyl magnesium such as dimethyl magnesium, diethyl magnesium, dibutyl magnesium, dihexyl magnesium, dioctyl magnesium, ethyl butyl magnesium, and ethyl hexyl magnesium.

Furthermore, the compound may include dialkyl zinc such as dimethyl zinc, diethyl zinc, diisobutyl zinc, dihexyl zinc, dioctyl zinc, and didecyl zinc.

Furthermore, the compound may include trialkyl aluminum such as trimethyl aluminum, triethyl aluminum, triisobutyl aluminum, trihexyl aluminum, trioctyl aluminum, and tridecyl aluminum.

Furthermore, the compound may include dialkyl aluminum chlorides such as dimethyl aluminum chloride and diethyl aluminum chloride; organic aluminum halides such as ethyl aluminum sesqui-chloride and ethyl aluminum dichloride; hydrogenated organic aluminum compounds such as diethyl aluminum hydride, diisobutyl aluminum hydride, and ethyl aluminum sesqui-hydride.

The organic metal compound (C) of an element selected from the group consisting of a group 2, a group 12, and a group 13 of the periodic table may be used alone or as a mixture of two or more kinds.

Of these, the group 13 elements are preferable, and an organic aluminum compound is preferable among them. Examples thereof may include trimethyl aluminum, triethyl aluminum, triisobutyl aluminum, and the like. Triethyl aluminum is particularly preferable.

In the present invention, the polymerization of the conjugated diene can be carried out using the catalyst including the components (A), (B), and (C) described above. In addition to the catalyst, a molecular weight-adjusting agent of the obtained conjugated diene polymer may be added as long as the effects of the present invention are not impaired.

As the molecular weight-adjusting agent, a compound selected from hydrogen, a metal hydride compound, and an organic metal compound may be used.

The metal hydride compound may include lithium hydride, sodium hydride, potassium hydride, magnesium hydride, calcium hydride, borane, aluminum hydride, gallium hydride, silane, germane, lithium borohydride, sodium borohydride, lithium aluminum hydride, sodium aluminum hydride, and the like.

The hydrogenated organic metal compound may include alkyl borane such as methyl borane, ethyl borane, propylborane, butyl borane, and phenyl borane; dialkyl borane such as dimethyl borane, diethyl borane, dipropyl borane, dibutyl borane, diphenyl borane; alkyl aluminum dihydrides such as methyl aluminum dihydride, ethyl aluminum dihydride, propyl aluminum dihydride, butyl aluminum dihydride, and phenyl aluminum dihydride; dialkyl aluminum hydrides such as dimethyl aluminum hydride, diethyl aluminum hydride, dipropyl aluminum hydride, di-normalbutyl aluminum hydride, diisobutyl aluminum hydride, and diphenyl aluminum hydride; silanes such as methyl silane, ethyl silane, propyl silane, butyl silane, phenyl silane, dimethyl silane, diethyl silane, dipropyl silane, dibutyl silane, diphenyl silane, trimethyl silane, triethyl silane, tripropyl silane, tributyl silane, and triphenyl silane; germanes such as methyl germane, ethyl germane, propyl germane, butyl germane, phenyl germane, dimethyl germane, diethyl germane, dipropyl germane, dibutyl germane, diphenyl germane, trimethyl germane, triethyl germane, tripropyl germane, tributyl germane, and triphenyl germane, and the like.

Of these, diisobutyl aluminum hydride, and diethyl aluminum hydride are preferable, and diisobutyl aluminum hydride is particularly preferable.

In the present invention, each catalyst component may be previously aged and then used. It is especially preferable that the component (A) and the component (C) are aged.

The aging is preferably performed by mixing the component (A) and the component (C) in an inert solvent in the presence or absence of the conjugated diene compound monomers to be polymerized. The ageing temperature is from −50 to 120° C., preferably from −10 to 95° C., and the ageing time is from 0.005 to 24 hours, preferably from 0.01 to 5 hours, particularly preferably from 0.02 to 1 hour.

In the present invention, each catalyst component may be supported on an inorganic compound or an organic polymer compound, and then the resulting product can be used.

In the method for producing a conjugated diene polymer according to the present invention, the addition order of the catalyst components is not particularly limited, and the components may be added, for example, in the following orders:

(1) The component (C) is added to an inert organic solvent in the presence or absence of the conjugated diene compound monomers to be polymerized, and then the component (A) and the component (B) are added in an arbitrary order.

(2) The component (C) is added to an inert organic solvent in the presence or absence of the conjugated diene compound monomers to be polymerized, the molecular weight-adjusting agent is added, and then the component (A) and the component (B) are added in an arbitrary order.

(3) The component (A) is added to an inert organic solvent in the presence or absence of the conjugated diene compound monomers to be polymerized, the component (C) and the molecular weight-adjusting agent are added in an arbitrary order, and then the component (B) is added.

(4) The component (B) is added to an inert organic solvent in the presence or absence of the conjugated diene compound monomers to be polymerized, the component (C) and the molecular weight-adjusting agent are added in an arbitrary order, and then the component (A) is added.

(5) The component (C) is added to an inert organic solvent in the presence or absence of the conjugated diene compound monomers to be polymerized, the component (A) and the component (B) are added in an arbitrary order, and then the molecular weight-adjusting agent is added.

The conjugated diene compound monomer, which is a starting material, may include 1,3-butadiene, isoprene, 1,3-pentadiene, 2-ethyl-1,3-butadiene, 2,3-dimethyl butadiene, 2-methyl pentadiene, 4-methyl pentadiene, 2,4-hexadiene, and the like. Of these, conjugated diene compound monomers containing 1,3-butadiene as a main component are preferable. The monomer component may be used alone, or as a mixture of two or more kinds.

Here, the conjugated diene compound monomers to be polymerized may be a whole amount of the monomers or a part of the monomers. In a case of a part of the monomers, a contact mixture of the component containing at least one of the components (A), (B), and (C), and the monomers may be mixed with the rest monomer or a solution of the rest monomer.

In addition to the conjugated diene, an olefin compound such as ethylene, propylene, allene, 1-butene, 2-butene, 1,2-butadiene, penetene, cyclopentene, hexene, cyclohexene, octene, cyclooctadiene, cyclododecatriene, norbornene, or norbornadiene may be included.

Polymerization methods are not particularly limited, and mass polymerizations (bulk polymerizations) using monomers of a conjugated diene compound such as 1,3-butadiene themselves as a polymerization solvent, or solution polymerizations are employed. The solvent used in the solution polymerization may include aliphatic hydrocarbons such as butane, pentane, hexane, and heptane; alicyclic hydrocarbons such as cyclopentane, and cyclohexane; aromatic hydrocarbons such as benzene, toluene, xylene, ethyl benzene, and cumene; olefinic hydrocarbons such as the olefinic compounds described above, cis-2-butene, trans-2-butene, and the like. Of these, benzene, toluene, xylene, cyclohexane, and a mixture of cis-2-butene and trans-2-butene are preferably used. The solvent may be used alone or as a mixture of two or more kinds.

The polymerization temperature is preferably within a range of −30 to 150° C., more preferably 0 to 100° C., particularly preferably 10 to 80° C. The polymerization time is preferably from one minute to 12 hours, more preferably from 3 minutes to 5 hours, particularly preferably from 5 minutes to one hour.

After the polymerization is performed for a given time, the pressure inside the polymerization tank is released if necessary, and post-treatments such as washing and drying are performed.

The conjugated diene polymer obtained in the present invention is exemplified by a cis-1,4-polybutadiene containing preferably 94% or more, more preferably 98% or more, particularly preferably 98.5% or more, of cis-1,4 structures. The [η] of the conjugated diene polymer can be controlled to preferably from 0.1 to 10, more preferably from 1 to 7, particularly preferably from 1.5 to 5.

The conjugated diene polymer obtained in the present invention has a number average molecular weight (Mn) of preferably 10000 to 1000000, more preferably 100000 to 700000, particularly preferably 150000 to 550000. The conjugated diene polymer has a ratio of a weight average molecular weight (Mw) and a number average molecular weight (Mn), (Mw/Mn), of preferably 1.5 to 10, more preferably 1.5 to 7, particularly preferably 1.5 to 4. When the Mw/Mn is small, the processability may sometimes worsen.

(Modified Conjugated Diene Polymer) The conjugated diene polymer obtained in the present invention can be modified, and additional effects can be exhibited by the modification. It is preferable in the present invention to use a modifier which is at least one compound selected from the group consisting of amino group-containing carbonyl compounds, halogenated benzyl compounds, and aldehyde compounds.

Aminobenzophenone compounds are preferable as a carbonyl compound (preferably an aromatic carbonyl compound) having an amino group (preferably an aminoalkyl group having an alkyl group with 1 to 6 carbon atoms). Specific compound examples thereof may include 4-dimethyl aminoacetophenone, 4-diethyl aminoacetophenone, 4-dimethyl aminopropiophenone, 4-diethyl aminopropiophenone, 1,3-bis(diphenylamino)-2-propanone, 1,7-bis(methylethylamino)-4-heptanone, 4-dimethyl aminobenzophenone, 4-diethyl aminobenzophenone, 4-dibutyl aminobenzophenone, 4-diphenylaminobenzophenone, 4,4'-bis(dimethylamino)benzophenone, 4,4'-bis(diethylamino)benzophenone, 4,4'-bis(dibutylamino)benzophenone, 4,4'-bis(diphenylamino)benzophenone, 4-dimethyl aminobenzaldehyde, 4-diphenyl aminobenzaldehyde, 4-divinyl aminobenzaldehyde, and the like. Of these compounds, 4,4'-bis(diethylamino)benzophenone is particularly preferable. The modifier may be used alone or as a mixture of two or more kinds.

Alkoxybenzyl halide compounds are preferable as the halogenated benzyl compound. Specific compound examples thereof may include methoxybenzyl chloride, methoxybenzyl bromide, methoxybenzyl iodide, ethoxybenzyl chloride, ethoxybenzyl bromide, ethoxybenzyl iodide, dimethoxybenzyl chloride, dimethoxybenzyl bromide, dimethoxybenzyl iodide, diethoxybenzyl chloride, diethoxybenzyl bromide, diethoxybenzyl iodide, piperonyl chloride, piperonyl bromide, piperonyl iodide, and the like. Of these compounds, methoxybenzyl chloride, dimethoxybenzyl bromide, and piperonyl chloride are particularly preferable. The modifier may be used alone or as a mixture of two or more kinds.

Aromatic aldehyde compounds are preferable as the aldehyde compound. Specific compound examples thereof may include methoxybenzaldehyde, ethoxybenzaldehyde, propoxybenzaldehyde, butoxybenzaldehyde, veratrum aldehyde, 2,4-dimethoxybenzaldehyde, 3,5-dimethoxybenzaldehyde, diethoxybenzaldehyde, ethoxymethoxybenzaldehyde, trimethoxybenzaldehyde, heliotropin, and the like. Of these compounds, veratrum aldehyde and heliotropin are particularly preferable. The modifier may be used alone or as a mixture of two or more kinds.

Any solvent may be freely used as an organic solvent used in the modification reaction so long as it is not reacted with the conjugated diene polymer. The same solvent as that used in the production of the conjugated diene polymer is usually used. Specific examples thereof may include aromatic hydrocarbon solvents such as benzene, chlorobenzene, toluene, and xylene; aliphatic hydrocarbon solvents having 5 to 10 carbon atoms such as n-heptane, n-hexane, n-pentane, and n-octane; alicyclic hydrocarbon solvents such as cyclohexane, methyl cyclohexane, tetralin, and decalin, and the like. Methylene chloride and tetrahydrofuran may also be used.

The temperature of the reaction solution in the modification reaction is within a range of preferably 0 to 100° C., particularly preferably 30 to 90° C. When the temperature is too low, the modification reaction slowly proceeds, whereas when the temperature is too high, the polymer is likely to cause gelation. The time of the modification reaction is not particularly limited, and it is within a range of preferably one minute to 5 hours, more preferably 3 minutes to one hour. When the modification reaction time is too short, the reaction proceeds insufficiently, whereas when the time is too long, the polymer is likely to cause gelation.

The amount of the conjugated diene polymer in the modification reaction solution is within a range of usually 5 to 500 g per liter of the solvent, preferably 20 to 300 g, further more preferably 30 to 200 g.

The amount of the modifier used in the modification reaction is within a range of usually 0.01 to 150 millimoles per 100 g of the conjugated diene polymer, preferably 0.1 to 100 millimoles, further more preferably 0.2 to 50 millimoles. When the amount used is too small, the amount of the modified groups introduced into the modified conjugated diene polymer becomes small, and thus only a small modifying effect is exhibited. When the amount used is too large, an unreacted modifier, undesirably, remains in the modified conjugated diene polymer and the removal thereof takes labor.

The modification reaction is performed by the following methods: a method in which after the polymerization reaction, the modifier and then a polymerization terminator are added thereto, and the solvent and unreacted monomers remaining the reaction product are removed in a steam stripping method or a vacuum drying method; a method in which after the addition of a polymerization terminator, the modifier is added thereto; a method in which after the dried polymer is resolved in a solvent, the modifier and a catalyst are added thereto, and the like. As some polymerization terminators may reduce the activity of that site of the polymer which is reacted with the modifier, depending on the kind of the polymerization terminator, methods in which the modifier is added before the polymerization is stopped are preferable.

In the present invention, the degree of modification of the modified conjugated diene polymer is calculated using a gel permeation chromatography (GPC) measurement. The method will be explained in detail using a modified cis-1,4-polybutadiene as an example referring to FIG. 1.

In FIG. 1, a vertical axis shows a value of UV/RI, a ratio of a peak area UV determined from a UV absorbance at 274 nm of a polymer, obtained from a GPC measurement, and a peak area RI obtained from a differential refractive index (RI).

A horizontal axis represents a value of $(1/Mn) \times 10^4$, wherein Mn is a number average molecular weight. In FIG. 1, Li-BR (unmodified) represents a line obtained by plotting UV/RI values of a polymer itself obtained by polymerizing 1,3-butadiene according to a living anionic polymerization using an Li catalyst, relative to a polymer having a different number average molecular weight Mn, which can be approximated to a straight line. In addition, Li-BR (modified) is a line obtained by plotting, relative to a polymer having a different number average molecular weight Mn, UV/RI values of a polymer obtained by performing a living anionic polymerization using an Li catalyst, and then modifying the resulting product by reacting polymerization terminals with a pre-determined modifier, which can be approximated to a straight line.

In the case of the living anionic polymerization, since one molecule of a polymer and one molecule of a modifier are quantitatively reacted with each other, a difference between a UV/RI value on the Li-BR (modified) and a UV/RI value on the Li-BR (unmodified) at a certain number average molecular weight (Mn 1) is defined as A. The difference shows a variation in the UV/RI value when one molecular chain having the number average molecular weight (Mn 1) is reacted with one molecule of the modifier, and thus a degree of modification can be calculated based on the value described above.

In the same manner as in the case of the Li-BR, UV/RI values are calculated respectively for a modified cis-1,4-polybutadiene having a certain number average molecular weight (Mn 1) of the present invention, and a non-modified cis-1,4-polybutadiene obtained by the same manner as that of the modified polymer above, and a difference between them is defined as B. The degree of modification of the modified cis-1,4-polybutadiene of the present invention is shown by the following formula:

$$\text{Degree of Modification} = B/A \qquad \text{[Mathematical Formula 1]}$$

The degree of modification of the modified conjugated diene polymer of the present invention is not particularly limited, and it is preferably more than 0.1, more preferably more than 0.5, further more preferably more than 0.7. The degree of modification is also preferably less than 20, more preferably less than 15, further preferably less than 10. When the degree of modification is 0.1 or less, the effects obtained by the modification may sometimes be insufficient; whereas when the degree of modification is 20 or more, the original properties of the conjugated diene polymer may sometimes be deteriorated. Within a range of a preferable degree of modification, dispersibility of filler can be improved in a rubber due to an interaction of polar groups of the modifier groups (an amino group, an alkoxy group, and the like) with polar groups of the filler.

(Production Method of Vinyl.Cis-Polybutadiene (VCR))
Further, according to the present invention, there is provided a method for producing a polybutadiene including a cis-1,4 polymerization of a 1,3-butadiene, and then a syndiotactic-1,2 polymerization in the resulting polymerization system, wherein a catalyst for a conjugated diene polymerization (the catalyst for a conjugated diene polymerization of the present invention) including a non-metallocene type gadolinium compound (A) represented by the following general formula (1), an ionic compound (B) formed of a non-coordinating anion and a cation, and an organic metal compound (C) of an element selected from the group consisting of a group 2, a group 12, and a group 13 of the periodic table is used as a catalyst for the cis-1,4 polymerization, and a catalyst system containing a sulfur compound is used as a catalyst for the syndiotactic-1,2 polymerization, to obtain a vinyl•cis-polybutadiene; and further provided a vinyl•cis-polybutadiene (VCR) obtained according to the method described above. The inventions will be explained in detail below.

The component (A), the gadolinium compound, of the cis-1,4 polymerization catalyst system in the present invention is preferably a non-metallocene type gadolinium compound represented by the general formula (1) described above, but other gadolinium compounds may be used so long as they are soluble in a non-polar organic solvent. Examples thereof may include gadolinium salts, halogenated gadolinium, gadolinium alkoxides, non-metallocene type gadolinium complexes, and the like.

The gadolinium salt described above may include, for example, gadolinium acetate, gadolinium oxalate, gadolinium nitrate, gadolinium hydroxide, and the like.

The halogenated gadolinium described above may include, for example, gadolinium fluoride, gadolinium chloride, gadolinium bromide, gadolinium iodide, and the like.

The gadolinium alkoxide described above may include, for example, trimethoxygadolinium, triethoxygadolinium, tripropoxygadolinium, triisopropoxygadolinium, tributoxygadolinium, and the like.

As for the cis-1,4 polymerization component in the vinyl•cis-polybutadiene obtained in the present invention, a cis-1,4-polybutadiene having 90% or more, more preferably 92% or more, particularly preferably 96% or more, of cis-1,4 structures is preferable. The [η] of the cis-1,4 polymerization component can be controlled to preferably from 0.1 to 10.0, more preferably from 1.0 to 7.0, particularly preferably from 1.5 to 5.0.

Subsequently, using the thus obtained cis-1,4 polymerization reaction mixture as above, the syndiotactic-1,2 polymerization is performed in this polymerization system. At that time, 1,3-butadiene may be or may not be newly added thereto. It is preferable to use a catalyst system containing a sulfur compound as a catalyst in the syndiotactic-1,2 polymerization.

A catalyst system including a trialkyl aluminum compound represented by $R^1{}_3Al$ wherein $R^1$ shows a hydrocarbon group having 1 to 10 carbon atoms, a sulfur compound, or a cobalt compound is preferably used as the catalyst for the syndiotactic-1,2 polymerization.

The trialkyl aluminum compound represented by $R^1{}_3Al$ (wherein $R^1$ shows a hydrocarbon group having 1 to 10 carbon atoms) may include triethyl aluminum, trimethyl aluminum, triisobutyl aluminum, trihexyl aluminum, trioctyl aluminum, and the like. Of these, triethyl aluminum is preferable.

The sulfur compound may include carbon disulfide, phenyl isothiocyanate, xanthogenic acid compounds, and the like. Of these, carbon disulfide is preferable.

Salts and complexes of cobalt are preferably used as the cobalt compound. Particularly preferable examples thereof may include cobalt salts such as cobalt chloride, cobalt bromide, cobalt nitride, cobalt 2-ethyl hexanate, cobalt naphthenate, cobalt acetate, and cobalt malonate; bis-acetylacetonate or tris-acetylacetonate of cobalt; ethyl acetoacetate cobalt; triallyl phosphine complexes, trialkyl phosphine complexes, organic base complexes such as pyridine complexes and picoline complexes of a halogenated cobalt; ethyl alcohol complexes of a halogenated cobalt, and the like. Of these, cobalt 2-ethyl hexanate is preferable.

The trialkyl aluminum compound is contained in an amount of preferably 0.1 millimoles or more per mole of the 1,3-butadiene, particularly preferably 0.5 to 50 millimoles. The cobalt compound is contained in an amount of preferably 0.001 millimoles or more per mole of the 1,3-butadiene, particularly preferably 0.01 to 1 millimole. The concentration of the sulfur compound is 20 millimoles/L or less, particularly preferably 0.01 to 10 millimoles/L. Water may be or may not be added to the syndiotactic-1,2 polymerization, and when water is added, the amount thereof is 1.1 millimoles or less per millimole of the trialkyl aluminum compound, preferably 1 millimole or less.

The 1,2-polymerization of the 1,3-butadiene is performed at a temperature within a range of 0 to 100° C., preferably 10 to 100° C., further more preferably 20 to 100° C. When the 1,3-butadiene is added in an amount of 1 to 50 parts by weight, based on 100 parts by weight of the cis-polymerization solution, preferably 1 to 20 parts by weight, to the 1,2-polymerization system, a yield of the 1,2-polybutadiene can be increased in the 1,2-polymerization. The polymerization time (the average retention time) is within a range of preferably 10 minutes to 2 hours. The polymerization tank is used alone or two or more tanks are connected. The polymerization is performed by stirring and mixing the polymerization solution in the polymerization tank (the polymerization vessel). A polymerization tank equipped with a stirrer for liquid with a high viscosity, for example an apparatus described in JP-40-2645 B, can be used as the polymerization tank used in the 1,2-polymerization, because the viscosity is increased during the 1,2-polymerization and the polymer easily adheres.

After a rate of the polymerization reaction reaches a pre-determined value, a known antioxidant may be added in a conventional method. Examples of the antioxidant may include phenol antioxidants such as 2,6-di-t-butyl-p-cresol (BHT), phosphorus antioxidants such as trinonylphenyl phosphite (TNP), sulfur oxidants such as dilauryl-3,3'-thiodipropionate (TPL), and the like. The antioxidant may be used alone or as a mixture. The antioxidant is added in an amount of 0.001 to 5 parts by weight based on 100 parts by weight of the vinyl•cis-polybutadiene. Then, a polymerization terminator is added to the polymerization system to stop the polymerization. There are, for example, methods already known in which after the polymerization reaction is finished, the polymerization solution is supplied to a tank for stopping the polymerization, and a large amount of an alcohol such as methanol or ethanol or a polar solvent such as water is poured into the polymerization solution; and in which an inorganic acid such as hydrochloric acid or sulfuric acid, an organic acid such as acetic acid or benzoic acid, or hydrogen chloride gas is introduced into the polymerization solution. Subsequently, the produced vinyl•cis-polybutadiene is separated, washed and dried according to a conventional method.

The thus obtained vinyl•cis-polybutadiene contains 3 to 30% by weight of (I) a boiling n-hexane-insoluble component (H.I.), and 97 to 70% by weight of (II) a boiling n-hexane-soluble component. The boiling n-hexane-soluble component is a cis-1,4-polybutadiene having 90% or more of microstructures. The H.I. is an SPB having a melting point of 180 to 215° C. ML is from 20 to 200 at 100° C., preferably from 25 to 100, more preferably from 30 to 70. The syndiotactic 1,2-polybutadiene dispersed in the vinyl•cis-polybutadiene is uniformly dispersed in the matrix of the cis-1,4-polybutadiene as fine crystals.

The vinyl•cis-polybutadiene obtained according to the present invention alone or blended with another synthetic rubber or natural rubber, which is subjected to an oil extension with a process oil if necessary, is added with a filler such as carbon black, a vulcanizing agent, a vulcanization accelerator, and other compounding agents usually used to vulcanize it. It is useful for a tire, and is used as an application of rubber requiring mechanical properties and abrasion resistance such as a tread, a side wall, a stiffener, a bead filler, an inner liner, a carcass, a hose, a belt, and other various industrial products. It also can be used as a modifier for plastic materials.

(Conjugated Diene Polymer Composition and Modified Conjugated Diene Polymer Composition)

The conjugated diene polymer composition of the present invention includes preferably a conjugated diene polymer ($\alpha$), and a diene polymer ($\beta$) other than the ($\alpha$), and a rubber-reinforcing agent ($\gamma$). The modified conjugated diene polymer composition of the present invention includes preferably a modified conjugated diene polymer ($\alpha'$), a diene polymer ($\beta$) other than the ($\alpha'$), and a rubber-reinforcing agent ($\gamma$). Specifically, the conjugated diene polymer or the modified conjugated diene polymer of the present invention alone or blended with another synthetic rubber or natural rubber, which is subjected to an oil extension with a process oil if necessary, is added with a filler such as carbon black, a vulcanizing agent, a vulcanization accelerator, and other compounding agents usually used to vulcanize it. It is used as an application of rubber requiring mechanical properties and abrasion resistance such as a tire, a hose, a belt, and other various industrial products. It also can be used as a modifier for plastic materials.

The ($\gamma$) component, the rubber-reinforcing agent, used in the present invention may include inorganic reinforcing agents such as various carbon blacks, silica, activated calcium carbonate, and ultrafine particles of magnesium silicate.

The carbon black has preferably a particle size of 90 nm or less and a dibutyl phthalate (DBP) oil absorption of 70 ml/100 g or more. Examples thereof may include FEF, FF, GPF, SAF, ISAF, SRF, HAF, and the like.

As for the mixing proportion of the conjugated diene polymer composition and the modified conjugated diene polymer composition of the present invention, it is preferable that 100 parts by weight of the rubber components ($\alpha$)+($\beta$) or ($\alpha'$)+($\beta$) are mixed with 20 to 120 parts by weight of the rubber-reinforcing agent ($\gamma$). The rubber components ($\alpha$)+($\beta$) or ($\alpha'$)+($\beta$) are formed of 90 to 5 parts by weight of the conjugated diene polymer composition ($\alpha$) or the modified conjugated diene polymer composition ($\alpha'$) and 10 to 95 parts by weight of the diene polymer ($\beta$) other than the ($\alpha$) or ($\alpha'$).

The diene polymer ($\beta$) other than the ($\alpha$) or ($\alpha'$), contained in the conjugated diene polymer composition or the modified conjugated diene polymer composition is preferable a vulcanizable rubber, and specific examples thereof may include ethylene propylene diene rubber (EPDM), nitrile rubber (NBR), butyl rubber (IIR), chloroprene rubber (CR), polyisoprene, high cis-polybutadiene rubber, low cis-polybutadiene rubber (BR), styrene-butadiene rubber (SBR), butyl rubber, chlorinated butyl rubber, brominated butyl rubber, acrylonitrile-butadiene rubber, and the like. Of these, SBR is preferable. Of the SBR, styrene-butadiene copolymer rubber obtained by a solution polymerization (S-SBR) is particularly preferable. The rubber may be used alone or as a mixture of two or more kinds.

It is also used as a modifying agent for plastic materials such as an impact-resistant polystyrene; in other word, an impact-resistant polystyrene resin composition or rubber-modified impact-resistant polystyrene resin composition can be produced.

(Rubber Composition for Tire and Rubber Composition for Rubber Belt) The conjugated diene polymer composition and the modified conjugated diene polymer composition of the present invention can be preferably used as a rubber composition for a tire and a rubber composition for a rubber belt by adjusting a mixing ratio of the rubber components ($\alpha$)+($\beta$) or ($\alpha'$)+($\beta$) and the rubber-reinforcing agent ($\gamma$).

The rubber composition for a tire contains the rubber components ($\alpha$)+($\beta$) or ($\alpha'$)+($\beta$) of the conjugated diene polymer ($\alpha$) or the modified conjugated diene polymer composition ($\alpha'$) and the diene polymer ($\beta$) other than the ($\alpha$) or ($\alpha'$), and the rubber-reinforcing agent ($\gamma$), and it is preferable that the rubber-reinforcing agent ($\gamma$) is contained in an amount of 30 to 80 parts by mass based on 100 parts by mass of the rubber components ($\alpha$)+($\beta$) or ($\alpha'$)+($\beta$).

In the rubber composition for a tire according to the present invention, the diene polymer ($\beta$) other than the conjugated diene polymer ($\alpha$) or the modified conjugated diene polymer composition ($\alpha'$) is used, and it is preferable to blend the diene polymer ($\beta$) other than the conjugated diene polymer ($\alpha$) or the modified conjugated diene polymer composition ($\alpha'$) in an amount of 10 to 95 parts by mass based on 90 to 5 parts by mass of the conjugated diene polymer ($\alpha$) or the modified conjugated diene polymer composition ($\alpha'$). At least one of the natural rubber and the polyisoprene is preferably used as the diene polymer ($\beta$).

The rubber-reinforcing agent ($\gamma$) blended with the rubber composition for a tire of the present invention may include various carbon blacks, silica, activated calcium carbonate, ultrafine particles of magnesium silicate, talc, mica, and the like. Of these, at least one of carbon black and silica is preferable. A carbon black having a particle size of 90 nm or less and a dibutyl phtharate (DBP) oil absorption of 70 ml/100 g or more is particularly preferable. For example, FEF, FF, GPF, SAF, ISAF, SRF, HAF, and the like are used.

As the rubber-reinforcing agent ($\gamma$) blended with the rubber composition for a tire, fullerene described in JP 2006-131819 may be used. The fullerene may include C60, C70, a mixture of C60 and C70, and derivatives thereof.

The fullerene derivative may include PCBM (Phenyl C61-butyric acid methyl ester), PCBNB (Phenyl C61-butyric acid n-butyl ester), PCBIB (Phenyl C61-butyric acid I-butyl ester), C70 PCBM (Phenyl C71-butyric acid methyl ester), and the like. In addition, fullerene hydroxide, fullerene oxide, hydrogenated fillerene and the like may be used.

In the rubber composition for a tire according to the present invention, the rubber-reinforcing agent ($\gamma$) is blended in an amount of 30 to 80 parts by mass, based on 100 parts by mass of the rubber components ($\alpha$)+($\beta$) or ($\alpha'$)+($\beta$), which are formed of the conjugated diene polymer ($\alpha$) or the modified conjugated diene polymer composition ($\alpha'$) and the diene polymer ($\beta$) other than the ($\alpha$) or ($\alpha'$), preferably 40 to 70 parts by mass.

In the present invention, a rubber component including the conjugated diene polymer ($\alpha$) or the modified conjugated diene polymer composition ($\alpha'$), the diene polymer ($\beta$) other than the ($\alpha$) or ($\alpha'$), and the rubber-reinforcing agent ($\gamma$), has a JIS A hardness of preferably 55 to 80°, particularly preferably 60 to 75°.

When the JIS A hardness of the rubber component is 55° or less, cut resistance is undesirably decreased. On the other hand, when the JIS A hardness of the rubber component is more than 80°, rubber chipping may possibly occur.

The rubber composition for a belt includes the rubber components (α)+(β) or (α')+(β), which are formed of the conjugated diene polymer (α) or the modified conjugated diene polymer composition (α') and the diene polymer (β) other than the (α) or (α'), and the rubber-reinforcing agent (γ), and it is preferable that the rubber-reinforcing agent (γ) is included in an amount of 20 to 70 parts by mass based on 100 parts by mass of the rubber components (α)+(β).

In the rubber composition for a belt according to the present invention, the diene polymer (β) other than the conjugated diene polymer (α) or the modified conjugated diene polymer composition (α') is used, and it is preferable to blend the diene polymer (β) other than the conjugated diene polymer (α) or the modified conjugated diene polymer composition (α') in an amount of 10 to 95 parts by mass based on 90 to 5 parts by mass of the conjugated diene polymer (α) or the modified conjugated diene polymer composition (α'). At least one of the natural rubber and the polyisoprene is preferably used as the diene polymer (β).

The rubber-reinforcing agent (γ) blended with the rubber composition for a belt of the present invention may include various carbon blacks, silica, activated calcium carbonate, ultrafine particles of magnesium silicate, talc, mica, and the like. Of these, at least one of carbon black and silica is preferable. A carbon black having a particle size of 90 nm or less and a dibutyl phtharate (DBP) oil absorption of 70 ml/100 g or more is particularly preferable. For example, FEF, FF, GPF, SAF, ISAF, SRF, HAF, and the like are used.

In the rubber composition for a belt according to the present invention, the rubber-reinforcing agent (γ) is blended in an amount of 20 to 70 parts by mass, preferably 30 to 60 parts by mass, based on 100 parts by mass of the rubber components (α)+(β) or (α')+(β), which are formed of the conjugated diene polymer (α) or the modified conjugated diene polymer composition (α') and the diene polymer (β).

The rubber composition for a tire or the rubber composition for a rubber belt according to the present invention can be obtained by kneading the components described above through a usually used Banbury kneader, open roll, kneader, or twin screw kneader.

The rubber composition for a tire or the rubber composition for a rubber belt may be kneaded with compounding agents usually used in the rubber field, such as a vulcanizing agent, a vulcanization aid, an antioxidant, a filler, a process oil, zinc white, and stearic acid.

As the vulcanizing agent, known vulcanizing agents such as sulfur, organic peroxides, resin vulcanizing agents, metal oxides such as magnesium oxide are used. The vulcanizing agent is preferably blended in an amount of about 0.5 to 3 parts by weight based on 100 parts by weight of the rubber components (α)+(β) or (α')+(β).

As the vulcanization aid, known vulcanization aids such as aldehydes, ammonia, amines, guanidines, thioureas, thiazoles, thiurams, dithiocarbamates, and xanthates are used.

The antioxidant may include amine-ketone antioxidants, imidazole antioxidants, amine antioxidants, phenol antioxidants, sulfur antioxidants, phosphorus antioxidants, and the like.

The filler may include inorganic fillers such as calcium carbonate, basic magnesium carbonate, clay, Lissajous, and diatomaceous earth, and organic fillers such as regenerated rubber and powdery rubber.

As the process oil, any of aromatic oil, naphthene oil, and paraffin oil may be used.

EXAMPLES

Examples based on the present invention will be specifically described below. First, measurement methods of physical properties are as follows:

Measurement of Gd Content: The measurement was performed according to an ICP emission spectrometry. In the measurement, Vista MPX, manufactured by Barian Japan KK, was used.

Elemental Analysis: The analysis was performed using CHN Coder MT-5, manufactured by Yanaco Co., Ltd.

Microstructure: It was determined according to an infrared absorption spectrum analysis. A microstructure was calculated from absorption intensity ratios at cis-740 cm$^{-1}$, trans-967 cm$^{-1}$, and vinyl-910 cm$^{-1}$.

Intrinsic Viscosity [η]: The viscosity was measured at 30° C. using a toluene solution of a polymer.

Productivity: It shows a polymer yield (g) per mmol of a central metal of a catalyst used in a polymerization reaction, per hour of a polymerization time. For example, when a catalyst is a gadolinium compound, it is a polymer yield (g) per mmol of gadolinium metal in the gadolinium compound used in a polymerization reaction, per hour of a polymerization time.

Number Average Molecular Weight (Mn) and Weight Average Molecular Weight (Mw): A molecule weight distribution curve was obtained according to a method using GPC (manufactured by Shimadzu Corporation), in which polystyrene as a standard substance and tetrahydrofuran as a solvent were used, at a temperature of 40° C., and calculation was performed using a calibration curve obtained from the molecule weight distribution curve to obtain a number average molecular weight and a weight average molecular weight.

Molecule Weight Distribution: It was evaluated by a ratio of Mw/Mn, a weight average molecular weight Mw to a number average molecular weight Mn, which were obtained from GPC using polystyrene as the standard substance.

Mooney Viscosity ($ML_{1+4}$, 100° C.): The viscosity was obtained in accordance with JIS-K 6300 by pre-heating a rubber at 100° C. for one minute and then measuring the viscosity for 4 minutes using a Mooney viscometer, manufactured by Shimadzu Corporation. The obtained value was shown as a Mooney viscosity of the rubber ($ML_{1+4}$, 100° C.).

Differential Scanning calorimetry (DSC): The measurement was performed using a DSC apparatus, manufactured by Seiko Instruments Inc., in a nitrogen atmosphere at a temperature range of −150° C. to 100° C. at a temperature elevation rate of 10° C./minute.

SPB Content: The content was obtained from a fusion heat amount measured by using a differential scanning calorimeter (DSC-50 manufactured by Shimadzu Corporation), and an H. I. calibration curve obtained in an actual H. I. measurement. The actual value of H. I. was a remaining extract amount in parts by weight after 2 g of vinyl•cis-polybutadiene rubber was extracted with boiling in 200 ml of n-hexane for 4 hours in a Soxhlet's extractor.

(Evaluation of Composition)

Tensile Strength: The strength was measured in accordance with JIS K 6252, and was shown as an index relative to a value in Comparative Examples, described in each Table, defined as 100 (the higher the index, the better the tensile strength).

Tensile Stress: A 100% tensile stress and a 300% tensile stress were measured in accordance with JIS K 6251, and were shown as an index relative to a value in Comparative Example, described in each Table, defined as 100 (the higher the index, the better the tensile stress).

Rebound Resilience: The rebound resilience was measured in accordance with JIS K 6255 using a Dunlop tripsometer at room temperature, and was shown as an index relative to a value in Comparative Example, described in each Table, defined as 100 (the higher the index, the better the rebound resilience).

Elongation Fatigue Resistance: Using a fixed elongation tester (manufactured by Ueshima Seisakusho Co., Ltd.), a test specimen, which was a dumbbell-shaped No. 3 (JIS-K 6251) specimen having a 0.5 mm-cut at the central part, was broken under conditions of an initial strain of 50% and 300 times/minute. And the breaking number of times was determined. The results were shown as an index relative to a value in Comparative Example, described in each Table, defined as 100 (the higher the index, the better the elongation fatigue resistance).

Abrasion Resistance: A Lambourn abrasion resistance was measured in accordance with JIS-K 6264 at a slip rate of 20% or 40%, and is shown as an index relative to a value in Comparative Example, described in each Table, defined as 100 (the higher the index, the better the abrasion resistance).

Low Exothermic Property and Permanent Set: The measurement was performed in accordance with JIS K 6265. The results were shown as an index relative to a value in Comparative Example, described in each Table, defined as 100 (the higher the index, the better the calorific value and the permanent stress).

Low Fuel Consumption (tan δ): It was measured using a viscoelasticity measuring apparatus (RPA 2000 manufactured by Alpha Technologies Ltd.) at a temperature of 30° C., 50° C. or 60° C., a frequency of 1 Hz, and a dynamic strain of 3% or 10%. The results were shown as an index relative to a value in Comparative Example, described in each Table, defined as 100 (the higher the index, the better the law fuel consumption).

Die Swell: Using a processability measurering apparatus (MPT manufactured by Monsanto Company), a ratio of a cross-sectional area of a formulation when extruded at 100° C. at a shear velocity of 100 sec$^{-1}$, which was used as a standard of an extrusion-processability of a formulation, and a cross-sectional area of a die orifice (wherein L/D=1.5 mm/1.5 mm) were obtained (The higher the index, the better the die swell).

Strain-Dependency of Storage Elastic Modulus (G') (Payne effect): A dynamic strain analysis was performed using a rubber processability analyzing apparatus RPA-2000, manufactured by Alpha Technologies Ltd., at 120° C. at a frequency of 1 Hz. The Payne effect was shown as an index of a ratio of a G' at 45% strain to a G' at 1.1% strain (G' 25%/G' 0.5%), comparing to a ratio in Comparative Example 12 defined as 100. The higher the index, the better the dispersivility of a reinforcing agent.

Filler Gel: In a metal net was put 1 g of a unvulcanized rubber, which was cut into 1 mm squares, which was immersed in toluene having a temperature of 30° C. for 3 days, and then the resulting insoluble matter in toluene was dried at 100° C. for 2 hours. A weight obtained by subtracting a weight of fillers and zinc oxide from a weight of the dried insoluble matter in toluene corresponds to a filler gel amount in 1 g of the unvulcanized rubber.

Example 1

An inside of an autoclave with an inner capacity of 1.5 L was substituted by nitrogen, and a solution including 245 ml of a cyclohexane solvent and 250 ml of butadiene was filled therein. Subsequently, 1.5 ml of a cyclohexane solution (2 mol/L) of triethyl aluminum (TEAL) was added thereto. Next, 1.35 ml of a toluene solution (0.003 mol/L) of tris(2,2,6,6-tetramethyl-3,5-heptanedionato)gadolinium (Gd(dpm)$_3$), followed by 2.0 ml of a toluene solution (0.004 mol/L) of triphenylcarbenium tetrakis(pentafluorophenyl)borate were added. After a polymerization was performed at 40° C. for 25 minutes, 3 ml of an ethanol solution containing an antioxidant was added to stop the polymerization. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 1.

Example 2

An inside of an autoclave with an inner capacity of 1.5 L was substituted by nitrogen, and a solution including 245 ml of a cyclohexane solvent and 250 ml of butadiene was filled therein. Subsequently, 0.5 ml of a toluene solution (2 mol/L) of triethyl aluminum (TEAL) was added thereto. Next, 0.8 ml of a toluene solution (0.005 mol/L) of tris(2,2,6,6-tetramethyl-3,5-heptanedionato)gadolinium (Gd(dpm)$_3$), followed by 2.0 ml of a toluene solution (0.004 mol/L) of triphenylcarbenium tetrakis(pentafluorophenyl)borate were added. After a polymerization was performed at 40° C. for 25 minutes, 3 ml of an ethanol solution containing an antioxidant was added to stop the polymerization. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 1.

Example 3

An inside of an autoclave with an inner capacity of 1.5 L was substituted by nitrogen, and a solution including 245 ml of a cyclohexane solvent and 250 ml of butadiene was filled therein. Subsequently, 1.5 ml of a cyclohexane solution (2 mol/L) of triethyl aluminum (TEAL) was added thereto. Next, 1.35 ml of a toluene solution (0.003 mol/L) of tris(2,2,6,6-tetramethyl-3,5-heptanedionato)gadolinium (Gd(dpm)$_3$), followed by 2.0 ml of a toluene solution (0.004 mol/L) of triphenylcarbenium tetrakis(pentafluorophenyl)borate were added. After a polymerization was performed at 40° C. for 15 minutes, 3 ml of an ethanol solution containing an antioxidant was added to stop the polymerization. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 1.

Example 4

An inside of an autoclave with an inner capacity of 1.5 L was substituted by nitrogen, and a solution including 245 ml of a cyclohexane solvent and 250 ml of butadiene was filled therein. Subsequently, 1.5 ml of a cyclohexane solution (2 mol/L) of triethyl aluminum (TEAL) was added thereto. Next, 1.35 ml of a toluene solution (0.003 mol/L) of tris(2,2,6,6-tetramethyl-3,5-heptanedionato)gadolinium (Gd(dpm)$_3$), followed by 2.0 ml of a toluene solution (0.004 mol/L) of triphenylcarbenium tetrakis(pentafluorophenyl)

borate were added. After a polymerization was performed at 40° C. for 35 minutes, 3 ml of an ethanol solution containing an antioxidant was added to stop the polymerization. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 1.

Example 5

An inside of an autoclave with an inner capacity of 1.5 L was substituted by nitrogen, and a solution including 245 ml of a cyclohexane solvent and 250 ml of butadiene was filled therein. Subsequently, 1.5 ml of a cyclohexane solution (2 mol/L) of triethyl aluminum (TEAL) was added thereto. Next, 1.35 ml of a toluene solution (0.003 mol/L) of tris(2,2,6,6-tetramethyl-3,5-heptanedionato)gadolinium (Gd (dpm)$_3$), followed by 2.0 ml of a toluene solution (0.004 mol/L) of triphenylcarbenium tetrakis(pentafluorophenyl) borate were added. After a polymerization was performed at 40° C. for 50 minutes, 3 ml of an ethanol solution containing an antioxidant was added to stop the polymerization. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 1.

Example 6

An inside of an autoclave with an inner capacity of 1.5 L was substituted by nitrogen, and a solution including 545 ml of a cyclohexane solvent and 550 ml of butadiene was filled therein. Subsequently, 3.3 ml of a cyclohexane solution (2 mol/L) of triethyl aluminum (TEAL) was added thereto. Next, 0.44 ml of a toluene solution (0.02 mol/L) of tris(2, 2,6,6-tetramethyl-3,5-heptanedionato)gadolinium (Gd(dpm)$_3$), followed by 4.4 ml of a toluene solution (0.004 mol/L) of triphenylcarbenium tetrakis(pentafluorophenyl) borate were added. After a polymerization was performed at 40° C. for 25 minutes, 4 ml of an ethanol solution containing an antioxidant was added to stop the polymerization. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 1.

Example 7

An inside of an autoclave with an inner capacity of 1.5 L was substituted by nitrogen, and a solution including 245 ml of a cyclohexane solvent and 250 ml of butadiene was filled therein. Subsequently, 0.75 ml of a cyclohexane solution (2 mol/L) of triethyl aluminum (TEAL) was added thereto. Next, 0.4 ml of a cyclohexane solution (0.005 mol/L) of tris(2,2,6,6-tetramethyl-3,5-heptanedionato)gadolinium (Gd (dpm)$_3$), followed by 1.0 ml of a toluene solution (0.004 mol/L) of triphenylcarbenium tetrakis(pentafluorophenyl) borate were added. After a polymerization was performed at 50° C. for 25 minutes, 3 ml of an ethanol solution containing an antioxidant was added to stop the polymerization. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 1.

Example 8

An inside of an autoclave with an inner capacity of 1.5 L was substituted by nitrogen, and a solution including 245 ml of a cyclohexane solvent and 250 ml of butadiene was filled therein. Subsequently, 1.0 ml of a cyclohexane solution (2 mol/L) of triethyl aluminum (TEAL) was added thereto. Next, 0.4 ml of a cyclohexane solution (0.005 mol/L) of tris(2,2,6,6-tetramethyl-3,5-heptanedionato)gadolinium (Gd (dpm)$_3$), followed by a 1.0 ml of a toluene solution (0.004 mol/L) of triphenylcarbenium tetrakis(pentafluorophenyl) borate were added. After a polymerization was performed at 50° C. for 25 minutes, 3 ml of an ethanol solution containing an antioxidant was added to stop the polymerization. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 1.

Example 9

An inside of an autoclave with an inner capacity of 1.5 L was substituted by nitrogen, and a solution including 245 ml of a cyclohexane solvent and 250 ml of butadiene was filled therein. Subsequently, 1.25 ml of a cyclohexane solution (2 mol/L) of triethyl aluminum (TEAL) was added thereto. Next, 0.4 ml of a cyclohexane solution (0.005 mol/L) of tris(2,2,6,6-tetramethyl-3,5-heptanedionato)gadolinium (Gd (dpm)$_3$), followed by 1.0 ml of a toluene solution (0.004 mol/L) of triphenylcarbenium tetrakis(pentafluorophenyl) borate were added. After a polymerization was performed at 50° C. for 25 minutes, 3 ml of an ethanol solution containing an antioxidant was added to stop the polymerization. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 1.

Example 10

An inside of an autoclave with an inner capacity of 1.5 L was substituted by nitrogen, and a solution including 245 ml of a cyclohexane solvent and 250 ml of butadiene was filled therein. Subsequently, 1.5 ml of a cyclohexane solution (2 mol/L) of triethyl aluminum (TEAL) was added thereto. Next, 0.4 ml of a cyclohexane solution (0.005 mol/L) of tris(2,2,6,6-tetramethyl-3,5-heptanedionato)gadolinium (Gd (dpm)$_3$), followed by 1.0 ml of a toluene solution (0.004 mol/L) of triphenylcarbenium tetrakis(pentafluorophenyl) borate were added. After a polymerization was performed at 50° C. for 25 minutes, 3 ml of an ethanol solution containing an antioxidant was added to stop the polymerization. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 1.

Example 11

An inside of an autoclave with an inner capacity of 1.5 L was substituted by nitrogen, and a solution including 245 ml of a toluene solvent and 250 ml of butadiene was filled therein. Subsequently, 0.75 ml of a toluene solution (2 mol/L) of triethyl aluminum (TEAL) was added thereto. Next, 0.6 ml of a toluene solution (0.005 mol/L) of tris(2,2,6,6-tetramethyl-3,5-heptanedionato)gadolinium (Gd(dpm)$_3$), followed by 1.5 ml of a toluene solution (0.004 mol/L) of triphenylcarbenium tetrakis(pentafluorophenyl)borate were added. After a polymerization was performed at 50° C. for 25 minutes, 3 ml of an ethanol solution containing an antioxidant was added to stop the polymerization. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 1.

Example 12

An inside of an autoclave with an inner capacity of 1.5 L was substituted by nitrogen, and a solution including 245 ml of a toluene solvent and 250 ml of butadiene was filled therein. Subsequently, 0.75 ml of a toluene solution (2 mol/L) of triethyl aluminum (TEAL) was added thereto. Next, 0.6 ml of a toluene solution (0.005 mol/L) of tris(2,2,6,6-tetramethyl-3,5-heptanedionato)gadolinium (Gd(dpm)$_3$), followed by 1.5 ml of a toluene solution (0.004 mol/L) of triphenylcarbenium tetrakis(pentafluorophenyl)borate were added. After a polymerization was performed at 60° C. for 25 minutes, 3 ml of an ethanol solution containing an antioxidant was added to stop the polymerization. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 1.

Example 13

An inside of an autoclave with an inner capacity of 1.5 L was substituted by nitrogen, and a solution including 245 ml of a toluene solvent and 250 ml of butadiene was filled therein. Subsequently, 0.75 ml of a toluene solution (2 mol/L) of triethyl aluminum (TEAL) was added thereto. Next, 0.6 ml of a toluene solution (0.005 mol/L) of tris(2,2,6,6-tetramethyl-3,5-heptanedionato)gadolinium (Gd(dpm)$_3$), followed by 1.5 ml of a toluene solution (0.004 mol/L) of triphenylcarbenium tetrakis(pentafluorophenyl)borate were added. After a polymerization was performed at 70° C. for 23 minutes, 3 ml of an ethanol solution containing an antioxidant was added to stop the polymerization. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 1.

Example 14

An inside of an autoclave with an inner capacity of 1.5 L was substituted by nitrogen, and 500 ml of a solution including butadiene/2-butene/cyclohexane (44.5/29.5/24.9% by weight) was filled therein. Subsequently, 1.5 ml of a cyclohexane solution (2 mol/L) of triethyl aluminum (TEAL) was added thereto. Next, 1.5 ml of a cyclohexane solution (0.005 mol/L) of tris(2,2,6,6-tetramethyl-3,5-heptanedionato)gadolinium (Gd(dpm)$_3$), followed by 3.75 ml a toluene solution (0.004 mol/L) of triphenylcarbenium tetrakis(pentafluorophenyl)borate were added. After a polymerization was performed at 40° C. for 25 minutes, 3 ml of an ethanol solution containing an antioxidant was added to stop the polymerization. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 1.

Example 15

An inside of an autoclave with an inner capacity of 1.5 L was substituted by nitrogen, and 500 ml of a solution including butadiene/2-butene/cyclohexane (44.5/29.5/24.9% by weight) was filled therein. Subsequently, 1.5 ml of a cyclohexane solution (2 mol/L) of triethyl aluminum (TEAL) was added thereto. Next, 1.5 ml of a cyclohexane solution (0.005 mol/L) of tris(2,2,6,6-tetramethyl-3,5-heptanedionato)gadolinium (Gd(dpm)$_3$), followed by 3.75 ml of a toluene solution (0.004 mol/L) of triphenylcarbenium tetrakis(pentafluorophenyl)borate were added. After a polymerization was performed at 50° C. for 25 minutes, 3 ml of an ethanol solution containing an antioxidant was added to stop the polymerization. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 1.

Example 16

An inside of an autoclave with an inner capacity of 1.5 L was substituted by nitrogen, and a solution including 245 ml of a cyclohexane solvent and 250 ml of butadiene was filled therein. Subsequently, 1.0 ml of a cyclohexane solution (2 mol/L) of triethyl aluminum (TEAL) was added thereto. Next, 0.3 ml of a cyclohexane solution (0.005 mol/L) of tris(2,2,6,6-tetramethyl-3,5-heptanedionato)gadolinium (Gd(dpm)$_3$), followed by 0.75 ml of a toluene solution (0.004 mol/L) of triphenylcarbenium tetrakis(pentafluorophenyl)borate were added. After a polymerization was performed at 60° C. for 25 minutes, 3 ml of an ethanol solution containing an antioxidant was added to stop the polymerization. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 1.

Example 17

An inside of an autoclave with an inner capacity of 1.5 L was substituted by nitrogen, and a solution including 245 ml of a cyclohexane solvent and 250 ml of butadiene was filled therein. Subsequently, 1.0 ml of a cyclohexane solution (2 mol/L) of triethyl aluminum (TEAL) was added thereto. Next, 0.3 ml of a cyclohexane solution (0.005 mol/L) of tris(2,2,6,6-tetramethyl-3,5-heptanedionato)gadolinium (Gd(dpm)$_3$), followed by 0.75 ml of a toluene solution (0.004 mol/L) of triphenylcarbenium tetrakis(pentafluorophenyl)borate were added. After a polymerization was performed at 70° C. for 25 minutes, 3 ml of an ethanol solution containing an antioxidant was added to stop the polymerization. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 1.

Example 18

An inside of an autoclave with an inner capacity of 1.5 L was substituted by nitrogen, and a solution including 245 ml of a cyclohexane solvent and 250 ml of butadiene was filled therein. Subsequently, 1.0 ml of a cyclohexane solution (2 mol/L) of triethyl aluminum (TEAL) was added thereto. Next, 0.3 ml of a cyclohexane solution (0.005 mol/L) of tris(2,2,6,6-tetramethyl-3,5-heptanedionato)gadolinium (Gd (dpm)$_3$), followed by 0.75 ml of a toluene solution (0.004 mol/L) of triphenylcarbenium tetrakis(pentafluorophenyl) borate were added. After a polymerization was performed at 80° C. for 25 minutes, 3 ml of an ethanol solution containing an antioxidant was added to stop the polymerization. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 1.

Example 19

An inside of an autoclave with an inner capacity of 1.5 L was substituted by nitrogen, and a solution including 245 ml of a cyclohexane solvent and 250 ml of butadiene was filled therein. Subsequently, 1.0 ml of a toluene solution (2 mol/L) of triethyl aluminum (TEAL) was added thereto. Next, 0.1 ml of a toluene solution (0.02 mol/L) of tris(2,6-dimethyl-3,5-heptanedionato)gadolinium (Gd(dibm)$_3$), followed by 1.0 ml of a toluene solution (0.004 mol/L) of triphenylcarbenium tetrakis(pentafluorophenyl)borate were added. After a polymerization was performed at 50° C. for 25 minutes, 3 ml of an ethanol solution containing an antioxidant was added to stop the polymerization. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 1.

TABLE 1

| Example | Catalyst | Alkyl aluminum compound | Yield (g/L) | Productivity (g·mmol$^{-1}$-Cat·h$^{-1}$) | [η] | Cis (%) | Trans (%) | Vinyl (%) | Mn/10$^4$ | Mw/10$^4$ | Mw/Mn |
|---|---|---|---|---|---|---|---|---|---|---|---|
| 1 | Gd(dpm)$_3$ | TEAL | 48.6 | 14406 | 1.91 | 96.1 | 3.1 | 0.7 | 16.8 | 38.2 | 2.27 |
| 2 | Gd(dpm)$_3$ | TEAL | 89.1 | 26646 | 6.08 | 97.9 | 1.4 | 0.7 | 53.4 | 170.9 | 3.20 |
| 3 | Gd(dpm)$_3$ | TEAL | 25.1 | 12375 | 1.53 | 96.3 | 2.9 | 0.7 | 12.7 | 27.4 | 2.16 |
| 4 | Gd(dpm)$_3$ | TEAL | 86.2 | 18235 | 2.68 | 95.8 | 3.5 | 0.8 | 22.3 | 64.5 | 2.90 |
| 5 | Gd(dpm)$_3$ | TEAL | 128.9 | 19090 | 3.61 | 95.7 | 3.6 | 0.8 | 26.5 | 96.9 | 3.66 |
| 6 | Gd(dpm)$_3$ | TEAL | 61.8 | 18584 | — | 96.1 | 3.2 | 0.7 | 21.2 | 50.5 | 2.39 |
| 7 | Gd(dpm)$_3$ | TEAL | 55.7 | 33216 | 3.31 | 97.0 | 2.2 | 0.8 | 26.7 | 76.5 | 2.87 |
| 8 | Gd(dpm)$_3$ | TEAL | 63.7 | 37992 | 2.96 | 96.4 | 2.7 | 0.8 | 23.5 | 69.9 | 2.97 |
| 9 | Gd(dpm)$_3$ | TEAL | 53.7 | 32040 | 2.34 | 96.0 | 3.2 | 0.8 | 18.0 | 49.1 | 2.73 |
| 10 | Gd(dpm)$_3$ | TEAL | 51.4 | 30720 | 2.01 | 95.7 | 3.5 | 0.9 | 15.7 | 40.4 | 2.58 |
| 11 | Gd(dpm)$_3$ | TEAL | 30.4 | 12096 | 3.19 | 98.1 | 1.1 | 0.8 | 25.8 | 80.4 | 3.12 |
| 12 | Gd(dpm)$_3$ | TEAL | 65.2 | 25976 | 4.40 | 97.3 | 1.8 | 0.9 | 19.1 | 121.8 | 6.36 |
| 13 | Gd(dpm)$_3$ | TEAL | 109.7 | 47487 | 2.56 | 96.2 | 2.6 | 1.2 | — | — | — |
| 14 | Gd(dpm)$_3$ | TEAL | 68.3 | 10922 | 2.74 | 95.2 | 4.0 | 0.8 | 25.6 | 68.5 | 2.67 |
| 15 | Gd(dpm)$_3$ | TEAL | 108.5 | 17347 | 3.90 | 94.2 | 4.7 | 1.0 | 26.6 | 110.3 | 4.14 |
| 16 | Gd(dpm)$_3$ | TEAL | 61.1 | 48560 | 2.71 | 95.1 | 3.8 | 1.1 | 21.2 | 70.1 | 3.30 |
| 17 | Gd(dpm)$_3$ | TEAL | 46.9 | 37264 | 2.33 | 94.5 | 4.2 | 1.3 | 17.5 | 58.4 | 3.34 |
| 18 | Gd(dpm)$_3$ | TEAL | 40.7 | 32384 | 1.94 | 93.5 | 5.0 | 1.5 | 14.6 | 46.3 | 3.16 |
| Comparative Example 1 | Nd(dpm)$_3$ | TEAL | 25.2 | 7560 | 1.77 | 86.4 | 12.6 | 1.0 | 11.7 | 41.6 | 3.55 |
| 19 | Gd(dibm)$_3$ | TEAL | 13.6 | 8100 | 1.45 | 95.6 | 3.4 | 1.0 | 12.2 | 27.5 | 2.25 |

Comparative Example 1

An inside of an autoclave with an inner capacity of 1.5 L was substituted by nitrogen, and a solution including 245 ml of a cyclohexane solvent and 250 ml of butadiene was filled therein. After that, 1.5 ml of a toluene solution (2 mol/L) of triethyl aluminum (TEAL) was added thereto. Next, 0.8 ml of a toluene solution (0.005 mol/L) of tris(2,2,6,6-tetramethyl-3,5-heptanedionato)neodymium(Nd(dpm)$_3$), followed by 2.0 ml of a toluene solution (0.004 mol/L) of triphenylcarbenium tetrakis(pentafluorophenyl)borate were added. After a polymerization was performed at 40° C. for 25 minutes, 3 ml of an ethanol solution containing an antioxidant was added to stop the polymerization. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 1.

From Table 1, it is found that in Example 1 wherein polymerization was performed in the same conditions as in those in Comparative Example 1 except for the catalyst (in particular, the central metal), the productivity is high, and the obtained polymer has a high content of cis-1,4 structures.

Example 20

An inside of an autoclave with an inner capacity of 1.5 L was substituted by nitrogen, and a solution including 310 ml of a cyclohexane solvent and 180 ml of butadiene was filled therein. Subsequently, 0.38 ml of triisobutyl aluminum (TIBA) (5 mol/L) was added thereto. Next, 0.86 ml of a toluene solution (0.02 mol/L) of tris(2,2,6,6-tetramethyl-3,5-heptanedionato)gadolinium (Gd(dpm)$_3$), followed by 8.6 ml of a toluene solution (0.004 mol/L) of triphenylcarbenium tetrakis(pentafluorophenyl)borate were added. After a polymerization was performed at 40° C. for 25 minutes, 3 ml of an ethanol solution containing an antioxidant was added to stop the polymerization. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 2.

Example 21

An inside of an autoclave with an inner capacity of 1.5 L was substituted by nitrogen, and a solution including 310 ml of a cyclohexane solvent and 180 ml of butadiene was filled therein. Subsequently, 0.63 ml of triisobutyl aluminum (TIBA) (5 mol/L) was added thereto. Next, 0.86 ml of a toluene solution (0.02 mol/L) of tris(2,2,6,6-tetramethyl-3,5-heptanedionato)gadolinium (Gd(dpm)$_3$), followed by 8.6 ml of a toluene solution (0.004 mol/L) of triphenylcarbenium tetrakis(pentafluorophenyl)borate were added. After a polymerization was performed at 40° C. for 25 minutes, 3 ml of an ethanol solution containing an antioxidant was added to stop the polymerization. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 2.

Example 22

An inside of an autoclave with an inner capacity of 1.5 L was substituted by nitrogen, and a solution including 310 ml of a cyclohexane solvent and 180 ml of butadiene was filled therein. Subsequently, 1.26 ml of triisobutyl aluminum (TIBA) (5 mol/L) was added thereto. Next, 0.86 ml of a toluene solution (0.02 mol/L) of tris(2,2,6,6-tetramethyl-3,5-heptanedionato)gadolinium (Gd(dpm)$_3$), followed by 8.6 ml of a toluene solution (0.004 mol/L) of triphenylcarbenium tetrakis(pentafluorophenyl)borate were added. After a polymerization was performed at 40° C. for 25 minutes, 3 ml of an ethanol solution containing an antioxidant was added to stop the polymerization. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 2.

Example 23

An inside of an autoclave with an inner capacity of 1.5 L was substituted by nitrogen, and a solution including 195 ml of a cyclohexane solvent and 300 ml of butadiene was filled therein. Subsequently, 1.0 ml of triisobutyl aluminum (TIBA) (4 mol/L) was added. Next, 0.5 ml of a cyclohexane solution (0.005 mol/L) of tris(2,2,6,6-tetramethyl-3,5-heptanedionato)gadolinium (Gd(dpm)$_3$), followed by 1.25 ml of a toluene solution (0.004 mol/L) of triphenylcarbenium tetrakis(pentafluorophenyl)borate were added. After a polymerization was performed at 50° C. for 25 minutes, 3 ml of an ethanol solution containing an antioxidant was added to stop the polymerization. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 2.

Example 24

An inside of an autoclave with an inner capacity of 1.5 L was substituted by nitrogen, and a solution including 310 ml of a cyclohexane solvent and 180 ml of butadiene was filled therein. Subsequently, 0.75 ml of a cyclohexane solution (1 mol/L) of diisobutyl aluminum hydride (DIBAH) was added thereto. Next, 0.85 ml of a toluene solution (0.02 mol/L) of tris(2,2,6,6-tetramethyl-3,5-heptanedionato)gadolinium (Gd(dpm)$_3$), followed by 8.4 ml of a toluene solution (0.004 mol/L) of triphenylcarbenium tetrakis(pentafluorophenyl)borate were added. After a polymerization was performed at 40° C. for 25 minutes, 3 ml of an ethanol solution containing an antioxidant was added to stop the polymerization. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 2.

Example 25

An inside of an autoclave with an inner capacity of 1.5 L was substituted by nitrogen, and a solution including 245 ml of a cyclohexane solvent and 250 ml of butadiene was filled therein. Subsequently, 0.5 ml of a cyclohexane solution (2 mol/L) of triethyl aluminum (TEAL) was added thereto. Next, 0.2 ml of a toluene solution (0.02 mol/L) of tris(2,2,6,6-tetramethyl-3,5-heptanedionato)gadolinium (Gd(dpm)$_3$), followed by 0.16 ml of a cyclohexane solution (1 mol/L) of diisobutyl aluminum hydride (DIBAH) and 0.5 ml of a toluene solution (0.004 mol/L) of triphenylcarbenium tetrakis(pentafluorophenyl)borate were added. After a polymerization was performed at 40° C. for 25 minutes, 3 ml of an ethanol solution containing an antioxidant was added to stop the polymerization. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 2.

Example 26

An inside of an autoclave with an inner capacity of 1.5 L was substituted by nitrogen, and a solution including 245 ml of a cyclohexane solvent and 250 ml of butadiene was filled therein. Subsequently, 0.5 ml of a cyclohexane solution (2 mol/L) of triethyl aluminum (TEAL) was added thereto. Next, 0.2 ml of a toluene solution (0.02 mol/L) of tris(2,2,6,6-tetramethyl-3,5-heptanedionato)gadolinium (Gd(dpm)$_3$), followed by 0.16 ml of a cyclohexane solution (1 mol/L) of diisobutyl aluminum hydride (DIBAH) and 1.0 ml of a toluene solution (0.004 mol/L) of triphenylcarbenium tetrakis(pentafluorophenyl)borate were added. After a polymerization was performed at 40° C. for 25 minutes, 3 ml of an ethanol solution containing an antioxidant was added to stop the polymerization. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 2.

Example 27

An inside of an autoclave with an inner capacity of 1.5 L was substituted by nitrogen, and a solution including 245 ml of a cyclohexane solvent and 250 ml of butadiene was filled therein. Subsequently, 0.5 ml of a cyclohexane solution (2 mol/L) of triethyl aluminum (TEAL) was added thereto. Next, 0.2 ml of a toluene solution (0.02 mol/L) of tris(2,2,6,6-tetramethyl-3,5-heptanedionato)gadolinium (Gd(dpm)$_3$), followed by 0.16 ml of a cyclohexane solution (1 mol/L) of diisobutyl aluminum hydride (DIBAH) and 1.5 ml of a toluene solution (0.004 mol/L) of triphenylcarbenium tetrakis(pentafluorophenyl)borate were added. After a polymerization was performed at 40° C. for 25 minutes, 3 ml of an ethanol solution containing an antioxidant was added to stop the polymerization. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 2.

Example 28

An inside of an autoclave with an inner capacity of 1.5 L was substituted by nitrogen, and a solution including 245 ml of a cyclohexane solvent and 250 ml of butadiene was filled therein. Subsequently, 0.5 ml of a cyclohexane solution (2 mol/L) of triethyl aluminum (TEAL) was added thereto. Next, 0.2 ml of a toluene solution (0.02 mol/L) of tris(2,2,6,6-tetramethyl-3,5-heptanedionato)gadolinium (Gd(dpm)$_3$), followed by 0.16 ml of a cyclohexane solution (1 mol/L) of diisobutyl aluminum hydride (DIBAH) and 2.0 ml of a toluene solution (0.004 mol/L) of triphenylcarbenium tetrakis(pentafluorophenyl)borate were added. After a polymerization was performed at 40° C. for 25 minutes, 3 ml of an ethanol solution containing an antioxidant was added to stop the polymerization. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 2.

Example 29

An inside of an autoclave with an inner capacity of 1.5 L was substituted by nitrogen, and a solution including 545 ml of a cyclohexane solvent and 550 ml of butadiene was filled therein. Subsequently, 1.1 ml of a cyclohexane solution (2 mol/L) of triethyl aluminum (TEAL) was added thereto. Next, 0.44 ml of a toluene solution (0.02 mol/L) of tris(2,2,6,6-tetramethyl-3,5-heptanedionato)gadolinium (Gd(dpm)$_3$), followed by 0.33 ml of a cyclohexane solution (1 mol/L) of diisobutyl aluminum hydride (DIBAH) and 2.2 ml of a toluene solution (0.004 mol/L) of triphenylcarbenium tetrakis(pentafluorophenyl)borate were added. After a polymerization was performed at 40° C. for 25 minutes, 4 ml of an ethanol solution containing an antioxidant was added to stop the polymerization. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 2.

Example 30

An inside of an autoclave with an inner capacity of 1.5 L was substituted by nitrogen, and a solution including 495 ml of a cyclohexane solvent and 500 ml of butadiene was filled therein. Subsequently, 2.0 ml of a cyclohexane solution (2 mol/L) of triethyl aluminum (TEAL) was added thereto. Next, 0.8 ml of a cyclohexane solution (0.005 mol/L) of tris(2,2,6,6-tetramethyl-3,5-heptanedionato)gadolinium (Gd(dpm)$_3$), followed by 1.7 ml of a cyclohexane solution (0.1 mol/L) of diisobutyl aluminum hydride (DIBAH) and 2.0 ml of a toluene solution (0.004 mol/L) of triphenylcarbenium tetrakis(pentafluorophenyl)borate were added. After a polymerization was performed at 50° C. for 25 minutes, 5 ml of an ethanol solution containing an antioxidant was added to stop the polymerization. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 2.

TABLE 2

| Example | Catalyst | Alkyl aluminum compound | Yield (g/L) | Productivity (g · mmol$^{-1}$- Cat · h$^{-1}$) | [η] | Cis (%) | Trans (%) | Vinyl (%) | Mn/10$^4$ | Mw/10$^4$ | Mw/Mn |
|---|---|---|---|---|---|---|---|---|---|---|---|
| 20 | Gd(dpm)$_3$ | TIBA | 31.7 | 2212 | — | 97.9 | 0.9 | 1.2 | 33.7 | 117.4 | 3.48 |
| 21 | Gd(dpm)$_3$ | TIBA | 53.9 | 3762 | — | 98.1 | 0.7 | 1.2 | 28.0 | 71.3 | 2.55 |
| 22 | Gd(dpm)$_3$ | TIBA | 65.2 | 4557 | — | 97.5 | 1.4 | 1.1 | 15.9 | 34.0 | 2.15 |
| 23 | Gd(dpm)$_3$ | TIBA | 37.6 | 17952 | 1.87 | 98.5 | 0.6 | 0.9 | 16.1 | 39.3 | 2.44 |
| 24 | Gd(dpm)$_3$ | DIBAH | 68.9 | 4862 | — | 98.3 | 0.7 | 1.0 | 13.1 | 44.9 | 3.44 |
| 25 | Gd(dpm)$_3$ | TEAL/DIBAH | 28.3 | 8430 | — | 97.0 | 2.3 | 0.7 | 12.6 | 24.8 | 1.98 |
| 26 | Gd(dpm)$_3$ | TEAL/DIBAH | 56.6 | 16866 | — | 96.8 | 2.5 | 0.7 | 16.0 | 36.8 | 2.30 |
| 27 | Gd(dpm)$_3$ | TEAL/DIBAH | 58.2 | 17376 | — | 96.9 | 2.4 | 0.7 | 16.4 | 37.7 | 2.29 |
| 28 | Gd(dpm)$_3$ | TEAL/DIBAH | 64.1 | 19152 | 2.35 | 97.2 | 2.1 | 0.7 | 18.4 | 42.9 | 2.34 |
| 29 | Gd(dpm)$_3$ | TEAL/DIBAH | 58.5 | 17542 | — | 97.1 | 2.2 | 0.7 | 21.9 | 49.8 | 2.27 |
| 30 | Gd(dpm)$_3$ | TEAL/DIBAH | 62.5 | 37554 | 2.41 | 96.2 | 3.0 | 0.8 | 19.4 | 56.1 | 2.89 |

From Table 2, it is found that even if the alkyl aluminum compound having difficulty with increasing the productivity, is used, the production can be performed with a good activity.

Example 31

An inside of an autoclave with an inner capacity of 1.5 L was substituted by nitrogen, and a solution including 315 ml of a toluene solvent and 180 ml of butadiene was filled therein. Subsequently, 0.5 ml of a toluene solution (2 mol/L) of triethyl aluminum (TEAL) was added thereto. Next, 1.0 ml of a toluene solution (0.01 mol/L) of tris(2,2,6,6-tetramethyl-3,5-heptanedionato)gadolinium (Gd(dpm)$_3$), followed by 5.0 ml of a toluene solution (0.004 mol/L) of triphenylcarbenium tetrakis(pentafluorophenyl)borate were added. After a polymerization was performed at 40° C. for 25 minutes, 3 ml of an ethanol solution containing an antioxidant was added to stop the polymerization. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 3.

Example 32

A polymerization was performed in the same manner as in Example 31, except that the toluene solution (2 mol/L) of triethyl aluminum (TEAL) was used in an amount of 0.75 ml. The polymerization results are shown in Table 3.

Example 33

A polymerization was performed in the same manner as in Example 31, except that the toluene solution (2 mol/L) of triethyl aluminum (TEAL) was used in an amount of 1.0 ml. The polymerization results are shown in Table 3.

Example 34

A polymerization was performed in the same manner as in Example 31, except that the toluene solution (2 mol/L) of triethyl aluminum (TEAL) was used in an amount of 1.25 ml. The polymerization results are shown in Table 3.

Example 35

An inside of an autoclave with an inner capacity of 1.5 L was substituted by nitrogen, and a solution including 315 ml of a toluene solvent and 180 ml of butadiene was filled therein. Subsequently, 0.5 ml of a toluene solution (2 mol/L) of triethyl aluminum (TEAL) was added thereto. Next, 0.67 ml of a toluene solution (0.01 mol/L) of tris(2,2,6,6-tetramethyl-3,5-heptanedionato)gadolinium (Gd(dpm)$_3$), followed by 3.35 ml of a toluene solution (0.004 mol/L) of triphenylcarbenium tetrakis(pentafluorophenyl)borate were added. After a polymerization was performed at 40° C. for 25 minutes, 3 ml of an ethanol solution containing an antioxidant was added to stop the polymerization. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 3.

Example 36

An inside of an autoclave with an inner capacity of 1.5 L was substituted by nitrogen, and a solution including 245 ml of a toluene solvent and 250 ml of butadiene was filled therein. Subsequently, 0.5 ml of a toluene solution (2 mol/L) of triethyl aluminum (TEAL) was added thereto. Next, 0.67 ml of a toluene solution (0.01 mol/L) of tris(2,2,6,6-tetramethyl-3,5-heptanedionato)gadolinium (Gd(dpm)$_3$), followed by 3.35 ml of a toluene solution (0.004 mol/L) of triphenylcarbenium tetrakis(pentafluorophenyl)borate was added. After a polymerization was performed at 40° C. for 25 minutes, 3 ml of an ethanol solution containing an antioxidant was added to stop the polymerization. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 3.

Example 37

An inside of an autoclave with an inner capacity of 1.5 L was substituted by nitrogen, and a solution including 195 ml of a toluene solvent and 300 ml of butadiene solution was filled therein. Subsequently, 0.5 ml of a toluene solution (2 mol/L) of triethyl aluminum (TEAL) was added thereto. Next, 0.67 ml of a toluene solution (0.01 mol/L) of tris(2,2,6,6-tetramethyl-3,5-heptanedionato)gadolinium (Gd(dpm)$_3$), followed by 3.35 ml of a toluene solution (0.004 mol/L) of triphenylcarbenium tetrakis(pentafluorophenyl)borate were added. After a polymerization was performed at 40° C. for 25 minutes, 3 ml of an ethanol solution containing an antioxidant was added to stop the polymerization. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 3.

Example 38

An inside of an autoclave with an inner capacity of 1.5 L was substituted by nitrogen, and a solution including 115 ml of a toluene solvent and 380 ml of butadiene was filled therein. Subsequently, 0.5 ml of a toluene solution (2 mol/L) of triethyl aluminum (TEAL) was added thereto. Next, 0.34 ml of a toluene solution (0.02 mol/L) of tris(2,2,6,6-tetramethyl-3,5-heptanedionato)gadolinium (Gd(dpm)$_3$), followed by 3.35 ml of a toluene solution (0.004 mol/L) of triphenylcarbenium tetrakis(pentafluorophenyl)borate were added. After a polymerization was performed at 40° C. for 25 minutes, 3 ml of an ethanol solution containing an antioxidant was added to stop the polymerization. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 3.

Example 39

An inside of an autoclave with an inner capacity of 1.5 L was substituted by nitrogen, and 500 ml of butadiene was filled therein. Subsequently, 0.5 ml of a toluene solution (2 mol/L) of triethyl aluminum (TEAL) was added thereto. Next, 0.67 ml of a toluene solution (0.01 mol/L) of tris(2,2,6,6-tetramethyl-3,5-heptanedionato)gadolinium (Gd(dpm)$_3$), followed by 3.35 ml of a toluene solution (0.004 mol/L) of triphenylcarbenium tetrakis(pentafluorophenyl)borate were added. After a polymerization was performed at 40° C. for 25 minutes, 3 ml of an ethanol solution containing an antioxidant was added to stop the polymerization. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 3.

Example 40

An inside of an autoclave with an inner capacity of 1.5 L was substituted by nitrogen, and a solution including 245 ml of a toluene solvent and 250 ml of butadiene was filled therein. Then, 0.10 MPa of hydrogen gas was introduced into a polymerization tank. Subsequently, 0.5 ml of a toluene solution (2 mol/L) of triethyl aluminum (TEAL) was added thereto. Next, 0.67 ml of a toluene solution (0.01 mol/L) of tris(2,2,6,6-tetramethyl-3,5-heptanedionato)gadolinium (Gd(dpm)$_3$), followed by 3.35 ml of a toluene solution (0.004 mol/L) of triphenylcarbenium tetrakis(pentafluorophenyl)borate were added. After a polymerization was performed at 40° C. for 25 minutes, 3 ml of an ethanol solution containing an antioxidant was added to stop the polymerization. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 3.

Example 41

A polymerization was performed in the same manner as in Example 40, except that the pressure of the hydrogen gas was adjusted to 0.15 MPa. The polymerization results are shown in Table 3.

Example 42

A polymerization was performed in the same manner as in Example 40, except that the pressure of the hydrogen gas was adjusted to 0.20 MPa. The polymerization results are shown in Table 3.

Example 43

An inside of an autoclave with an inner capacity of 1.5 L was substituted by nitrogen, and a solution including 245 ml of a cyclohexane solvent and 250 ml of butadiene was filled therein. Subsequently, 0.5 ml of a toluene solution (2 mol/L) of triethyl aluminum (TEAL) was added thereto. Next, 0.2 ml of a toluene solution (0.02 mol/L) of tris(2,2,6,6-tetramethyl-3,5-heptanedionato)gadolinium (Gd(dpm)$_3$), followed by 2.0 ml of a toluene solution (0.004 mol/L) of triphenylcarbenium tetrakis(pentafluorophenyl)borate were added. After a polymerization was performed at 40° C. for 25 minutes, 3 ml of an ethanol solution containing an antioxidant was added to stop the polymerization. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 3.

Example 44

An inside of an autoclave with an inner capacity of 1.5 L was substituted by nitrogen, and a solution including 315 ml of a toluene solvent and 180 ml of butadiene was filled therein. Subsequently, 1.5 ml of a toluene solution (2 mol/L) of triethyl aluminum (TEAL) was added thereto. Next, 0.85 ml of a toluene solution (0.02 mol/L) of tris(2,6-dimethyl-3,5-heptanedionato)gadolinium (Gd(dibm)$_3$), followed by 0.08 ml of a toluene solution (0.43 mol/L) of triphenylcarbenium tetrakis(pentafluorophenyl)borate were added. After a polymerization was performed at 40° C. for 25 minutes, 3 ml of an ethanol solution containing an antioxidant was added to stop the polymerization. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 3.

Example 45

An inside of an autoclave with an inner capacity of 1.5 L was substituted by nitrogen, and a solution including 315 ml of a toluene solvent and 180 ml of butadiene was filled therein. After that, 0.05 MPa of hydrogen gas was introduced into a polymerization tank. Subsequently, 1.5 ml of a toluene solution (2 mol/L) of triethyl aluminum (TEAL) was added thereto. Next, 0.85 ml of a toluene solution (0.02 mol/L) of tris(2,6-dimethyl-3,5-heptanedionato)gadolinium (Gd(dibm)$_3$), followed by 0.08 ml of a toluene solution (0.43 mol/L) of triphenylcarbenium tetrakis(pentafluorophenyl)borate were added. After a polymerization was performed at 40° C. for 25 minutes, 3 ml of an ethanol solution containing an antioxidant was added to stop the polymerization. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 3.

Example 46

A polymerization was performed in the same manner as in Example 45, except that the pressure of the hydrogen gas was adjusted to 0.10 MPa. The polymerization results are shown in Table 3.

Example 47

A polymerization was performed in the same manner as in Example 45, except that the pressure of the hydrogen gas was adjusted to 0.15 MPa. The polymerization results are shown in Table 3.

Example 48

An inside of an autoclave with an inner capacity of 1.5 L was substituted by nitrogen, and a solution including 350 ml of a toluene solvent and 150 ml of butadiene was filled therein. Subsequently, 1.5 ml of a toluene solution (2 mol/L) of triethyl aluminum (TEAL) was added thereto. Next, 0.85 ml of a toluene solution (0.02 mol/L) of tris(2,6-dimethyl-3,5-heptanedionato)gadolinium (Gd(dibm)$_3$), followed by 0.08 ml of a toluene solution (0.43 mol/L) of triphenylcarbenium tetrakis(pentafluorophenyl)borate were added. After a polymerization was performed at 40° C. for 25 minutes, 3 ml of an ethanol solution containing an antioxidant was added to stop the polymerization. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 3.

Example 49

An inside of an autoclave with an inner capacity of 1.5 L was substituted by nitrogen, and a solution including 250 ml of a toluene solvent and 250 ml of butadiene was filled therein. Subsequently, 1.5 ml of a toluene solution (2 mol/L) of triethyl aluminum (TEAL) was added thereto. Next, 0.85 ml of a toluene solution (0.02 mol/L) of tris(2,6-dimethyl-3,5-heptanedionato)gadolinium (Gd(dibm)$_3$), followed by 0.08 ml of a toluene solution (0.43 mol/L) of triphenylcarbenium tetrakis(pentafluorophenyl)borate were added. After a polymerization was performed at 40° C. for 25 minutes, 3 ml of an ethanol solution containing an antioxidant was added to stop the polymerization. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 3.

Example 50

An inside of an autoclave with an inner capacity of 1.5 L was substituted by nitrogen, and a solution including 200 ml of a toluene solvent and 300 ml of butadiene was filled therein. Subsequently, 1.5 ml of a toluene solution (2 mol/L) of triethyl aluminum (TEAL) was added thereto, which was stirred at 500 rpm/minute for 3 minutes. Next, 0.85 ml of a toluene solution (0.02 mol/L) of tris(2,6-dimethyl-3,5-heptanedionato)gadolinium (Gd(dibm)$_3$), followed by 0.08 ml of a toluene solution (0.43 mol/L) of triphenylcarbenium tetrakis(pentafluorophenyl)borate were added. After a polymerization was performed at 40° C. for 25 minutes, 3 ml of an ethanol solution containing an antioxidant was added to stop the polymerization. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 3.

Comparative Example 2

An inside of an autoclave with an inner capacity of 1.5 L was substituted by nitrogen, and a solution including 390 ml of a toluene solvent and 210 ml of butadiene was filled therein. After that, 0.04 MPa of hydrogen gas was introduced into a polymerization tank. Subsequently, 1.5 ml of a toluene solution (2 mol/L) of triethyl aluminum (TEAL) was added thereto. Next, 0.6 ml of a toluene solution (0.05 mol/L) of tris(2,2,6,6-tetramethyl-3,5-heptanedionato)yttrium (Y(dpm)$_3$), followed by 0.14 ml of a toluene solution (0.43 mol/L) of triphenylcarbenium tetrakis(pentafluorophenyl)borate were added. After a polymerization was performed at 40° C. for 25 minutes, 3 ml of an ethanol solution containing an antioxidant was added to stop the polymerization. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 3.

Comparative Example 3

An inside of an autoclave with an inner capacity of 2 L was substituted by nitrogen, and a solution including 260 ml of a toluene solvent and 140 ml of butadiene was filled therein. After the temperature of the solution was elevated to 30° C., 3.0 ml of a toluene solution (2 mol/L) of triethyl aluminum (TEAL) was added thereto. Next, 2.5 ml of a toluene solution (0.04 mol/L) of tris(2,2,6,6-tetramethyl-heptane 3,5-dionate)neodymium (Nd(dpm)$_3$), followed by 0.5 ml of a toluene solution (0.43 mol/L) of triphenylcarbenium tetrakis(pentafluorophenyl)borate were added. After a polymerization was performed at 40° C. for 30 minutes, 5 ml of an ethanol solution containing an antioxidant was added to stop the polymerization. The inside pressure of the autoclave was released, and then ethanol was poured into the polymerization solution to recover polybutadiene. Then, the recovered polybutadiene was dried in vacuo at 70° C. for 6 hours. The polymerization results are shown in Table 3.

Comparative Example 4

As for Example 1 described in JP-2004-27179 (Patent Literature 4), the calculation results of the yield and productivity were shown in Table 3.

TABLE 3

| Example | Catalyst | Alkyl aluminum compound | Yield (g/L) | Productivity (g · mmol$^{-1}$-Cat · h$^{-1}$) | [η] | Cis (%) | Trans (%) | Vinyl (%) | Mn/10$^4$ | Mw/10$^4$ | Mw/Mn |
|---|---|---|---|---|---|---|---|---|---|---|---|
| 31 | Gd(dpm)$_3$ | TEAL | 70.6 | 8501 | 6.18 | 99.0 | 0.4 | 0.5 | 57.8 | 158.1 | 2.73 |
| 32 | Gd(dpm)$_3$ | TEAL | 70.8 | 8522 | 4.78 | 99.0 | 0.5 | 0.5 | 45.5 | 122.4 | 2.69 |
| 33 | Gd(dpm)$_3$ | TEAL | 66.3 | 7982 | 3.78 | 98.9 | 0.6 | 0.5 | 36.8 | 97.6 | 2.65 |
| 34 | Gd(dpm)$_3$ | TEAL | 61.8 | 7452 | 3.12 | 99.0 | 0.4 | 0.5 | 31.9 | 79.8 | 2.50 |
| 35 | Gd(dpm)$_3$ | TEAL | 37.7 | 6745 | 5.65 | 99.1 | 0.5 | 0.5 | 52.2 | 147.9 | 2.83 |
| 36 | Gd(dpm)$_3$ | TEAL | 68.7 | 12297 | 6.13 | 99.0 | 0.4 | 0.6 | 54.3 | 158.8 | 2.93 |
| 37 | Gd(dpm)$_3$ | TEAL | 82.9 | 14830 | 6.27 | 98.9 | 0.5 | 0.6 | 57.1 | 168.0 | 2.94 |
| 38 | Gd(dpm)$_3$ | TEAL | 90.5 | 15949 | 6.86 | 98.6 | 0.6 | 0.8 | 74.3 | 223.8 | 3.01 |
| 39 | Gd(dpm)$_3$ | TEAL | 56.6 | 10127 | 7.09 | 98.6 | 0.6 | 0.8 | 98.1 | 274.5 | 2.80 |
| 40 | Gd(dpm)$_3$ | TEAL | 70.2 | 12371 | 3.12 | 98.9 | 0.5 | 0.6 | 29.0 | 73.9 | 2.55 |
| 41 | Gd(dpm)$_3$ | TEAL | 69.4 | 12229 | 2.58 | 98.8 | 0.6 | 0.6 | 23.7 | 58.4 | 2.46 |
| 42 | Gd(dpm)$_3$ | TEAL | 65.8 | 11591 | 2.07 | 99.0 | 0.5 | 0.5 | 18.4 | 44.0 | 2.39 |
| 43 | Gd(dpm)$_3$ | TEAL | 61.2 | 18270 | 5.71 | 98.3 | 0.9 | 0.8 | 53.2 | 155.4 | 2.92 |
| 44 | Gd(dibm)$_3$ | TEAL | 87.1 | 6117 | 5.33 | 99.4 | 0.2 | 0.4 | 53.6 | 135.9 | 2.54 |
| 45 | Gd(dibm)$_3$ | TEAL | 71.9 | 5050 | 2.64 | 99.2 | 0.4 | 0.4 | 23.7 | 58.0 | 2.45 |
| 46 | Gd(dibm)$_3$ | TEAL | 62.7 | 4403 | 1.92 | 99.1 | 0.4 | 0.4 | 15.2 | 36.1 | 2.38 |
| 47 | Gd(dibm)$_3$ | TEAL | 50.8 | 3570 | 1.50 | 98.6 | 0.9 | 0.5 | 12.2 | 27.7 | 2.27 |
| 48 | Gd(dibm)$_3$ | TEAL | 51.0 | 3618 | 4.59 | 99.2 | 0.4 | 0.4 | 37.5 | 105.7 | 2.82 |
| 49 | Gd(dibm)$_3$ | TEAL | 78.8 | 5592 | 5.60 | 99.1 | 0.3 | 0.5 | 45.1 | 133.0 | 2.95 |
| 50 | Gd(dibm)$_3$ | TEAL | 97.5 | 9176 | 5.28 | 99.1 | 0.2 | 0.6 | 23.4 | 60.3 | 2.58 |
| Comparative Example 2 | Y(dpm)$_3$ | TEAL | 69.9 | 3366 | 2.34 | 96.0 | 3.1 | 0.9 | 22.5 | 66.4 | 2.95 |
| Comparative Example 3 | Nd(dpm)$_3$ | TEAL | 19.6 | 160 | 3.40 | 98.4 | 0.6 | 1.0 | 33.3 | 74.0 | 2.22 |
| Comparative Example 4 | [(Cp*)$_2$Gd[B(C$_6$F$_5$)$_4$] | TIBA | 54.0 | 540 | — | 97.3 | — | — | 24.5 | 42.4 | 1.73 |

From Table 3, it is found that in Example 34 in which the polymerization was performed in conditions which are the closest to those in Comparative Example 2, the productivity is significantly high, such as more than twice that in Comparative Example 2, and the obtained polymer had a very high content of cis-1,4 structures.

Example 51

An inside of an autoclave with an inner capacity of 1.5 L was substituted by nitrogen, and a solution including 315 ml of a toluene solvent and 180 ml of butadiene was filled therein. Subsequently, 1.5 ml of a toluene solution (1 mol/L) of diisobutyl aluminum hydride (DIBAH) was added thereto. Next, 1.7 ml of a toluene solution (0.01 mol/L) of tris(2,2,6,6-tetramethyl-3,5-heptanedionato)gadolinium (Gd(dpm)$_3$), followed by 0.08 ml a toluene solution (0.43 mol/L) of triphenylcarbenium tetrakis(pentafluorophenyl)borate were added. After a polymerization was performed at 40° C. for 25 minutes, 3 ml of an ethanol solution containing an antioxidant was added to stop the polymerization. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 4.

Example 52

An inside of an autoclave with an inner capacity of 1.5 L was substituted by nitrogen, and a solution including 315 ml of a toluene solvent and 180 ml of butadiene was filled therein. Subsequently, 1.67 ml of a toluene solution (1.8 mol/L) of triisobutyl aluminum (TIBA) was added thereto. Next, 1.7 ml of a toluene solution (0.01 mol/L) of tris(2,2,6,6-tetramethyl-3,5-heptanedionato)gadolinium (Gd(dpm)$_3$), followed by 0.08 ml of a toluene solution (0.43 mol/L) of triphenylcarbenium tetrakis(pentafluorophenyl)borate were added. After a polymerization was performed at 40° C. for 25 minutes, 3 ml of an ethanol solution containing an antioxidant was added to stop the polymerization. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 4.

Example 53

An inside of an autoclave with an inner capacity of 1.5 L was substituted by nitrogen, and a solution including 315 ml of a toluene solvent and 180 ml of butadiene was filled therein. Subsequently, 1.35 ml of tri-n-octylaluminum (TNOA) (2.2 mol/L) was added thereto. Next, 1.7 ml of a toluene solution (0.01 mol/L) of tris(2,2,6,6-tetramethyl-3,5-heptanedionato)gadolinium (Gd(dpm)$_3$), followed by 0.08 ml of a toluene solution (0.43 mol/L) of triphenylcarbenium tetrakis(pentafluorophenyl)borate were added. After a polymerization was performed at 40° C. for 25 minutes, 3 ml of an ethanol solution containing an antioxidant was added to stop the polymerization. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 4.

Example 54

An inside of an autoclave with an inner capacity of 1.5 L was substituted by nitrogen, and a solution including 270 ml of a toluene solvent and 25 ml of butadiene was filled therein. Subsequently, 3.0 ml of a toluene solution (1 mol/L) of triisobutyl aluminum (TIBA). Next, 3.0 ml of a toluene solution (0.02 mol/L) of tris(2,2,6,6-tetramethyl-3,5-heptanedionato)gadolinium (Gd(dpm)$_3$), followed by 0.28 ml of a toluene solution (0.43 mol/L) of triphenylcarbenium tetrakis(pentafluorophenyl)borate were added. After a polymerization was performed at 50° C. for 3 minutes, 3 ml of an ethanol solution containing an antioxidant was added to stop the polymerization. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 4.

TABLE 4

| Example | Catalyst | Alkyl aluminum compound | Yield (g/L) | Productivity (g · mmol$^{-1}$-Cat · h$^{-1}$) | [η] | Cis (%) | Trans (%) | Vinyl (%) | Mn/10$^4$ | Mw/10$^4$ | Mw/Mn |
|---|---|---|---|---|---|---|---|---|---|---|---|
| 51 | Gd(dpm)$_3$ | DIBAH | 16.5 | 1163 | 1.07 | 96.9 | 1.5 | 1.6 | 7.6 | 22.1 | 2.90 |
| 52 | Gd(dpm)$_3$ | TIBA | 19.7 | 1382 | 5.19 | 96.6 | 1.6 | 1.8 | 31.7 | 133.1 | 4.20 |
| 53 | Gd(dpm)$_3$ | TNOA | 43.8 | 3082 | 4.04 | 98.4 | 0.9 | 0.7 | 30.9 | 108.5 | 3.51 |
| 54 | Gd(dpm)$_3$ | TIBA | 10.4 | 1040 | 2.12 | 97.5 | 1.2 | 1.3 | 18.5 | 43.6 | 2.35 |

From Table 4, it is found that even if the alkyl aluminum compound having difficulty with increasing the productivity, is used, the production can be performed with a good activity.

Example 55

An inside of an autoclave with an inner capacity of 1.5 L was substituted by nitrogen, and a solution including 395 ml of a toluene solvent and 400 ml of butadiene was filled therein. Subsequently, 0.14 MPa of hydrogen gas was introduced, and 1.2 ml of a toluene solution (2 mol/L) of triethyl aluminum (TEAL) was added thereto. Next, 2.25 ml of a toluene solution (0.005 mol/L) of tris(2,2,6,6-tetramethyl-3,5-heptanedionato)gadolinium (Gd(dpm)$_3$), followed by 5.6 ml of a toluene solution (0.004 mol/L) of triphenylcarbenium tetrakis(pentafluorophenyl)borate were added. After a polymerization was performed at 40° C. for 25 minutes, 0.23 ml of a modifier, a toluene solution (0.5 mol/L) of 4,4'-bis (diethylamino)benzophenone (EAB), was added thereto, and a modification reaction was performed at the same temperature for 15 minutes. After 4 ml of an ethanol solution containing an antioxidant was added and the inside pressure of the autoclave was released, ethanol was poured into the polymerization solution to recover polybutadiene. Then, the recovered polybutadiene was dried in vacuo at 80° C. for 3 hours. The recovered, modified polybutadiene had a melting point, according to the DSC measurement, of −6.9° C., and a fusion heat amount of 42.2 J/g. Other polymerization results are shown in Table 5.

Example 56

An inside of an autoclave with an inner capacity of 1.5 L was substituted by nitrogen, and a solution including 295 ml of a toluene solvent and 300 ml of butadiene was filled therein. Subsequently, 0.13 MPa of hydrogen gas was introduced, and 1.8 ml of a toluene solution (2 mol/L) of triethyl aluminum (TEAL) was added thereto. Next, 1.05 ml of a toluene solution (0.02 mol/L) of tris(2,6-dimethyl-3,5-heptanedionato)gadolinium (Gd(dibm)$_3$), followed by 0.1 ml of a toluene solution (0.043 mol/L) of triphenylcarbenium tetrakis(pentafluorophenyl)borate were added. After a polymerization was performed at 40° C. for 25 minutes, 0.42 ml of a modifier, a toluene solution (0.5 mol/L) of 4,4'-bis (diethyl amino)benzophenone (EAB), was added thereto, and a modification reaction was performed at the same temperature for 15 minutes. After 4 ml of an ethanol solution containing an antioxidant was added thereto, the inside pressure of the autoclave was released, and ethanol was poured into the polymerization solution to recover polybutadiene. Then, the recovered polybutadiene was dried in vacuo at 80° C. for 3 hours. The recovered, modified polybutadiene had a melting point, according to the DSC measurement, of −6.6° C., and had a fusion heat amount of 44.6 J/g. Other polymerization results are shown in Table 5.

Example 57

An inside of an autoclave with an inner capacity of 1.5 L was substituted by nitrogen, and a solution including 395 ml of a toluene solvent and 400 ml of butadiene was filled therein. Subsequently, 0.14 MPa of hydrogen gas was introduced, and 1.2 ml of a toluene solution (2 mol/L) of triethyl aluminum (TEAL) was added thereto. Next, 2.25 ml of a toluene solution (0.005 mol/L) of tris(2,2,6,6-tetramethyl-3,5-heptanedionato)gadolinium (Gd(dpm)$_3$), followed by 5.6 ml of a toluene solution (0.004 mol/L) of triphenylcarbenium tetrakis(pentafluorophenyl)borate were added. After a polymerization was performed at 40° C. for 25 minutes, 4 ml of an ethanol solution containing an antioxidant was added thereto, and the inside pressure of the autoclave was released. Ethanol was poured into the polymerization solution to recover polybutadiene. Then, the recovered polybutadiene was dried in vacuo at 80° C. for 3 hours. The recovered polybutadiene had a melting point, according to the DSC measurement, of −8.4° C., and had a fusion heat amount of 43.5 J/g. Other polymerization results are shown in Table 5.

Example 58

An inside of an autoclave with an inner capacity of 1.5 L was substituted by nitrogen, and a solution including 295 ml of a toluene solvent and 300 ml of butadiene was filled therein. Subsequently, 0.13 MPa of hydrogen gas was introduced, and 1.8 ml of a toluene solution (2 mol/L) of triethyl aluminum (TEAL) was added thereto. Next, 1.05 ml of a toluene solution (0.02 mol/L) of tris(2,6-dimethyl-3,5-heptanedionato)gadolinium (Gd(dibm)$_3$), followed by 0.1 ml of a toluene solution (0.043 mol/L) of triphenylcarbenium tetrakis(pentafluorophenyl)borate were added. After a polymerization was performed at 40° C. for 25 minutes, 4 ml of an ethanol solution containing an antioxidant was added thereto, and the inside pressure of the autoclave was released. Ethanol was poured into the polymerization solution to recover polybutadiene. Then, the recovered polybutadiene was dried in vacuo at 80° C. for 3 hours. The recovered polybutadiene had a melting point, according to the DSC measurement, of −6.6° C., and a fusion heat amount of 45.6 J/g. Other polymerization results are shown in Table 5.

Physical properties of the obtained cis-1,4-polybutadienes are shown in Table 5.

TABLE 5

| | Gd catalyst | Modifier | Productivity (g · mmol$^{-1}$-Cat · h$^{-1}$) | [η] | Cis (%) | Trans (%) | Vinyl (%) | Mn/10$^4$ | Mw/10$^4$ | Mw/Mn | Degree of modification |
|---|---|---|---|---|---|---|---|---|---|---|---|
| Example 55 | Gd(dpm)$_3$ | EAB | 12825 | 2.49 | 98.8 | 0.6 | 0.5 | 23.8 | 56.5 | 2.38 | 0.28 |
| Example 56 | Gd(dibm)$_3$ | EAB | 9394 | 2.63 | 99.2 | 0.3 | 0.5 | 24.7 | 58.5 | 2.37 | 0.24 |
| Example 57 | Gd(dpm)$_3$ | — | 12592 | 2.57 | 98.8 | 0.6 | 0.5 | 24.7 | 61.0 | 2.47 | 0.00 |
| Example 58 | Gd(dibm)$_3$ | — | 9345 | 2.58 | 99.2 | 0.4 | 0.5 | 24.4 | 57.7 | 2.36 | 0.00 |

Example 59

An inside of an autoclave with an inner capacity of 1.5 L was substituted by nitrogen, and a solution including 245 ml of a cyclohexane solvent and 250 ml of butadiene was filled therein. Subsequently, 1.25 ml of a cyclohexane solution (2 mol/L) of triethyl aluminum (TEAL) was added thereto. Next, 0.4 ml of a cyclohexane solution (0.005 mol/L) of tris(2,2,6,6-tetramethyl-3,5-heptanedionato)gadolinium (Gd (dpm)$_3$), followed by 1.0 ml of a toluene solution (0.004 mol/L) of triphenylcarbenium tetrakis(pentafluorophenyl) borate were added. After a polymerization was performed at 50° C. for 25 minutes, 0.5 ml of a modifier, a cyclohexane solution (2 mol/L) of piperonyl chloride (PPCl), was added thereto, and a modification reaction was performed at the same temperature for 15 minutes. After 3 ml of an ethanol solution containing an antioxidant was added thereto, the inside pressure of the autoclave was released, and ethanol was poured into the polymerization solution to recover polybutadiene. Then, the recovered polybutadiene was dried in vacuo at 80° C. for 3 hours. The polymerization results are shown in Table 6.

Example 60

An inside of an autoclave with an inner capacity of 1.5 L was substituted by nitrogen, and a solution including 220 ml of a cyclohexane solvent and 280 ml of butadiene was filled therein. Subsequently, 1.0 ml of a cyclohexane solution (2 mol/L) of triethyl aluminum (TEAL) was added thereto. Next, 0.4 ml of a cyclohexane solution (0.005 mol/L) of tris(2,2,6,6-tetramethyl-3,5-heptanedionato)gadolinium (Gd (dpm)$_3$), followed by 1.0 ml of a toluene solution (0.004 mol/L) of triphenylcarbenium tetrakis(pentafluorophenyl) borate were added. After a polymerization was performed at 50° C. for 30 minutes, 0.25 ml of a modifier, a cyclohexane solution (2 mol/L) of piperonyl chloride (PPCl) was added thereto, and a modification reaction was performed at the same temperature for 5 minutes. After 3 ml of an ethanol solution containing an antioxidant was added thereto, the inside pressure of the autoclave was released, and ethanol was poured into the polymerization solution to recover polybutadiene. Then, the recovered polybutadiene was dried in vacuo at 80° C. for 3 hours. The polymerization results are shown in Table 6.

Example 61

An inside of an autoclave with an inner capacity of 1.5 L was substituted by nitrogen, and a solution including 245 ml of a cyclohexane solvent and 250 ml of butadiene was filled therein. Subsequently, 1.25 ml of a cyclohexane solution (2 mol/L) of triethyl aluminum (TEAL) was added thereto. Next, 0.4 ml of a cyclohexane solution (0.005 mol/L) of tris(2,2,6,6-tetramethyl-3,5-heptanedionato)gadolinium (Gd(dpm)$_3$), followed by 1.0 ml of a toluene solution (0.004 mol/L) of triphenylcarbenium tetrakis(pentafluorophenyl)borate were added. After a polymerization was performed at 50° C. for 25 minutes, 0.8 ml of a modifier, a toluene solution (0.1 mol/L) of m-dimethoxybenzyl bromide (DMBB), was added thereto, and a modification reaction was performed at the same temperature for 15 minutes. After 3 ml of an ethanol solution containing an antioxidant was added thereto, the inside pressure of the autoclave was released, and then ethanol was poured into the polymerization solution to recover polybutadiene. Then, the recovered polybutadiene was dried in vacuo at 80° C. for 3 hours. The polymerization results are shown in Table 6.

Example 62

An inside of an autoclave with an inner capacity of 1.5 L was substituted by nitrogen, and a solution including 495 ml of a cyclohexane solvent and 500 ml of butadiene was filled therein. Subsequently, 3.0 ml of a cyclohexane solution (2 mol/L) of triethyl aluminum (TEAL) was added thereto. Next, 0.8 ml of a cyclohexane solution (0.005 mol/L) of tris(2,2,6,6-tetramethyl-3,5-heptanedionato)gadolinium (Gd(dpm)$_3$), followed by 2.0 ml of a toluene solution (0.004 mol/L) of triphenylcarbenium tetrakis(pentafluorophenyl)borate were added. After a polymerization was performed at 50° C. for 20 minutes, 0.3 ml of a modifier, 3-methoxybenzyl chloride (MOBC), was added thereto, and a modification reaction was performed at the same temperature for 10 minutes. After 5 ml of an ethanol solution containing an antioxidant was added thereto, the inside pressure of the autoclave was released, and then ethanol was poured into the polymerization solution to recover polybutadiene. Then, the recovered polybutadiene was dried in vacuo at 80° C. for 3 hours. The polymerization results are shown in Table 6.

Example 63

An inside of an autoclave with an inner capacity of 1.5 L was substituted by nitrogen, and a solution including 495 ml of a cyclohexane solvent and 500 ml of butadiene was filled therein. Subsequently, 2.0 ml of a cyclohexane solution (2 mol/L) of triethyl aluminum (TEAL) was added thereto. Next, 0.8 ml of a cyclohexane solution (0.005 mol/L) of tris(2,2,6,6-tetramethyl-3,5-heptanedionato)gadolinium (Gd(dpm)$_3$), followed by 2.0 ml of a cyclohexane solution (0.1 mol/L) of diisobutyl aluminum hydride (DIBAH) and 2.0 ml of a toluene solution (0.004 mol/L) of triphenylcarbenium tetrakis(pentafluorophenyl)borate were added. After a polymerization was performed at 50° C. for 20 minutes, 1.0 ml of a modifier, a cyclohexane solution (2 mol/L) of piperonyl chloride (PPCl) was added thereto, and a modification reaction was performed at the same temperature for 10 minutes. After 5 ml of an ethanol solution containing an antioxidant was added thereto, the inside pressure of the autoclave was released, and then ethanol was poured into the polymerization solution to recover polybutadiene. Then, the recovered polybutadiene was dried in vacuo at 80° C. for 3 hours. The polymerization results are shown in Table 6.

Example 64

An inside of an autoclave with an inner capacity of 1.5 L was substituted by nitrogen, and a solution including 245 ml of a cyclohexane solvent and 250 ml of butadiene was filled therein. Subsequently, 1.25 ml of a toluene solution (2 mol/L) of triethyl aluminum (TEAL) was added thereto. Next, 0.4 ml of a cyclohexane solution (0.005 mol/L) of tris(2,2,6,6-tetramethyl-3,5-heptanedionato)gadolinium (Gd(dpm)$_3$), followed by 1.0 ml of a toluene solution (0.004 mol/L) of triphenylcarbenium tetrakis(pentafluorophenyl)borate were added. After a polymerization was performed at 50° C. for 25 minutes, 3 ml of an ethanol solution containing an antioxidant was added thereto, and the inside pressure of the autoclave was released. Ethanol was poured into the polymerization solution to recover polybutadiene, and then the recovered polybutadiene was dried in vacuo at 80° C. for 3 hours. The polymerization results are shown in Table 6.

Physical properties of the obtained cis-1,4-polybutadienes shown in Table 6.

TABLE 6

| | Gd Catalyst | Modifier | Monomer concentration (wt %) | Productivity (g · mmol$^{-1}$-Cat · h$^{-1}$) | Cis (%) | Trans (%) | Vinyl (%) | Mn/10$^4$ | Mw/10$^4$ | Mw/Mn | Degree of modification |
|---|---|---|---|---|---|---|---|---|---|---|---|
| Example 59 | Gd(dpm)$_3$ | PPCl | 45 | 28236 | 96.0 | 3.2 | 0.8 | 17.9 | 51.6 | 2.88 | 0.42 |
| Example 60 | Gd(dpm)$_3$ | PPCl | 50 | 27030 | 96.4 | 2.8 | 0.8 | 23.7 | 74.4 | 3.14 | 0.36 |
| Example 61 | Gd(dpm)$_3$ | DMBB | 44 | 39096 | 95.8 | 3.4 | 0.8 | 19.9 | 60.3 | 3.03 | 0.15 |
| Example 62 | Gd(dpm)$_3$ | MOBC | 44 | 47333 | 95.1 | 4.0 | 0.9 | 19.8 | 62.6 | 3.16 | 0.26 |
| Example 63 | Gd(dpm)$_3$ | PPCl | 44 | 44918 | 95.8 | 3.3 | 0.9 | 19.9 | 63.1 | 3.17 | 0.47 |
| Example 64 | Gd(dpm)$_3$ | — | 45 | 32040 | 96.0 | 3.2 | 0.8 | 18.0 | 49.1 | 2.73 | 0.00 |

Example 65

An inside of an autoclave with an inner capacity of 1.5 L was substituted by nitrogen, and a solution including 295 ml of a toluene solvent and 300 ml of butadiene was filled therein. Subsequently, 0.13 MPa of hydrogen gas was introduced, and 1.8 ml of a toluene solution (2 mol/L) of triethyl aluminum (TEAL) was added thereto. Next, 1.05 ml of a toluene solution (0.02 mol/L) of tris(2,6-dimethyl-3,5-heptanedionato)gadolinium (Gd(dibm)$_3$), followed by 0.1 ml of a toluene solution (0.43 mol/L) of triphenylcarbenium tetrakis(pentafluorophenyl)borate were added. After a polymerization was performed at 40° C. for 25 minutes, 2.1 ml of a modifier, a toluene solution (0.2 mol/L) of heliotropin (HLT) was added thereto, and a modification reaction was performed at the same temperature for 15 minutes. After 3 ml of an ethanol solution containing an antioxidant was added thereto, the inside pressure of the autoclave was released, and then ethanol was poured into the polymerization solution to recover polybutadiene. Then, the recovered polybutadiene was dried in vacuo at 80° C. for 3 hours. The polymerization results are shown in Table 7.

Example 66

An inside of an autoclave with an inner capacity of 1.5 L was substituted by nitrogen, and a solution including 295 ml of a toluene solvent and 300 ml of butadiene was filled therein. Subsequently, 0.2 MPa of hydrogen gas was introduced, and 1.8 ml of a toluene solution (2 mol/L) of triethyl aluminum (TEAL) was added thereto. Next, 1.05 ml of a toluene solution (0.02 mol/L) of tris(2,6-dimethyl-3,5-heptanedionato)gadolinium (Gd(dibm)$_3$), followed by 0.1 ml of a toluene solution (0.43 mol/L) of triphenylcarbenium tetrakis(pentafluorophenyl)borate were added. After a polymerization was performed at 40° C. for 25 minutes, 2.1 ml of a modifier, a toluene solution (0.2 mol/L) of heliotropin (HLT), was added thereto, and a modification reaction was performed at the same temperature for 15 minutes. After 3 ml of an ethanol solution containing an antioxidant was added thereto, the inside pressure of the autoclave was released, and ethanol was poured into the polymerization solution to recover polybutadiene. Then, the recovered polybutadiene was dried in vacuo at 80° C. for 3 hours. The polymerization results are shown in Table 7.

Example 67

An inside of an autoclave with an inner capacity of 1.5 L was substituted by nitrogen, and a solution including 245 ml of a cyclohexane solvent and 250 ml of butadiene was filled therein. Subsequently, 0.5 ml of a cyclohexane solution (2 mol/L) of triethyl aluminum (TEAL) was added thereto. Next, 0.2 ml of a toluene solution (0.02 mol/L) of tris(2,2,6,6-tetramethyl-3,5-heptanedionato)gadolinium (Gd(dpm)$_3$), followed by 0.13 ml of a cyclohexane solution (1 mol/L) of diisobutyl aluminum hydride (DIBAH) and 1.0 ml of a toluene solution (0.004 mol/L) of triphenylcarbenium tetrakis(pentafluorophenyl)borate were added. After a polymerization was performed at 40° C. for 25 minutes, 1.0 ml of a modifier, a toluene solution (0.2 mol/L) of heliotropin (HLT), was added thereto, and a modification reaction was performed at the same temperature for 15 minutes. After 3 ml of an ethanol solution containing an antioxidant was added thereto, the inside pressure of the autoclave was released, and ethanol was poured into the polymerization solution to recover polybutadiene. Then, the recovered polybutadiene was dried in vacuo at 80° C. for 3 hours. The polymerization results are shown in Table 7.

Example 68

An inside of an autoclave with an inner capacity of 1.5 L was substituted by nitrogen, and a solution including 280 ml of a cyclohexane solvent and 220 ml of butadiene was filled therein. Subsequently, 1.0 ml of a cyclohexane solution (2 mol/L) of triethyl aluminum (TEAL) was added thereto. Next, 0.4 ml of a cyclohexane solution (0.005 mol/L) of tris(2,2,6,6-tetramethyl-3,5-heptanedionato)gadolinium (Gd(dpm)$_3$), followed by 1.0 ml of a toluene solution (0.004 mol/L) of triphenylcarbenium tetrakis(pentafluorophenyl)borate were added. After a polymerization was performed at 50° C. for 30 minutes, 0.1 ml of a modifier, veratrum aldehyde (VTA) (10.5 mol/L), was added thereto, and a modification reaction was performed at the same temperature for 5 minutes. After 3 ml of an ethanol solution containing an antioxidant was added thereto, the inside pressure of the autoclave was released, and ethanol was poured into the polymerization solution to recover polybutadiene. Then, the recovered polybutadiene was dried in vacuo at 80° C. for 3 hours. The polymerization results are shown in Table 7.

Example 69

An inside of an autoclave with an inner capacity of 1.5 L was substituted by nitrogen, and a solution including 295 ml of a toluene solvent and 300 ml of butadiene was filled therein. Subsequently, 0.13 MPa of hydrogen gas was introduced, and 1.8 ml of a toluene solution (2 mol/L) of triethyl aluminum (TEAL) was added thereto. Next, 1.05 ml of a toluene solution (0.02 mol/L) of tris(2,6-dimethyl-3,5-heptanedionato)gadolinium (Gd(dibm)$_3$), followed by 0.1 ml of a toluene solution (0.43 mol/L) of triphenylcarbenium tetrakis(pentafluorophenyl)borate were added. After a polymerization was performed at 40° C. for 25 minutes, 3 ml of an ethanol solution containing an antioxidant was added to stop the polymerization, and the inside pressure of the autoclave was released. Ethanol was poured into the polymerization solution to recover polybutadiene. Then, the recovered polybutadiene was dried in vacuo at 80° C. for 3 hours. The polymerization results are shown in Table 7.

Example 70

An inside of an autoclave with an inner capacity of 1.5 L was substituted by nitrogen, and a solution including 245 ml of a cyclohexane solvent and 250 ml of butadiene was filled therein, to which 0.5 ml of a cyclohexane solution (2 mol/L) of triethyl aluminum (TEAL) was added thereto. Next, 0.2 ml of a toluene solution (0.02 mol/L) of tris(2,2,6,6-tetramethyl-3,5-heptanedionato)gadolinium (Gd(dpm)$_3$), followed by 0.13 ml of a cyclohexane solution (1 mol/L) of diisobutyl aluminum hydride (DIBAH) and 1.0 ml of a toluene solution (0.004 mol/L) of triphenylcarbenium tetrakis(pentafluorophenyl)borate were added. After a polymerization was performed at 40° C. for 25 minutes, 3 ml of an ethanol solution containing an antioxidant was added to stop the polymerization, and the inside pressure of the autoclave was released. Ethanol was poured into the polymerization solution to recover polybutadiene. Then, the recovered polybutadiene was dried in vacuo at 80° C. for 3 hours. The polymerization results are shown in Table 7.

Example 71

An inside of an autoclave with an inner capacity of 1.5 L was substituted by nitrogen, and a solution including 280 ml of a cyclohexane solvent and 220 ml of butadiene was filled therein. Subsequently, 1.0 ml of a cyclohexane solution (2 mol/L) of triethyl aluminum (TEAL) was added thereto. Next, 0.4 ml of a cyclohexane solution (0.005 mol/L) of tris(2,2,6,6-tetramethyl-3,5-heptanedionato)gadolinium (Gd(dpm)$_3$), followed by 1.0 ml of a toluene solution (0.004 mol/L) of triphenylcarbenium tetrakis(pentafluorophenyl)borate were added. After a polymerization was performed at 50° C. for 25 minutes, 3 ml of an ethanol solution containing an antioxidant was added to stop the polymerization, and the inside pressure of the autoclave was released. Ethanol was poured into the polymerization solution to recover polybutadiene. Then, the recovered polybutadiene was dried in vacuo at 80° C. for 3 hours. The polymerization results are shown in Table 7.

Physical properties of the obtained cis-1,4-polybutadienes shown in Table 7.

TABLE 7

| | Gd catalyst | Modifier | Monomer concentration | Productivity (g · mmol$^{-1}$·Cat · h$^{-1}$) | Cis (%) | Trans (%) | Vinyl (%) | Mn/ 10$^4$ | Mw/ 10$^4$ | Mw/ Mn | Degree of modification |
|---|---|---|---|---|---|---|---|---|---|---|---|
| Example 65 | Gd(dibm)$_3$ | HLT | 41 | 7680 | 98.9 | 0.6 | 0.5 | 23.6 | 82.8 | 3.51 | 0.84 |
| Example 66 | Gd(dibm)$_3$ | HLT | 42 | 6821 | 98.9 | 0.6 | 0.5 | 17.8 | 52.6 | 2.95 | 0.55 |
| Example 67 | Gd(dpm)$_3$ | HLT | 45 | 17328 | 97.2 | 2.1 | 0.6 | 22.1 | 56.9 | 2.57 | 0.17 |
| Example 68 | Gd(dpm)$_3$ | VTA | 38 | 32770 | 96.5 | 2.7 | 0.8 | 26.4 | 78.0 | 2.96 | 0.53 |
| Example 69 | Gd(dibm)$_3$ | — | 42 | 8118 | 99.2 | 0.3 | 0.5 | 24.3 | 58.1 | 2.39 | 0.00 |
| Example 70 | Gd(dpm)$_3$ | — | 45 | 15486 | 97.3 | 2.1 | 0.6 | 22.0 | 49.3 | 2.24 | 0.00 |
| Example 71 | Gd(dpm)$_3$ | — | 38 | 34224 | 95.2 | 4.0 | 0.8 | 22.7 | 69.7 | 3.07 | 0.00 |

Example 72

(1) Production of Cis-1,4 Component

An inside of an autoclave with an inner capacity of 1.5 L was substituted by nitrogen, and a solution including 245 ml of cyclohexane and 250 ml of butadiene was filled therein, to which 1.25 ml of a cyclohexane solution (2 mol/L) of triethyl aluminum (TEAL) was added. Next, 0.5 ml of a cyclohexane solution (5 mmol/L) of tris(2,2,6,6-tetramethyl-heptane 3,5-dionate)gadolinium, followed by 1.25 ml of a toluene solution (0.004 mol/L) of triphenylcarbenium tetrakispentafluorophenylborate were added, and a polymerization was initiated and continued at 50° C. for 25 minutes.

(2) Production of Syndiotactic-1,2 Component

Next, 1.0 ml of a cyclohexane solution (1 mol/L) of triethyl aluminum (TEA) and 9.0 μl of water were added, to which 10.0 ml of a cyclohexane solution (0.005 mol/L) of cobalt octylate (Co(Oct)$_2$) and 0.3 ml of a cyclohexane solution (1 mol/L) of carbon disulfide (CS$_2$) were added. A polymerization was performed at 50° C. for 15 minutes, and then 3 ml of an ethanol/heptane (1/1) solution containing an antioxidant was added to stop the polymerization. After the inside pressure of the autoclave was released, ethanol was poured into the polymerization solution to recover polybutadiene. Then, the recovered polybutadiene was dried in vacuo at 80° C. for 3 hours. The polymerization results are shown in Table 8.

Example 73

(1) Production of cis-1,4 Component

An inside of an autoclave with an inner capacity of 1.5 L was substituted by nitrogen, and a solution including 245 ml of cyclohexane and 250 ml of butadiene was filled therein, to which 2.0 ml of a cyclohexane solution (2 mol/L) of triethyl aluminum (TEAL) was added. Next, 0.5 ml of a cyclohexane solution (5 mmol/L) of tris(2,2,6,6-tetramethyl-heptane-3,5-dionate)gadolinium, followed by 1.25 ml of a toluene solution (0.004 mol/L) of triphenylcarbenium tetrakispentafluorophenylborate were added, and a polymerization was initiated and continued at 50° C. for 25 minutes.

(2) Production of Syndiotactic-1,2 Component

Next, 0.25 ml of a cyclohexane solution (1 mol/L) of triethyl aluminum (TEA) and 9.0 μl of water were added, to which 5.0 ml of a cyclohexane solution (0.005 mol/L) of cobalt octylate (Co(Oct)$_2$) and 0.3 ml of a cyclohexane solution (1 mol/L) of carbon disulfide (CS$_2$) were added. A polymerization was performed at 50° C. for 15 minutes, and then 3 ml of an ethanol/heptane (1/1) solution containing an antioxidant was added to stop the polymerization. After the inside pressure of the autoclave was released, ethanol was poured into the polymerization solution to recover polybutadiene. Then, the recovered polybutadiene was dried in vacuo at 80° C. for 3 hours. The polymerization results are shown in Table 8.

Example 74

(1) Production of cis-1,4 Component

An inside of an autoclave with an inner capacity of 1.5 L was substituted by nitrogen, and a solution including 245 ml of cyclohexane and 250 ml of butadiene was filled therein, to which 2.5 ml of a cyclohexane solution (2 mol/L) of triethyl aluminum (TEAL) was added. Next, 0.5 ml of a cyclohexane solution (0.005 mol/L) of tris(2,2,6,6-tetramethyl-heptane-3,5-dionate)gadolinium, followed by 1.25 ml of a toluene solution (0.004 mol/L) of triphenylcarbenium tetrakispentafluorophenylborate were added, and a polymerization was initiated and continued at 50° C. for 25 minutes.

(2) Production of Syndiotactic-1,2 Component

Next, 0.25 ml of a cyclohexane solution (1 mol/L) of triethyl aluminum (TEA) and 9.0 μl of water were added, to which 0.35 ml of a cyclohexane solution (0.1 mol/L) of cobalt octylate (Co(Oct)$_2$) and 0.3 ml of a cyclohexane solution (1 mol/L) of carbon disulfide (CS$_2$) were added. A polymerization was performed at 50° C. for 15 minutes, and then 3 ml of an ethanol/heptane (1/1) solution containing an antioxidant was added to stop the polymerization. After the inside pressure of the autoclave was released, ethanol was poured into the polymerization solution to recover polybutadiene. Then, the recovered polybutadiene was dried in vacuo at 80° C. for 3 hours. The polymerization results are shown in Table 8.

Example 75

(1) Production of cis-1,4 Component

An inside of an autoclave with an inner capacity of 1.5 L was substituted by nitrogen, and a solution including 245 ml of cyclohexane and 250 ml of butadiene was filled therein, to which 2.5 ml of a cyclohexane solution (2 mol/L) of triethyl aluminum (TEAL) was added. Next, 0.5 ml of a cyclohexane solution (0.005 mol/L) of tris(2,2,6,6-tetramethyl-heptane-3,5-dionate)gadolinium, followed by 1.25 ml of a toluene solution (0.004 mol/L) of triphenylcarbenium tetrakispentafluorophenylborate were added, and a polymerization was initiated and continued at 50° C. for 25 minutes.

(2) Production of Syndiotactic-1,2 Component

Next, 0.25 ml of a cyclohexane solution (1 mol/L) of triethyl aluminum (TEA) and 9.0 µl of water were added, to which 0.3 ml of a cyclohexane solution (0.1 mol/L) of cobalt octylate ($Co(Oct)_2$) and 1.0 ml of a cyclohexane solution (1 mol/L) of carbon disulfide (CS2) were added. A polymerization was performed at 50° C. for 15 minutes, and then 3 ml of an ethanol/heptane (1/1) solution containing an antioxidant was added to stop the polymerization. After the inside pressure of the autoclave was released, ethanol was poured into the polymerization solution to recover polybutadiene. Then, the recovered polybutadiene was dried in vacuo at 80° C. for 3 hours. The polymerization results are shown in Table 8.

Reference Example 1

(1) Production of cis-1,4 Component

An inside of an autoclave with an inner capacity of 1.5 L was substituted by nitrogen, and a solution including 245 ml of cyclohexane and 250 ml of butadiene was filled therein, to which 1.25 ml of a cyclohexane solution (2 mol/L) of triethyl aluminum (TEAL) was added. Next, 0.5 ml of a cyclohexane solution (0.005 mol/L) of tris(2,2,6,6-tetramethyl-heptane-3,5-dionate)gadolinium, followed by 1.25 ml of a toluene solution (0.004 mol/L) of triphenylcarbenium tetrakispentafluorophenylborate were added, and a polymerization was initiated and continued at 50° C. for 25 minutes.

Comparative Example 5

(1) Production of cis-1,4 Component Using Co Catalyst

An inside of an autoclave with an inner capacity of 1.6 L was substituted by nitrogen, and 700 ml of a mixed solution including 30% by weight of butadiene, 41% by weight of cyclohexane, and 29% by weight of 2-butene was filled therein, to which 0.7 ml of a cyclohexane solution (0.25 mol/L) of carbon disulfide ($CS_2$) was added and water ($H_2O$) was added so that a concentration was 2.4 mmol/L, at room temperature. The mixture was stirred at 25° C. for 30 minutes at 400 rpm, to which 3 ml of a cyclohexane solution (1 mol/L) of diethyl aluminum chloride (DEAC), 0.5 ml of a cyclohexane solution (0.02 mol/L) of dilauryl thiodipropionate (TPL), and 1.7 ml of a cyclohexane solution (5 mol/L) of 1,5-cyclooctadiene were added, and the mixture was stirred 25° C. for 5 minutes. After that, the mixture was heated to 55° C., to which 1 ml of a cyclohexane solution (0.005 mol/L) of cobalt octylate ($Co(Oct)_2$) was added, and a polymerization was initiated and continued at 60° C. for 20 minutes.

(2) Production of Syndiotactic-1,2 Component

Next, 2.25 ml of a cyclohexane solution (2 mol/L) of triethyl aluminum (TEA) was added, and the mixture was stirred for 2 minutes. Water was added thereto so that a concentration was 4.3 mmol/L, and the mixture was stirred for 5 minutes. 1.2 ml of a cyclohexane solution (0.05 mol/L) of cobalt octylate ($Co(Oct)_2$) was added thereto, and the polymerization was continued at 60° C. for further 20 minutes. 5 ml of an ethanol/heptane (1/1) solution containing an antioxidant was added to stop the polymerization. After the inside pressure of the autoclave was released, the polymerization solution was poured into ethanol to recover polybutadiene. Then, the recovered polybutadiene was dried in vacuo at 80° C. for 6 hours. The polymerization results are shown in Table 8.

Comparative Example 6

An inside of an autoclave with an inner capacity of 1.6 L was substituted by nitrogen, and 700 ml of a mixed solution including 30% by weight of butadiene, 41% by weight of cyclohexane, and 29% by weight of 2-butene was filled therein, to which 0.7 ml of a cyclohexane solution (0.25 mol/L) of carbon disulfide ($CS_2$) was added and water ($H_2O$) was added so that a concentration was 2.4 mmol/L, at room temperature, and the mixture was stirred at 25° C. for 30 minutes at 400 rpm. To the mixture were added 3 ml of a cyclohexane solution (1 mol/L) of diethyl aluminum chloride (DEAC), 0.5 ml of a cyclohexane solution (0.02 mol/L) of dilauryl thiodipropionate (TPL), and 1.7 ml of a cyclohexane solution (5 mol/L) of 1,5-cyclooctadiene were added, and the resulting mixture was stirred at 25° C. for 5 minutes. After that, the mixture was heated to 55° C., to which 1 ml of a cyclohexane solution (0.005 mol/L) of cobalt octylate ($Co(Oct)_2$) was added, and a polymerization was initiated and continued at 60° C. for 20 minutes. 5 ml of an ethanol/heptane (1/1) solution containing an antioxidant was added to stop the polymerization. After the inside pressure of the autoclave was released, the polymerization solution was poured into ethanol to recover polybutadiene. Then, the recovered polybutadiene was dried in vacuo at 80° C. for 6 hours. The polymerization results are shown in Table 8.

Comparative Example 7

(1) Production of Cis-1,4 Component Using Y Catalyst System

An inside of an autoclave with an inner capacity of 2 L was substituted by nitrogen, and a solution including 390 ml of toluene and 210 ml of butadiene was filled therein. After the temperature of the solution was elevated to 30° C., 0.9 ml of a toluene solution (2 mol/L) of diethyl aluminum hydride (DEAH) was added thereto, and the mixture was at 550 rpm for 3 minutes. Next, 1.8 ml of a toluene solution (20 mmol/L) of tris(2,2,6,6-tetramethyl-heptane-3,5-dionate)yttrium was added thereto, and the temperature thereof was elevated to 40° C. After a 4 minute-stirring, 0.18 ml of a toluene solution (0.43 mol/L) of triphenylcarbenium tetrakispentafluorophenylborate was added thereto, and a polymerization was initiated and continued at 40° C. for 30 minutes.

(2) Production of Syndiotactic-1,2 Component

Next, 1.8 ml of a toluene solution (1 mol/L) of triethyl aluminum (TEA) was added, to which 1.0 mmol/L of water ($H_2O$) was added, followed by adding 1.8 ml of a toluene solution (0.05 mol/L) of cobalt octylate ($Co(Oct)_2$) and 0.36 ml of a toluene solution (1 mol/L) of carbon disulfide ($CS_2$), and the polymerization was performed at 40° C. for 10 minutes. 5 ml of an ethanol/heptane (1/1) solution containing an antioxidant was added to stop the polymerization. After the inside pressure of the autoclave was released, the polymerization solution was poured into ethanol to recover polybutadiene. Then, the recovered polybutadiene was dried in vacuo at 80° C. for 6 hours. The polymerization results are shown in Table 8.

Comparative Example 8

An inside of an autoclave with an inner capacity of 2 L was substituted by nitrogen, and a solution including 390 ml of toluene and 210 ml of butadiene was filled therein. After the temperature of the solution was elevated to 30° C., 0.9 ml of a toluene solution (2 mol/L) of diethyl aluminum hydride (DEAH) was added thereto, and the mixture was stirred at 550 rpm for 3 minutes. Next, 1.8 ml of a toluene solution (20 mmol/L) of tris(2,2,6,6-tetramethyl-heptane-3,5-dionate)yttrium was added thereto, and the temperature thereof was elevated to 40° C. After a 4 minute-stirring, 0.18 ml of a toluene solution (0.43 mol/L) of triphenylcarbenium tetrakispentafluorophenylborate was added thereto, and a polymerization was initiated and continued at 40° C. for 30 minutes. 5 ml of an ethanol/heptane (1/1) solution containing an antioxidant was added to stop the polymerization. After the inside pressure of the autoclave was released, the polymerization solution was poured into ethanol to recover polybutadiene. Next, the recovered polybutadiene was dried in vacuo at 80° C. for 6 hours. The polymerization results are shown in Table 8.

released, ethanol was poured into the polymerization solution to recover polybutadiene. Then, the recovered polybutadiene was dried in vacuo at 80° C. for 3 hours. The recovered polybutadiene had a melting point, according to the DSC measurement of polybutadiene, of −8.4° C., and a fusion heat amount of 43.5 J/g. Other polymerization results are shown in Table 9.

Example 77

An inside of an autoclave with an inner capacity of 1.5 L was substituted by nitrogen, and a solution including 295 ml of a toluene solvent and 300 ml of butadiene was filled therein. Subsequently, 0.13 MPa of hydrogen gas was introduced, and 1.8 ml of a toluene solution (2 mol/L) of triethyl aluminum (TEAL) was added thereto. Next, 1.05 ml of a toluene solution (0.02 mol/L) of tris(2,6-dimethyl-3,5-heptanedionato)gadolinium (Gd(dibm)$_3$), followed by 0.1 ml of a toluene solution (0.043 mol/L) of triphenylcarbenium tetrakis(pentafluorophenyl)borate were added. A polymerization was performed at 40° C. for 25 minutes, and then 4 ml of an ethanol solution containing an antioxidant was added. After the inside pressure of the autoclave was released, ethanol was poured into the polymerization solution to recover polybutadiene. Then, the recovered polybutadiene was dried in vacuo at 80° C. for 3 hours. The recovered polybutadiene had a melting point, according to the DSC measurement of polybutadiene, of −6.6° C., and a fusion heat amount of 45.6 J/g. Other polymerization results are shown in Table 9.

Example 78

An inside of an autoclave with an inner capacity of 1.5 L was substituted by nitrogen, and a solution including 495 ml

TABLE 8

| | Catalyst for cis-polymerization | Productivity (kg/mmol-Cat.) | TEAL (mM) | H$_2$O (mM) | Co(Oct)$_2$ (mM) | CS$_2$ (mM) | Yield (g/L) | ML$_{1+4}$ (100° C.) | H.I. (%) | Tm (° C.) |
|---|---|---|---|---|---|---|---|---|---|---|
| Example 72 | Gd(dpm)$_3$ | 15.5 | 5.0 | 1.0 | 0.10 | 0.6 | 77.4 | 186 | 17.2 | 200.6 |
| Example 73 | Gd(dpm)$_3$ | 15.2 | 8.0 | 1.0 | 0.05 | 0.6 | 75.8 | 59 | 8.6 | 198.8 |
| Example 74 | Gd(dpm)$_3$ | 16.5 | 10.0 | 1.0 | 0.07 | 0.6 | 82.3 | 60 | 16.1 | 198.1 |
| Example 75 | Gd(dpm)$_3$ | 15.4 | 10.0 | 1.0 | 0.06 | 0.6 | 77.1 | 66 | 14.3 | 199.5 |
| Reference Example 1 | Gd(dpm)$_3$ | 12.5 | 5.0 | — | — | — | 62.7 | 44 | — | — |
| Comparative Example 5 | Co(Oct)$_2$ | 17.1 | 6.4 | 4.3 | 0.09 | 0.25 | 122.4 | 56 | 11.4 | 198.6 |
| Comparative Example 6 | Co(Oct)$_2$ | 15.6 | — | — | — | — | 111.5 | 30 | — | — |
| Comparative Example 7 | Y(dpm)$_3$ | 1.7 | 3.0 | 1.0 | 0.15 | 0.6 | 104.8 | 92 | 14.2 | 204.6 |
| Comparative Example 8 | Y(dpm)$_3$ | 1.3 | — | — | — | — | 79.5 | 32 | — | — |

Example 76

An inside of an autoclave with an inner capacity of 1.5 L was substituted by nitrogen, and a solution including 395 ml of a toluene solvent and 400 ml of butadiene was filled therein. Subsequently, 0.14 MPa hydrogen gas was introduced, and 1.2 ml of a toluene solution (2 mol/L) of triethyl aluminum (TEAL) was added thereto. Next, 2.25 ml of a toluene solution (0.005 mol/L) of tris(2,2,6,6-tetramethyl-3,5-heptanedionato)gadolinium (Gd(dpm)$_3$), followed by 5.6 ml of a toluene solution (0.004 mol/L) of triphenylcarbenium tetrakis(pentafluorophenyl)borate were added. A polymerization was performed at 40° C. for 25 minutes, and then 4 ml of an ethanol solution containing an antioxidant was added. After the inside pressure of the autoclave was of a cyclohexane solvent and 500 ml of butadiene was filled therein. Subsequently, 3.0 ml of a cyclohexane solution (2 mol/L) of triethyl aluminum (TEAL) and 1.6 ml of a toluene solution (0.005 mol/L) of tris(2,2,6,6-tetramethyl-3,5-heptanedionato)gadolinium (Gd(dpm)$_3$), followed by 4.0 ml of a toluene solution (0.004 mol/L) of triphenylcarbenium tetrakis(pentafluorophenyl)borate were added. A polymerization was performed at 40° C. for 25 minutes, and 4 ml of an ethanol solution containing an antioxidant was added thereto. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 9.

Example 79

An inside of an autoclave with an inner capacity of 1.5 L was substituted by nitrogen, and a solution including 545 ml of a cyclohexane solvent and 550 ml of butadiene was filled therein. Subsequently, 3.3 ml of a cyclohexane solution (2 mol/L) of triethyl aluminum (TEAL) and 0.44 ml of a toluene solution (0.02 mol/L) of tris(2,2,6,6-tetramethyl-3,5-heptanedionato)gadolinium (Gd(dpm)$_3$), followed by 4.4 ml of a toluene solution (0.004 mol/L) of triphenylcarbenium tetrakis(pentafluorophenyl)borate were added. A polymerization was performed at 40° C. for 25 minutes, and 4 ml of an ethanol solution containing an antioxidant was added thereto. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 9.

Example 80

An inside of an autoclave with an inner capacity of 1.5 L was substituted by nitrogen, and a solution including 545 ml of a cyclohexane solvent and 550 ml of butadiene was filled therein. Subsequently, 1.1 ml of a cyclohexane solution (2 mol/L) of triethyl aluminum (TEAL) and 0.44 ml of a toluene solution (0.02 mol/L) of tris(2,2,6,6-tetramethyl-3,5-heptanedionato)gadolinium (Gd(dpm)$_3$), followed by 0.33 ml of a cyclohexane solution (1.0 mol/L) of diisobutyl aluminum hydride (DIBAH) and 2.2 ml of a toluene solution (0.004 mol/L) of triphenylcarbenium tetrakis(pentafluorophenyl)borate were added. A polymerization was performed at 40° C. for 25 minutes, and 4 ml of an ethanol solution containing an antioxidant was added. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 9.

Example 81

An inside of an autoclave with an inner capacity of 1.5 L was substituted by nitrogen, and a solution including 540 ml of a cyclohexane solvent and 550 ml of butadiene was filled therein. Subsequently, 3.4 ml of a cyclohexane solution (2 mol/L) of triethyl aluminum (TEAL) and 1.76 ml of a toluene solution (0.005 mol/L) of tris(2,2,6,6-tetramethyl-3,5-heptanedionato)gadolinium (Gd(dpm)$_3$), followed by 4.4 ml of a toluene solution (0.004 mol/L) of triphenylcarbenium tetrakis(pentafluorophenyl)borate were added. A polymerization was performed at 40° C. for 25 minutes, and 4 ml of an ethanol solution containing an antioxidant was added. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 9.

Example 82

An inside of an autoclave with an inner capacity of 1.5 L was substituted by nitrogen, and a solution including 545 ml of a cyclohexane solvent and 550 ml of butadiene was filled therein. Subsequently, 2.75 ml of a cyclohexane solution (2 mol/L) of triethyl aluminum (TEAL) and 0.88 ml of a toluene solution (0.005 mol/L) of tris(2,2,6,6-tetramethyl-3,5-heptanedionato)gadolinium (Gd(dpm)$_3$), followed by 2.2 ml of a toluene solution (0.004 mol/L) of triphenylcarbenium tetrakis(pentafluorophenyl)borate were added. A polymerization was performed at 50° C. for 25 minutes, and 4 ml of an ethanol solution containing an antioxidant was added. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 9.

Example 83

An inside of an autoclave with an inner capacity of 1.5 L was substituted by nitrogen, and a solution including 495 ml of a cyclohexane solvent and 500 ml of butadiene was filled therein. Subsequently, 2.0 ml of a cyclohexane solution (2 mol/L) of triethyl aluminum (TEAL) and 0.8 ml of a toluene solution (0.02 mol/L) of tris(2,2,6,6-tetramethyl-3,5-heptanedionato)gadolinium (Gd(dpm)$_3$), followed by 1.7 ml of a cyclohexane solution (0.1 mol/L) of diisobutyl aluminum hydride (DIBAH) and 2.0 ml of a toluene solution (0.004 mol/L) of triphenylcarbenium tetrakis(pentafluorophenyl)borate were added. A polymerization was performed at 50° C. for 25 minutes, and 4 ml of an ethanol solution containing an antioxidant was added. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 9.

Example 84

An inside of an autoclave with an inner capacity of 1.5 L was substituted by nitrogen, and a solution including 495 ml of a cyclohexane solvent and 500 ml of butadiene was filled therein. Subsequently, 2.0 ml of a cyclohexane solution (2 mol/L) of triethyl aluminum (TEAL) and 0.8 ml of a toluene solution (0.02 mol/L) of tris(2,2,6,6-tetramethyl-3,5-heptanedionato)gadolinium (Gd(dpm)$_3$), followed by 0.2 ml of a cyclohexane solution (1.0 mol/L) of diisobutyl aluminum hydride (DIBAH) and 2.0 ml of a toluene solution (0.004 mol/L) of triphenylcarbenium tetrakis(pentafluorophenyl)borate were added. A polymerization was performed at 50° C. for 25 minutes, and 4 ml of an ethanol solution containing an antioxidant was added. The inside pressure of the autoclave was released, and then ethanol was poured into the polymerization solution to recover polybutadiene. Then, the recovered polybutadiene was dried in vacuo at 80° C. for 3 hours. The polymerization results are shown in Table 9.

Physical properties of the obtained cis-1,4-polybutadienes are shown in Table 9.

TABLE 9

| | Catalyst | Productivity (g · mmol$^{-1}$-Cat · h$^{-1}$) | ML$_{1+4}$ (100° C.) | Cis (%) | Trans (%) | Vinyl (%) | Mn/10$^4$ | Mw/10$^4$ | Mw/Mn |
|---|---|---|---|---|---|---|---|---|---|
| Example 76 | Gd(dpm)$_3$ | 12592 | 50 | 98.8 | 0.6 | 0.5 | 24.7 | 61.0 | 2.47 |
| Example 77 | Gd(dbm)$_3$ | 9345 | 44 | 99.2 | 0.4 | 0.5 | 24.4 | 57.7 | 2.36 |
| Example 78 | Gd(dpm)$_3$ | 17757 | 47 | 95.8 | 3.4 | 0.8 | 22.4 | 54.6 | 2.44 |

TABLE 9-continued

| | Catalyst | Productivity (g · mmol$^{-1}$-Cat · h$^{-1}$) | ML$_{1+4}$ (100° C.) | Cis (%) | Trans (%) | Vinyl (%) | Mn/10$^4$ | Mw/10$^4$ | Mw/Mn |
|---|---|---|---|---|---|---|---|---|---|
| Example 79 | Gd(dpm)$_3$ | 18584 | 51 | 96.1 | 3.2 | 0.7 | 21.2 | 50.5 | 2.39 |
| Example 80 | Gd(dpm)$_3$ | 17542 | 49 | 97.1 | 2.2 | 0.7 | 21.9 | 49.8 | 2.27 |
| Example 81 | Gd(dpm)$_3$ | 18256 | 46 | 96.0 | 3.2 | 0.8 | 19.1 | 47.7 | 2.50 |
| Example 82 | Gd(dpm)$_3$ | 36436 | 53 | 95.9 | 3.2 | 0.8 | 19.9 | 56.6 | 2.85 |
| Example 83 | Gd(dpm)$_3$ | 37554 | 45 | 96.2 | 3.0 | 0.8 | 19.4 | 56.1 | 2.89 |

Example 85

A first compounding, in which carbon black, zinc oxide, stearic acid, and an antioxidant were added to a polybutadiene synthesized according to Example 76 in a compounding formulation shown in Table 10 in a plastomill, and the mixture was kneaded, was performed. Next, a second compounding of addition of a vulcanization accelerator and sulfur through a roller was performed to produce a compounded rubber. The compounded rubber was molded according to desired physical properties. Physical properties of a vulcanized product obtained by press-vulcanization at 150° C. were measured. The measurement results of various physical properties of the formulation are shown in Table 11.

Example 86

A first compounding, in which carbon black, zinc oxide, stearic acid, and an antioxidant were added to a polybutadiene synthesized according to Example 77 in a compounding formulation shown in Table 10 in a plastomill, and the mixture was kneaded, was performed. Next, a second compounding of addition of a vulcanization accelerator and sulfur through a roller was performed to produce a compounded rubber. The compounded rubber was molded according to desired physical properties. Physical properties of a vulcanized product obtained by press-vulcanization at 150° C. were measured. The measurement results of various physical properties of the formulation are shown in Table 11.

Example 87

A first compounding, in which natural rubber, carbon black, zinc oxide, stearic acid, an antioxidant, and an oil were added to a polybutadiene synthesized according to Example 79 in a compounding formulation shown in Table 10 in a plastomill, and the mixture was kneaded, was performed. Next, a second compounding of addition of a vulcanization accelerator and sulfur through a roller was performed to produce a compounded rubber. The compounded rubber was molded according to desired physical properties. Physical properties of a vulcanized product obtained by press-vulcanization at 150° C. were measured. The measurement results of various physical properties of the formulation are shown in Table 12.

Example 88

A first compounding, in which natural rubber, carbon black, zinc oxide, stearic acid, an antioxidant, and an oil were added to a polybutadiene synthesized according to Example 80 in a compounding formulation shown in Table 10 in a plastomill, and the mixture was kneaded, was performed. Next, a second compounding of addition of a vulcanization accelerator and sulfur through a roller was performed to produce a compounded rubber. The compounded rubber was molded according to desired physical properties. Physical properties of a vulcanized product obtained by press-vulcanization at 150° C. were measured. The measurement results of various physical properties of the formulation are shown in Table 12.

Example 89

A first compounding, in which natural rubber, carbon black, zinc oxide, stearic acid, an antioxidant, and an oil were added to a polybutadiene synthesized according to Example 81 in a compounding formulation shown in Table 10 in a plastomill, and the mixture was kneaded, was performed. Next, a second compounding of addition of a vulcanization accelerator and sulfur through a roller was performed to produce a compounded rubber. The compounded rubber was molded according to desired physical properties. Physical properties of a vulcanized product obtained by press-vulcanization at 150° C. were measured. The measurement results of various physical properties of the formulation are shown in Table 13.

Example 90

A first compounding, in which natural rubber, carbon black, zinc oxide, stearic acid, an antioxidant, and an oil were added to a polybutadiene synthesized according to Example 82 in a compounding formulation shown in Table 10 in a plastomill, and the mixture was kneaded, was performed. Next, a second compounding of addition of a vulcanization accelerator and sulfur through a roller was performed to produce a compounded rubber. The compounded rubber was molded according to desired physical properties. Physical properties of a vulcanized product obtained by press-vulcanization at 150° C. were measured. The measurement results of various physical properties of the formulation are shown in Table 13.

Example 91

A first compounding, in which natural rubber, carbon black, zinc oxide, stearic acid, an antioxidant, and an oil were added to a polybutadiene synthesized according to Example 83 in a compounding formulation shown in Table 10 in a plastomill, and the mixture was kneaded, was performed. Next, a second compounding of addition of a vulcanization accelerator and sulfur through a roller was performed to produce a compounded rubber. The compounded rubber was molded according to desired physical properties. Physical properties of a vulcanized product obtained by press-vulcanization at 150° C. were measured. The measurement results of various physical properties of the formulation are shown in Table 13.

Example 92

A first compounding, in which natural rubber, carbon black, zinc oxide, stearic acid, an antioxidant, and an oil were added to a polybutadiene synthesized according to Example 84 in a compounding formulation shown in Table 10 in a plastomill, and the mixture was kneaded, was performed. Next, a second compounding of addition of a vulcanization accelerator and sulfur through a roller was performed to produce a compounded rubber. The compounded rubber was molded according to desired physical properties. Physical properties of a vulcanized product obtained by press-vulcanization at 150° C. were measured. The measurement results of various physical properties of the formulation are shown in Table 13.

Comparative Example 9

A first compounding, in which carbon black, zinc oxide, stearic acid, and an antioxidant were added to UBEPOL-BR 150 L (a conjugated diene polymer obtained by a polymerization using a Co catalyst), manufactured by Ube Industries, Ltd., in a compounding formulation shown in Table 10 in a plastomill, and the mixture was kneaded, was performed. Next, a second compounding of addition of a vulcanization accelerator and sulfur through a roller was performed to produce a compounded rubber. The compounded rubber was molded according to desired physical properties. Physical properties of a vulcanized product obtained by press-vulcanization at 150° C. were measured. The measurement results of various physical properties of the formulation are shown in Tables 11 to 13.

The compounding formulations are shown in Table 10.

TABLE 10

|  | Example 85 | Example 86 | Example 87 | Example 88 | Example 89 | Example 90 | Example 91 | Example 92 | Comparative Example 9 |
|---|---|---|---|---|---|---|---|---|---|
| Example 76 | 50 |  |  |  |  |  |  |  |  |
| Example 77 |  | 50 |  |  |  |  |  |  |  |
| Example 79 |  |  | 50 |  |  |  |  |  |  |
| Example 80 |  |  |  | 50 |  |  |  |  |  |
| Example 81 |  |  |  |  | 50 |  |  |  |  |
| Example 82 |  |  |  |  |  | 50 |  |  |  |
| Example 83 |  |  |  |  |  |  | 50 |  |  |
| Example 84 |  |  |  |  |  |  |  | 50 |  |
| BR150L |  |  |  |  |  |  |  |  | 50 |
| Natural rubber | 50 | 50 | 50 | 50 | 50 | 50 | 50 | 50 | 50 |
| Carbon black | 50 | 50 | 50 | 50 | 50 | 50 | 50 | 50 | 50 |
| Zinc oxide | 3 | 3 | 3 | 3 | 3 | 3 | 3 | 3 | 3 |
| Stearic acid | 2 | 2 | 2 | 2 | 2 | 2 | 2 | 2 | 2 |
| Antioxidant | 2 | 2 | 2 | 2 | 2 | 2 | 2 | 2 | 2 |
| Aroma oil | 3 | 3 | 3 | 3 | 3 | 3 | 3 | 3 | 3 |
| Valcanization accelerator | 1 | 1 | 1 | 1 | 1 | 1 | 1 | 1 | 1 |
| Powdery sulfur | 1.5 | 1.5 | 1.5 | 1.5 | 1.5 | 1.5 | 1.5 | 1.5 | 1.5 |

Carbon black: ISAF
Zinc oxide: Sazex No. 1, Sakai Chemical Industry Co., Ltd.
Stearic acid: Stearic acid, Kao Corporation
Antioxidant: Antigen 6C, Sumitomo Chemical Co., Ltd.
Vulcanization accelerator: Nocceler NS, Ouchi Shinko Chemical Industrial Co., Sulfur: Sulfur, Hosoi Kagaku Kogyo Kabushiki Kaisha Evaluation results of the obtained formulations are shown in Table 11.

TABLE 11

|  | Comparative Example 9 | Example85 | Example86 |
|---|---|---|---|
| Tensile stress (50%) | 100 | 103 | 107 |
| Tensile stress (100%) | 100 | 105 | 107 |
| Tensile stress (300%) | 100 | 106 | 104 |
| Rebound Resilience | 100 | 106 | 107 |
| Lambourn abrasion | 100 | 106 | 107 |

TABLE 11-continued

|  | Comparative Example 9 | Example85 | Example86 |
|---|---|---|---|
| (20% Slip) |  |  |  |
| Lambourn abrasion | 100 | 103 | 106 |
| (40% Slip) |  |  |  |
| Low exothermic property | 100 | 111 | 105 |
| Permanent set | 100 | 128 | 123 |
| tanδ(30° C.) | 100 | 109 | 105 |
| tanδ(50° C.) | 100 | 111 | 105 |

Numeric values in Table 10 are shown as an index relative to a value in each physical property in Comparative Example 9 (defined as 100) which is produced using UBEPOL-BR 150 L manufactured by Ube Industries, Ltd. The larger the numeric value, the better the property.

As shown in Table 11, the compositions Example 85 and Example 86 using the polybutadiene obtained in Example 76 and Example 77 have more excellent tensile stress, impact resilience, abrasion resistance, and low exothermic property than the composition of Comparative Example 9.

Evaluation results of the obtained formulations are shown in Table 12.

TABLE 12

|  | Comparative Example 9 | Example87 | Example88 |
|---|---|---|---|
| Tensile stress (100%) | 100 | 104 | 103 |
| Tensile stress (200%) | 100 | 106 | 104 |
| Tensile stress (300%) | 100 | 107 | 104 |
| Rebound Resilience | 100 | 103 | 103 |
| Low exothermic property | 100 | 113 | 118 |
| Permanent set | 100 | 132 | 143 |
| Tanδ (60° C.) | 100 | 109 | 109 |

Numeric values in Table 12 are shown as an index relative to a value in each physical property in Comparative Example 9 (defined as 100) which is produced using UBE-POL-BR 150 L manufactured by Ube Industries, Ltd. The larger the numeric value, the better the property.

As shown in Table 12, the compositions Example 87 and Example 88 using the polybutadiene obtained in Example 79 and Example 80 have more excellent tensile stress, impact resilience, and low exothermic property than the composition of Comparative Example 9.

Evaluation results of the obtained formulations are shown in Table 13.

TABLE 13

|  | Comparative Example 9 | Example 89 | Example 90 | Example 91 | Example 92 |
|---|---|---|---|---|---|
| Tensile stress (100%) | 100 | 103 | 102 | 102 | 105 |
| Tensile stress (300%) | 100 | 103 | 102 | 103 | 106 |
| Rebound Resilience | 100 | 103 | 102 | 105 | 105 |
| Lambourn abrasion (20% Slip) | 100 | 103 | 100 | 102 | 99 |
| Lambourn abrasion (40% Slip) | 100 | 104 | 103 | 102 | 101 |
| Low exothermic property | 100 | 107 | 108 | 107 | 108 |
| Permanent set | 100 | 117 | 107 | 117 | 129 |
| tanδ(60° C.) | 100 | 110 | 107 | 109 | 110 |

Numeric values in Table 13 are shown as an index relative to a value in each physical property in Comparative Example 9 (defined as 100) which is produced using UBE-POL-BR 150 L manufactured by Ube Industries, Ltd. The larger the numeric value, the better the property.

As shown in Table 13, the compositions Example 89 to Example 92 using the polybutadiene obtained in Example 81 to Example 84 have more excellent tensile stress, rebound resilience, abrasion resistance, and low exothermic property than the composition of Comparative Example 9.

Example 93

A first compounding, in which SBR, silica, a silane coupling agent, zinc oxide, stearic acid, an antioxidant, and an oil were added to a polybutadiene synthesized according to Example 76 in a compounding formulation shown in Table 14 in a plastomill, and the mixture was kneaded, was performed. Next, a second compounding of addition of a vulcanization accelerator and sulfur through a roller was performed to produce a compounded rubber. The compounded rubber was molded according to desired physical properties. Physical properties of a vulcanized product obtained by press-vulcanization at 150° C. were measured. The measurement results of various physical properties of the formulation are shown in Table 15.

Example 94

A first compounding, in which SBR, silica, a silane coupling agent, zinc oxide, stearic acid, an antioxidant, and an oil were added to a polybutadiene synthesized according to Example 78 in a compounding formulation shown in Table 14 in a plastomill, and the mixture was kneaded, was performed. Next, a second compounding of addition of a vulcanization accelerator and sulfur through a roller was performed to produce a compounded rubber. The compounded rubber was molded according to desired physical properties. Physical properties of a vulcanized product obtained by press-vulcanization at 150° C. were measured. The measurement results of various physical properties of the formulation are shown in Table 15.

Comparative Example 10

A first compounding, in which SBR, silica, a silane coupling agent, zinc oxide, stearic acid, and an antioxidant were added to UBEPOL-BR 150 L (a conjugated diene polymer obtained by a polymerization using a Co catalyst), manufactured by Ube Industries, Ltd., in a compounding formulation shown in Table 14 in a plastomill, and the mixture was kneaded, was performed. Next, a second compounding of addition of a vulcanization accelerator and sulfur through a roller was performed to produce a compounded rubber. The compounded rubber was molded according to desired physical properties. Physical properties of a vulcanized product obtained by press-vulcanization at 150° C. were measured. The measurement results of various physical properties of the formulation are shown in Table 15.

The compounding formulations are shown in Table 14.

TABLE 14

|  | Example 93 | Example 94 | Comparative Example 10 |
|---|---|---|---|
| Example 76 | 30 |  |  |
| Example 78 |  | 30 |  |
| BR150L |  |  | 30 |
| SBR | 70 | 70 | 70 |
| Silica | 65 | 65 | 65 |
| Silane coupling agent | 5.2 | 5.2 | 5.2 |
| Oil | 25 | 25 | 25 |
| Zinc oxide | 3 | 3 | 3 |
| Stearic acid | 1 | 1 | 1 |
| Antioxidant | 1 | 1 | 1 |
| Vulcanization accelerator 1 | 1.7 | 1.7 | 1.7 |
| Vulcanization accelerator 2 | 2 | 2 | 2 |
| Powdery sulfur | 1.4 | 1.4 | 1.4 |

Evaluation results of the obtained formulations are shown in Table 15.

TABLE 15

|  | Comparative Example 10 | Example 93 | Example 94 |
|---|---|---|---|
| Tensile stress (100%) | 100 | 105 | 104 |
| Tensile stress (200%) | 100 | 100 | 103 |
| Rebound Resilience | 100 | 101 | 101 |
| Lambourn abrasion (20% Slip) | 100 | 114 | 113 |
| Lambourn abrasion (40% Slip) | 100 | 116 | 113 |
| tanδ(30° C.) | 100 | 109 | 112 |
| tanδ(60° C.) | 100 | 113 | 114 |

Numeric values in Table 15 are shown as an index relative to a value in each physical property in Comparative Example 10 (defined as 100) which is produced using UBEPOL-BR 150 L manufactured by Ube Industries, Ltd. The larger the numeric value, the better the property.

As shown in Table 15, the compositions of Example 93 and Example 94 using the polybutadienes obtained in Example 76 and Example 78 have more excellent tensile stress, rebound resilience, abrasion resistance, and low exothermic property than the composition of Comparative Example 10.

Example 95

An inside of an autoclave with an inner capacity of 1.5 L was substituted by nitrogen, and a solution including 395 ml of a toluene solvent and 400 ml of butadiene was filled therein. Subsequently, 0.14 MPa of hydrogen gas was introduced, and 1.2 ml of a toluene solution (2 mol/L) of triethyl aluminum (TEAL) was added thereto. Then, 2.25 ml of a toluene solution (0.005 mol/L) of tris(2,2,6,6-tetramethyl-3,5-heptanedionato)gadolinium (Gd(dpm)$_3$), followed by 5.6 ml of a toluene solution (0.004 mol/L) of triphenylcarbenium tetrakis(pentafluorophenyl)borate were added. After a polymerization was performed at 40° C. for 25 minutes, 0.23 ml of a modifier, a toluene solution (0.5 mol/L) of 4,4'-bis(diethylamino)benzophenone (EAB), was added thereto, and a modification reaction was performed at the same temperature for 15 minutes. After 4 ml of an ethanol solution containing an antioxidant was added, the inside pressure of the autoclave was released, and then ethanol was poured into the polymerization solution to recover polybutadiene. Then, the recovered polybutadiene was dried in vacuo at 80° C. for 3 hours. The recovered, modified polybutadiene had a melting point, according to the DSC measurement, of −6.9° C., and a fusion heat amount of 42.2 J/g. Other polymerization results are shown in Table 16.

Example 96

An inside of an autoclave with an inner capacity of 1.5 L was substituted by nitrogen, and a solution including 295 ml of a toluene solvent and 300 ml of butadiene was filled therein. Subsequently, 0.13 MPa of hydrogen gas was introduced and 1.8 ml of a toluene solution (2 mol/L) of triethyl aluminum (TEAL) was added thereto. Then, 1.05 ml of a toluene solution (0.02 mol/L) of tris(2,6-dimethyl-3,5-heptanedionato)gadolinium (Gd(dibm)$_3$), followed by 0.1 ml of a toluene solution (0.043 mol/L) of triphenylcarbenium tetrakis(pentafluorophenyl)borate were added. After a polymerization was performed at 40° C. for 25 minutes, 0.42 ml of a modifier, a toluene solution (0.5 mol/L) of 4,4'-bis(diethyl amino)benzophenone (EAB), was added, and a modification reaction was performed at the same temperature for 15 minutes. After 4 ml of an ethanol solution containing an antioxidant was added, the inside pressure of the autoclave was released, and then ethanol was poured into the polymerization solution to recover polybutadiene. Then, the recovered polybutadiene was dried in vacuo at 80° C. for 3 hours. The recovered, modified polybutadiene had a melting point, according to the DSC measurement, of −6.6° C., and a fusion heat amount of 44.6 J/g. Other polymerization results are shown in Table 16.

Physical properties of the obtained cis-1,4-polybutadienes are shown in Table 16.

Example 97

A first compounding, in which carbon black, zinc oxide, stearic acid, and an antioxidant were added to a modified polybutadiene synthesized according to Example 95 in a compounding formulation shown in Table 17 in a plastomill, and the mixture was kneaded, was performed. Next, a second compounding of addition of a vulcanization accelerator and sulfur through a roller was performed to produce a compounded rubber. The compounded rubber was molded according to desired physical properties. Physical properties of a vulcanized product obtained by press-vulcanization at 150° C. were measured. The measurement results of various physical properties of the formulation are shown in Table 18.

Example 98

A first compounding, in which carbon black, zinc oxide, stearic acid, and an antioxidant were added to a modified polybutadiene synthesized according to Example 96 in a compounding formulation shown in Table 17 in a plastomill, and the mixture was kneaded, was performed. Next, a second compounding of addition of a vulcanization accelerator and sulfur through a roller was performed to produce a compounded rubber. The compounded rubber was molded according to desired physical properties. Physical properties of a vulcanized product obtained by press-vulcanization at 150° C. were measured. The measurement results of various physical properties of the formulation are shown in Table 18.

Comparative Example 11

A first compounding, in which carbon black, zinc oxide, stearic acid, and an antioxidant were added to UBEPOL-BR 150 L (a conjugated diene polymer obtained by a polymerization using a Co catalyst), manufactured by Ube Industries, Ltd., in a compounding formulation shown in Table 17 in a plastomill, and the mixture was kneaded, was performed. Next, a second compounding of addition of a vulcanization accelerator and sulfur through a roller was performed to produce a compounded rubber. The compounded rubber was molded according to desired physical properties. Physical properties of a vulcanized product obtained by press-vulcanization at 150° C. were measured. The measurement results of various physical properties of the formulation are shown in Table 18.

The compounding formulations are shown in Table 17.

TABLE 17

|  | Example 97 | Example 98 | Comparative Example 11 |
|---|---|---|---|
| Example 95 | 50 |  |  |
| Example 96 |  | 50 |  |
| BR150L |  |  | 50 |

TABLE 16

|  | Gd catalyst | Modifier | Productivity (g · mmol$^{-1}$-Cat · h$^{-1}$) | [η] | Cis (%) | Trans (%) | Vinyl (%) | Mn/10$^4$ | Mw/10$^4$ | Mw/Mn | Degree of modification |
|---|---|---|---|---|---|---|---|---|---|---|---|
| Example 95 | Gd(dpm)$_3$ | EAB | 12825 | 2.49 | 98.8 | 0.6 | 0.5 | 23.8 | 56.5 | 2.38 | 0.28 |
| Example 96 | Gd(dibm)$_3$ | EAB | 9394 | 2.63 | 99.2 | 0.3 | 0.5 | 24.7 | 58.5 | 2.37 | 0.24 |

TABLE 17-continued

|  | Example 97 | Example 98 | Comparative Example 11 |
|---|---|---|---|
| Natural rubber | 50 | 50 | 50 |
| Carbon black | 50 | 50 | 50 |
| Zinc oxide | 3 | 3 | 3 |
| Stearic acid | 2 | 2 | 2 |
| Antioxidant | 2 | 2 | 2 |
| Aroma oil | 3 | 3 | 3 |
| Vulcanization accelerator | 1 | 1 | 1 |
| Sulfur | 1.5 | 1.5 | 1.5 |

Evaluation results of the obtained formulations are shown in Table 18.

TABLE 18

|  | Comparative Example 11 | Example 97 | Example 98 |
|---|---|---|---|
| Tensile stress (50%) | 100 | 102 | 105 |
| Tensile stress (100%) | 100 | 103 | 104 |
| Tensile stress (300%) | 100 | 105 | 100 |
| Rebound Resilience | 100 | 105 | 103 |
| Elongation fatigue resistance (50%) | 100 | 125 | 132 |
| Lambourn abrasion (20% Slip) | 100 | 111 | 108 |
| Lambourn abrasion (40% Slip) | 100 | 102 | 100 |
| Low exothermic property | 100 | 110 | 108 |
| Permanent set | 100 | 122 | 122 |
| tanδ(30° C.) | 100 | 108 | 106 |
| tanδ(50° C.) | 100 | 109 | 107 |

Numeric values in Table 18 are shown as an index relative to a value in each physical property in Comparative Example 11 (defined as 100) which is produced using UBEPOL-BR 150 L manufactured by Ube Industries, Ltd. The larger the numeric value, the better the property.

As shown in Table 18, the compositions of Example 97 and Example 98 using the modified polybutadienes obtained in Example 95 and Example 96 have more excellent tensile stress, rebound resilience, elongation fatigue resistance, abrasion resistance, and low exothermic property than the composition of Comparative Example 11.

Example 99

An inside of an autoclave with an inner capacity of 1.5 L was substituted by nitrogen, and a solution including 495 ml of a cyclohexane solvent and 500 ml of butadiene was filled therein. Subsequently, 3.0 ml of a cyclohexane solution (2 mol/L) of triethyl aluminum (TEAL) was added thereto. Next, 0.8 ml of a cyclohexane solution (0.005 mol/L) of tris(2,2,6,6-tetramethyl-3,5-heptanedionato)gadolinium (Gd (dpm)$_3$), followed by 2.0 ml of a toluene solution (0.004 mol/L) of triphenylcarbenium tetrakis(pentafluorophenyl) borate were added thereto. The polymerization was performed at 50° C. for 20 minutes. Next, 0.3 ml of 3-methoxybenzyl chloride (MOBC) (6.9 mol/L) was added thereto, which was stirred at the same temperature for 10 minutes, and then 5 ml of an ethanol solution containing an antioxidant was added thereto. The inside pressure of the autoclave was released, and then ethanol was poured into the polymerization solution to recover a modified polybutadiene. Then, the recovered, modified polybutadiene was dried in vacuo at 80° C. for 3 hours. The polymerization results are shown in Table 19.

Example 100

An inside of an autoclave with an inner capacity of 1.5 L was substituted by nitrogen, and a solution including 495 ml of a cyclohexane solvent and 500 ml of butadiene was filled therein. Subsequently, 2.0 ml of a cyclohexane solution (2 mol/L) of triethyl aluminum (TEAL) was added thereto. Next, 0.8 ml of a cyclohexane solution (0.005 mol/L) of tris(2,2,6,6-tetramethyl-3,5-heptanedionato)gadolinium (Gd (dpm)$_3$), followed by 2.1 ml of a cyclohexane solution (0.1 mol/L) of diisobutyl aluminum hydride (DIBAH) and 2.0 ml of a toluene solution (0.004 mol/L) of triphenylcarbenium tetrakis(pentafluorophenyl)borate were added. The polymerization was performed at 50° C. for 20 minutes. Next, 1.0 ml of a cyclohexane solution (1.0 mol/L) of piperonyl chloride (PPC) was added thereto, which was stirred at the same temperature for 10 minutes, and then 5 ml of an ethanol solution containing an antioxidant was added thereto. The inside pressure of the autoclave was released, and then ethanol was poured into the polymerization solution to recover a modified polybutadiene. Then, the recovered, modified polybutadiene was dried in vacuo at 80° C. for 3 hours. The polymerization results are shown in Table 19.

Example 101

An inside of an autoclave with an inner capacity of 1.5 L was substituted by nitrogen, and a solution including 495 ml of a cyclohexane solvent and 500 ml of butadiene was filled therein. Subsequently, 3.05 ml of a cyclohexane solution (2 mol/L) of triethyl aluminum (TEAL) was added thereto. Next, 0.8 ml of a cyclohexane solution (0.005 mol/L) of tris(2,2,6,6-tetramethyl-3,5-heptanedionato)gadolinium (Gd (dpm)$_3$), followed by 2.0 ml of a toluene solution (0.004 mol/L) of triphenylcarbenium tetrakis(pentafluorophenyl) borate were added. The polymerization was performed at 50° C. for 20 minutes. Next, 4.0 ml of a toluene solution (0.5 mol/L) of 3,5-dimethoxybenzyl bromide (DMBB) was added thereto, which was stirred at the same temperature for 10 minutes, and then 5 ml of an ethanol solution containing an antioxidant was added thereto. The inside pressure of the autoclave was released, and then ethanol was poured into the polymerization solution to recover a modified polybutadiene. Then, the recovered, modified polybutadiene was dried in vacuo at 80° C. for 3 hours. The polymerization results are shown in Table 19.

Example 102

An inside of an autoclave with an inner capacity of 1.5 L was substituted by nitrogen, and a solution including 495 ml of a cyclohexane solvent and 500 ml of butadiene was filled therein. Subsequently, 2.0 ml of a cyclohexane solution (2 mol/L) of triethyl aluminum (TEAL) was added thereto. Next, 0.8 ml of a cyclohexane solution (0.005 mol/L) of tris(2,2,6,6-tetramethyl-3,5-heptanedionato)gadolinium (Gd (dpm)$_3$), followed by 2.0 ml of a cyclohexane solution (0.1 mol/L) of diisobutyl aluminum hydride (DIBAH) and 2.0 ml of a toluene solution (0.004 mol/L) of triphenylcarbenium tetrakis(pentafluorophenyl)borate were added. The polymerization was performed at 50° C. for 20 minutes. Next, 0.1 ml of veratrum aldehyde (VTA)(7.3 mol/L), heated to 50° C., was added thereto, which was stirred at the same temperature for 10 minutes, and then 5 ml of an ethanol solution containing an antioxidant was added thereto. The inside pressure of the autoclave was released, and then ethanol was poured into the polymerization solution to recover a modified polybutadiene. Then, the recovered, modified polybutadiene was dried in vacuo at 80° C. for 3 hours. The polymerization results are shown in Table 19.

Example 103

An inside of an autoclave with an inner capacity of 1.5 L was substituted by nitrogen, and a solution including 495 ml of a cyclohexane solvent and 500 ml of butadiene was filled therein. Subsequently, 2.0 ml of a cyclohexane solution (2 mol/L) of triethyl aluminum (TEAL) was added thereto. Next, 0.8 ml of a cyclohexane solution (0.005 mol/L) of tris(2,2,6,6-tetramethyl-3,5-heptanedionato)gadolinium (Gd $(dpm)_3$), followed by 2.0 ml of a cyclohexane solution (0.1 mol/L) of diisobutyl aluminum hydride (DIBAH) and 2.0 ml of a toluene solution (0.004 mol/L) of triphenylcarbenium tetrakis(pentafluorophenyl)borate were added. The polymerization was performed at 50° C. for 20 minutes. Next, 5.0 ml of a toluene solution (0.2 mol/L) of heliotropin (HLT), heated to 50° C., was added thereto, which was stirred at the same temperature for 10 minutes, and then 5 ml of an ethanol solution containing an antioxidant was added thereto. The inside pressure of the autoclave was released, and then ethanol was poured into the polymerization solution to recover a modified polybutadiene. Then, the recovered, modified polybutadiene was dried in vacuo at 80° C. for 3 hours. The polymerization results are shown in Table 19.

Physical propertied of the obtained, modified cis-1,4-polybutadienes are shown in Table 19.

sulfur through a roller was performed to produce a compounded rubber. The compounded rubber was molded according to desired physical properties. Physical properties of a vulcanized product obtained by press-vulcanization at 150° C. were measured. Measurement results of various physical properties of the formulation are shown in Table 21.

Example 106

A first compounding, in which natural rubber, silica, a silane coupling agent, zinc oxide, stearic acid, an antioxidant, and an oil were added to a modified polybutadiene synthesized according to Example 101 in a compounding formulation shown in Table 20 in a plastomill, and the mixture was kneaded, was performed. Next, a second compounding of addition of a vulcanization accelerator and sulfur through a roller was performed to produce a compounded rubber. The compounded rubber was molded according to desired physical properties. Physical properties of a vulcanized product obtained by press-vulcanization at 150° C. were measured. Measurement results of various physical properties of the formulation are shown in Table 21.

Example 107

A first compounding, in which natural rubber, silica, a silane coupling agent, zinc oxide, stearic acid, an antioxidant, and an oil were added to a modified polybutadiene synthesized according to Example 102 in a compounding formulation shown in Table 20 in a plastomill, and the mixture was kneaded, was performed. Next, a second com-

TABLE 19

|  | Modifier | Productivity (g · mmol$^{-1}$-Cat · h$^{-1}$) | Degree of modification | ML$_{1+4}$ (100° C.) | Cis- (%) | Trans (%) | Vinyl (%) | Mn/10$^4$ | Mw/10$^4$ | Mw/Mn |
|---|---|---|---|---|---|---|---|---|---|---|
| Example 99 | MOBC | 47330 | 0.26 | 47 | 95.1 | 4.0 | 0.9 | 19.8 | 62.6 | 3.16 |
| Example 100 | PPC | 46010 | 0.37 | 44 | 95.8 | 3.3 | 0.9 | 19.4 | 64.6 | 3.33 |
| Example 101 | DMBB | 48728 | 0.11 | 45 | 95.0 | 4.2 | 0.8 | 19.3 | 56.5 | 2.93 |
| Example 102 | VTA | 47770 | 0.20 | 47 | 95.8 | 3.4 | 0.9 | 20.0 | 56.7 | 2.84 |
| Example 103 | HLT | 46350 | 0.22 | 42 | 95.8 | 3.3 | 0.8 | 19.5 | 56.5 | 2.89 |

Example 104

A first compounding, in which natural rubber, silica, a silane coupling agent, zinc oxide, stearic acid, an antioxidant, and an oil were added to a modified polybutadiene synthesized according to Example 99 in a compounding formulation shown in Table 20 in a plastomill, and the mixture was kneaded, was performed. Next, a second compounding of addition of a vulcanization accelerator and sulfur through a roller was performed to produce a compounded rubber. The compounded rubber was molded according to desired physical properties. Physical properties of a vulcanized product obtained by press-vulcanization at 150° C. were measured. Measurement results of various physical properties of the formulation are shown in Table 21.

Example 105

A first compounding, in which natural rubber, silica, a silane coupling agent, zinc oxide, stearic acid, an antioxidant, and an oil were added to a modified polybutadiene synthesized according to Example 100 in a compounding formulation shown in Table 20 in a plastomill, and the mixture was kneaded, was performed. Next, a second compounding of addition of a vulcanization accelerator and pounding of addition of a vulcanization accelerator and sulfur through a roller was performed to produce a compounded rubber. The compounded rubber was molded according to desired physical properties. Physical properties of a vulcanized product obtained by press-vulcanization at 150° C. were measured. Measurement results of various physical properties of the formulation are shown in Table 21.

Example 108

A first compounding, in which natural rubber, silica, a silane coupling agent, zinc oxide, stearic acid, an antioxidant, and an oil were added to a modified polybutadiene synthesized according to Example 103 in a compounding formulation shown in Table 20 in a plastomill, and the mixture was kneaded, was performed. Next, a second compounding of addition of a vulcanization accelerator and sulfur through a roller was performed to produce a compounded rubber. The compounded rubber was molded according to desired physical properties. Physical properties of a vulcanized product obtained by press-vulcanization at 150° C. were measured. Measurement results of various physical properties of the formulation are shown in Table 21.

Comparative Example 12

A first compounding, in which natural rubber, silica, a silane coupling agent, zinc oxide, stearic acid, an antioxidant, and an oil were added to UBEPOL-BR150L (a conjugated diene polymer obtained by a polymerization using a Co catalyst), manufactured by Ube Industries, Ltd., in a compounding formulation shown in Table 20 in a plastomill, and the mixture was kneaded, was performed. Next, a second compounding of addition of a vulcanization accelerator and sulfur through a roller was performed to produce a compounded rubber. The compounded rubber was molded according to desired physical properties. Physical properties of a vulcanized product obtained by press-vulcanization at 150° C. were measured. Measurement results of various physical properties of the formulation are shown in Table 21.

TABLE 20

| | Example 104 | Example 105 | Example 106 | Example 107 | Example 108 | Comparative Example 12 |
|---|---|---|---|---|---|---|
| Example 99 | 50 | | | | | |
| Example 100 | | 50 | | | | |
| Example 101 | | | 50 | | | |
| Example 102 | | | | 50 | | |
| Example 103 | | | | | 50 | |
| BR150L | | | | | | 50 |
| Natural rubber | 50 | 50 | 50 | 50 | 50 | 50 |
| Silica | 40 | 40 | 40 | 40 | 40 | 40 |
| Silane coupling agent | 3 | 3 | 3 | 3 | 3 | 3 |
| Oil | 10 | 10 | 10 | 10 | 10 | 10 |
| Zinc oxide | 3 | 3 | 3 | 3 | 3 | 3 |
| Stearic acid | 1 | 1 | 1 | 1 | 1 | 1 |
| Antioxidant | 1.5 | 1.5 | 1.5 | 1.5 | 1.5 | 1.5 |
| Valcanization accelerator 1 | 1.7 | 1.7 | 1.7 | 1.7 | 1.7 | 1.7 |
| Valcanization accelerator 2 | 2 | 2 | 2 | 2 | 2 | 2 |
| Powdery sulfur | 1.5 | 1.5 | 1.5 | 1.5 | 1.5 | 1.5 |

Evaluation results of the obtained formulations are shown in Table 21.

TABLE 21

| | Comparative Example 12 | Example 104 | Example 105 | Example 106 | Example 107 | Example 108 |
|---|---|---|---|---|---|---|
| Filler gel | 100 | 105 | 108 | 108 | 111 | 114 |
| Die swell (50/sec) | 100 | 105 | 104 | 105 | 104 | 104 |
| Tensile stress (100%) | 100 | 107 | 99 | 101 | 102 | 95 |
| Tensile stress (300%) | 100 | 116 | 108 | 107 | 109 | 100 |
| Rebound Resilience | 100 | 101 | 100 | 100 | 100 | 100 |
| Lambourn abrasion (20% Slip) | 100 | 99 | 104 | 100 | 99 | 109 |
| Permanent set | 100 | 103 | 103 | 104 | 102 | 107 |
| Payne effect G' (45/1.1) | 100 | 115 | 109 | 113 | 112 | 108 |
| tanδ (60° C.) | 100 | 109 | 107 | 104 | 107 | 107 |

Numeric values in Table 21 are shown as an index relative to a value in each physical property in Comparative Example 12 (defined as 100) which is produced using UBEPOL-BR150L manufactured by Ube Industries, Ltd. The larger the numeric value, the better the property.

As shown in Table 21, the compositions of Example 104 to Example 108 using the modified polybutadienes obtained in Example 99 to Example 103 have a larger amount of the filler gel, show a better numeric value in Payne effect showing dispersibility of silica, and have more excellent die swell, tensile stress, rebound resilience, abrasion resistance, and low fuel consumption than the composition of Comparative Example 12.

Example 109

An inside of an autoclave with an inner capacity of 1.5 L was substituted by nitrogen, and a solution including 540 ml a cyclohexane solvent and 550 ml of butadiene was filled therein. Subsequently, 3.4 ml of a cyclohexane solution (2 mol/L) of triethyl aluminum (TEAL) and 1.76 ml of a toluene solution (0.005 mol/L) of tris(2,2,6,6-tetramethyl-3,5-heptanedionato)gadolinium (Gd(dpm)$_3$), followed by 4.4 ml of a toluene solution (0.004 mol/L) of triphenylcarbenium tetrakis(pentafluorophenyl)borate were added. A polymerization was performed at 40° C. for 25 minutes, and 4 ml of an ethanol solution containing an antioxidant was added thereto. The inside pressure of the autoclave was released, and then ethanol was poured into the polymerization solution to recover polybutadiene. Then, the recovered polybutadiene was dried in vacuo at 80° C. for 3 hours. Polymerization results are shown in Table 22.

Example 110

An inside of an autoclave with an inner capacity of 1.5 L was substituted by nitrogen, and a solution including 545 ml of a cyclohexane solvent and 550 ml of butadiene was filled therein. Subsequently, 2.75 ml of a cyclohexane solution (2 mol/L) of triethyl aluminum (TEAL) and 0.88 ml of a toluene solution (0.005 mol/L) of tris(2,2,6,6-tetramethyl-3,5-heptanedionato)gadolinium ($Gd(dpm)_3$), followed by 2.2 ml of a toluene solution (0.004 mol/L) of triphenylcarbenium tetrakis(pentafluorophenyl)borate were added. A polymerization was performed at 50° C. for 25 minutes, and 4 ml of an ethanol solution containing an antioxidant was added thereto. The inside pressure of the autoclave was released, and then ethanol was poured into the polymerization solution to recover polybutadiene. Then, the recovered polybutadiene was dried in vacuo at 80° C. for 3 hours. Polymerization results are shown in Table 22.

Example 111

An inside of an autoclave with an inner capacity of 1.5 L was substituted by nitrogen, and a solution including 395 ml of a toluene solvent and 400 ml of butadiene was filled therein. Subsequently, 0.14 MPa of hydrogen gas was introduced, and 1.2 ml of a toluene solution (2 mol/L) of triethyl aluminum (TEAL) was added. Next, 2.25 ml of a toluene solution (0.005 mol/L) of tris(2,2,6,6-tetramethyl-3,5-heptanedionato)gadolinium ($Gd(dpm)_3$), followed by 0.06 ml of a toluene solution (0.43 mol/L) of triphenylcarbenium tetrakis(pentafluorophenyl)borate was added. After a polymerization was performed at 40° C. for 30 minutes, 0.23 ml of a modifier, a toluene solution (0.5 mol/L) of 4,4'-bis(diethyl amino)benzophenone (EAB), was added thereto, and a modification reaction was performed at the same temperature for 15 minutes. After 4 ml of an ethanol solution containing an antioxidant was added, the inside pressure of the autoclave was released, and then ethanol was poured into the polymerization solution to recover polybutadiene. Then, the recovered polybutadiene was dried in vacuo at 80° C. for 3 hours. Polymerization results are shown in Table 22.

Example 112

An inside of an autoclave with an inner capacity of 1.5 L was substituted by nitrogen, and a solution including 295 ml of a toluene solvent and 300 ml of butadiene was filled therein. Subsequently, 0.13 MPa of hydrogen gas was introduced, and 1.8 ml of a toluene solution (2 mol/L) of triethyl aluminum (TEAL) was added thereto. Next, 1.05 ml of a toluene solution (0.02 mol/L) of tris(2,6-dimethyl-3,5-heptanedionato)gadolinium ($Gd(dibm)_3$), followed by 0.1 ml of a toluene solution (0.043 mol/L) of triphenylcarbenium tetrakis(pentafluorophenyl)borate were added. After a polymerization was performed at 40° C. for 25 minutes, 0.42 ml of a modifier, a toluene solution (0.5 mol/L) of 4,4'-bis (diethyl amino)benzophenone (EAB), was added thereto, and a modification reaction was performed at the same temperature for 15 minutes. After 3 ml of an ethanol solution containing an antioxidant was added thereto, the inside pressure of the autoclave was released, and then ethanol was poured into the polymerization solution to recover polybutadiene. Then, the recovered polybutadiene was dried in vacuo at 80° C. for 3 hours. Polymerization results are shown in Table 22.

Physical properties of the obtained cis-1,4-polybutadienes are shown in Table 22.

TABLE 22

| | Gd catalyst | Polymerization solvent | Modifier | Polymerization temperature (° C.) | Productivity (g · $mmol^{-1}$-Cat · $h^{-1}$) | $ML_{1+4}$ (100° C.) | Cis (%) | Trans (%) | Vinyl (%) | Mn/$10^4$ | Mw/$10^4$ | Mw/Mn | Degree of modification |
|---|---|---|---|---|---|---|---|---|---|---|---|---|---|
| Example 109 | $Gd(dpm)_3$ | Cyclohexane | — | 40 | 18256 | 46 | 96.0 | 3.2 | 0.8 | 19.1 | 47.7 | 2.50 | 0.00 |
| Example 110 | $Gd(dpm)_3$ | Cyclohexane | — | 50 | 36436 | 53 | 95.9 | 3.2 | 0.8 | 19.9 | 56.6 | 2.85 | 0.00 |
| Example 111 | $Gd(dpm)_3$ | Toluene | EAB | 40 | 12825 | 45 | 98.8 | 0.6 | 0.5 | 23.8 | 56.5 | 2.38 | 0.28 |
| Example 112 | $Gd(dibm)_3$ | Toluene | EAB | 40 | 9394 | 46 | 99.2 | 0.3 | 0.5 | 24.7 | 58.5 | 2.37 | 0.24 |

Example 113

A first compounding, in which carbon black, zinc oxide, stearic acid, and an antioxidant were added to a cis-1,4-polybutadiene synthesized according to Example 109 in a compounding formulation shown in Table 23 in a plastomill, and the mixture was kneaded, was performed. Next, a second compounding of addition of a vulcanization accelerator and sulfur through a roller was performed to produce a compounded rubber. The compounded rubber was molded according to desired physical properties. Physical properties of a vulcanized product obtained by press-vulcanization at 150° C. were measured. Measurement results of various physical properties of the formulation are shown in Table 24.

Example 114

A first compounding, in which carbon black, zinc oxide, stearic acid, and an antioxidant were added to a cis-1,4-polybutadiene synthesized according to Example 110 in a compounding formulation shown in Table 23 in a plastomill, and the mixture was kneaded, was performed. Next, a second compounding of addition of a vulcanization accelerator and sulfur through a roller was performed to produce a compounded rubber. The compounded rubber was molded according to desired physical properties. Physical properties of a vulcanized product obtained by press-vulcanization at 150° C. were measured. Measurement results of various physical properties of the formulation are shown in Table 24.

Example 115

A first compounding, in which carbon black, zinc oxide, stearic acid, and an antioxidant were added to a cis-1,4-polybutadiene synthesized according to Example 111 in a compounding formulation shown in Table 23 in a plastomill, and the mixture was kneaded, was performed. Next, a second compounding of addition of a vulcanization accelerator and sulfur through a roller was performed to produce a compounded rubber.

The compounded rubber was molded according to desired physical properties. Physical properties of a vulcanized product obtained by press-vulcanization at 150° C. were measured. Measurement results of various physical properties of the formulation are shown in Table 24.

Example 116

A first compounding, in which carbon black, zinc oxide, stearic acid, and an antioxidant were added to a cis-1,4-polybutadiene synthesized according to Example 112 in a compounding formulation shown in Table 23 in a plastomill, and the mixture was kneaded, was performed. Next, a second compounding of addition of a vulcanization accelerator and sulfur through a roller was performed to produce a compounded rubber. The compounded rubber was molded according to desired physical properties. Physical properties of a vulcanized product obtained by press-vulcanization at 150° C. were measured. Measurement results of various physical properties of the formulation are shown in Table 24.

Comparative Example 13

A first compounding, in which carbon black, zinc oxide, stearic acid, and an antioxidant were added to UBEPOL-BR150L (a conjugated diene polymer obtained by a polymerization using a Co catalyst), manufactured by Ube Industries, Ltd., in a compounding formulation shown in Table 23 in a plastomill, and the mixture was kneaded, was performed. Next, a second compounding of addition of a vulcanization accelerator and sulfur through a roller was performed to produce a compounded rubber. The compounded rubber was molded according to desired physical properties. Physical properties of a vulcanized product obtained by press-vulcanization at 150° C. were measured. Measurement results of various physical properties of the formulation are shown in Table 24.

The compounding formulations are shown in Table 23.

TABLE 23

| | Example 113 | Example 114 | Example 115 | Example 116 | Comparative Example 13 |
|---|---|---|---|---|---|
| Example 109 | 50 | | | | |
| Example 110 | | 50 | | | |
| Example 111 | | | 50 | | |
| Example 112 | | | | 50 | |
| BR150L | | | | | 50 |
| NR | 50 | 50 | 50 | 50 | 50 |
| Carbon black | 50 | 50 | 50 | 50 | 50 |
| Aroma oil | 3 | 3 | 3 | 3 | 3 |
| Zinc oxide | 3 | 3 | 3 | 3 | 3 |
| Stearic acid | 2 | 2 | 2 | 2 | 2 |
| Antioxidant | 2 | 2 | 2 | 2 | 2 |
| Valcanization accelerator | 1 | 1 | 1 | 1 | 1 |
| Powdery sulfur | 1.5 | 1.5 | 1.5 | 1.5 | 1.5 |

Evaluation results of the obtained formulations are shown in Table 24.

TABLE 24

| | Comparative Example 13 | Example 113 | Example 114 | Example 115 | Example 116 |
|---|---|---|---|---|---|
| Tensile stress (50%) | 100 | 100 | 103 | 102 | 105 |
| Tensile stress (100%) | 100 | 103 | 105 | 103 | 104 |
| Tensile stress (300%) | 100 | 103 | 106 | 105 | 100 |
| Rebound Resilience | 100 | 103 | 105 | 105 | 103 |
| Elongation fatigue resistance | 100 | 108 | 110 | 125 | 132 |
| Lambourn abrasion (20% Slip) | 100 | 103 | 99 | 111 | 108 |
| Lambourn abrasion (40% Slip) | 100 | 104 | 101 | 102 | 100 |
| Low exothermic property | 100 | 107 | 108 | 110 | 108 |
| Permanent set | 100 | 117 | 129 | 122 | 122 |
| tanδ(60° C.) | 100 | 110 | 110 | 109 | 107 |

Numeric values in Table 24 are shown as an index relative to a value in each physical property in Comparative Example 13 (defined as 100) which is produced using UBEPOL-BR150L manufactured by Ube Industries, Ltd. The larger the numeric value, the better the property.

As shown in Table 24, compositions of Example 113 to Example 116 using the cis-1,4-polybutadienes obtained in Example 109 to Example 112 have more excellent tensile stress, rebound resilience, elongation fatigue resistance, abrasion resistance, low exothermic property, and low fuel consumption than the composition of Comparative Example 13.

Example 117

An inside of an autoclave with an inner capacity of 1.5 L was substituted by nitrogen, and a solution including 540 ml of a cyclohexane solvent and 550 ml of butadiene was filled therein. Subsequently, 3.4 ml of a cyclohexane solution (2 mol/L) of triethyl aluminum (TEAL) and 1.76 ml of a toluene solution (0.005 mol/L) of tris(2,2,6,6-tetramethyl-3,5-heptanedionato)gadolinium (Gd(dpm)$_3$), followed by 4.4 ml of a toluene solution (0.004 mol/L) of triphenylcarbenium tetrakis(pentafluorophenyl)borate were added. A polymerization was performed at 40° C. for 25 minutes. After 4 ml of an ethanol solution containing an antioxidant was added, the inside pressure of the autoclave was released, and then ethanol was poured into the polymerization solution to recover polybutadiene. Then, the recovered polybutadiene was dried in vacuo at 80° C. for 3 hours. Polymerization results are shown in Table 25.

Example 118

An inside of an autoclave with an inner capacity of 1.5 L was substituted by nitrogen, and a solution including 545 ml of a cyclohexane solvent and 550 ml of butadiene was filled therein. Subsequently, 2.75 ml of a cyclohexane solution (2 mol/L) of triethyl aluminum (TEAL) and 0.88 ml of a toluene solution (0.005 mol/L) of tris(2,2,6,6-tetramethyl-3,5-heptanedionato)gadolinium (Gd(dpm)$_3$), followed by 2.2 ml of a toluene solution (0.004 mol/L) of triphenylcarbenium tetrakis(pentafluorophenyl)borate were added. A polymerization was performed at 50° C. for 25 minutes. After 4 ml of an ethanol solution containing an antioxidant was added, the inside pressure of the autoclave was released, and then ethanol was poured into the polymerization solution to recover polybutadiene. Then, the recovered polybutadiene was dried in vacuo at 80° C. for 3 hours. Polymerization results are shown in Table 25.

Example 119

An inside of an autoclave with an inner capacity of 1.5 L was substituted by nitrogen, and a solution including 395 ml of a toluene solvent and 400 ml of butadiene was filled therein. Subsequently, 0.14 MPa hydrogen gas was introduced, and 1.2 ml of a toluene solution (2 mol/L) of triethyl aluminum (TEAL) was added thereto. Next, 2.25 ml of a toluene solution (0.005 mol/L) including tris(2,2,6,6-tetramethyl-3,5-heptanedionato)gadolinium (Gd(dpm)$_3$), followed by 0.06 ml of a toluene solution (0.43 mol/L) of triphenylcarbenium tetrakis(pentafluorophenyl)borate was added. After a polymerization was performed at 40° C. for 30 minutes, 0.23 ml of a modifier, a toluene solution (0.5 mol/L) of 4,4'-bis(diethyl amino)benzophenone (EAB), was added thereto, and a modification reaction was performed at the same temperature for 15 minutes. After 4 ml of an ethanol solution containing an antioxidant was added, the inside pressure of the autoclave was released, and then ethanol was poured into the polymerization solution to recover polybutadiene. Then, the recovered polybutadiene was dried in vacuo at 80° C. for 3 hours. Polymerization results are shown in Table 25.

Example 120

An inside of an autoclave with an inner capacity of 1.5 L was substituted by nitrogen, and a solution including 295 ml of a toluene solvent and 300 ml of butadiene was filled therein. Subsequently, 0.13 MPa of hydrogen gas was introduced, and 1.8 ml of a toluene solution (2 mol/L) of triethyl aluminum (TEAL) was added thereto. Next, 1.05 ml of a toluene solution (0.02 mol/L) of tris(2,6-dimethyl-3,5-heptanedionato)gadolinium (Gd(dibm)$_3$), followed by 0.1 ml of a toluene solution (0.043 mol/L) of triphenylcarbenium tetrakis(pentafluorophenyl)borate were added. After a polymerization was performed at 40° C. for 25 minutes, 0.42 ml of a modifier, a toluene solution (0.5 mol/L) of 4,4'-bis(diethyl amino)benzophenone (EAB), was added thereto, and a modification reaction was performed at the same temperature for 15 minutes. After 3 ml of an ethanol solution containing an antioxidant was added thereto, the inside pressure of the autoclave was released, and then ethanol was poured into the polymerization solution to recover polybutadiene. Then, the recovered polybutadiene was dried in vacuo at 80° C. for 3 hours. Polymerization results are shown in Table 25.

Example 121

An inside of an autoclave with an inner capacity of 1.5 L was substituted by nitrogen, and a solution including 545 ml of a cyclohexane solvent and 550 ml of butadiene was filled therein. Subsequently, 1.1 ml of a cyclohexane solution (2 mol/L) of triethyl aluminum (TEAL) and 0.44 ml of a toluene solution (0.02 mol/L) of tris(2,2,6,6-tetramethyl-3,5-heptanedionato)gadolinium (Gd(dpm)$_3$), followed by 0.33 ml of a cyclohexane solution (1.0 mol/L) of diisobutyl aluminum hydride (DIBAH) and 2.2 ml of a toluene solution (0.004 mol/L) of triphenylcarbenium tetrakis(pentafluorophenyl)borate were added. After a polymerization was performed at 40° C. for 25 minutes, 0.33 ml of a modifier, a toluene solution (0.5 mol/L) of 4,4'-bis(diethyl amino)benzophenone (EAB), was added thereto, and a modification reaction was performed at the same temperature for 15 minutes. After 4 ml of an ethanol solution containing an antioxidant was added, the inside pressure of the autoclave was released, and then ethanol was poured into the polymerization solution to recover polybutadiene. Then, the recovered polybutadiene was dried in vacuo at 80° C. for 3 hours. Polymerization results are shown in Table 25.

Physical properties of the obtained cis-1,4-polybutadienes are shown in table 25.

TABLE 25

| | Catalyst | Polymerization solvent | Modifier | Molecular weight adjusting agent | Polymerization temperature (° C.) | Productivity (g · mmol$^{-1}$-Cat · h$^{-1}$) | ML$_{1+4}$ (100° C.) | Cis (%) | Trans (%) | Vinyl (%) | Mn/ 10$^4$ | Mw/ 10$^4$ | Mw/ Mn | Degree of modification |
|---|---|---|---|---|---|---|---|---|---|---|---|---|---|---|
| Example 117 | Gd(dpm)$_3$ | Cyclohexane | — | TEAL | 40 | 18256 | 46 | 96.0 | 3.2 | 0.8 | 19.1 | 47.7 | 2.50 | 0.00 |
| Example 118 | Gd(dpm)$_3$ | Cyclohexane | — | TEAL | 50 | 36436 | 53 | 95.9 | 3.2 | 0.8 | 19.9 | 56.6 | 2.85 | 0.00 |
| Example 119 | Gd(dpm)$_3$ | Toluene | EAB | TEAL | 40 | 12825 | 45 | 98.8 | 0.6 | 0.5 | 23.8 | 56.5 | 2.38 | 0.28 |
| Example 120 | Gd(dibm)$_3$ | Toluene | EAB | TEAL | 40 | 9394 | 46 | 99.2 | 0.3 | 0.5 | 24.7 | 58.5 | 2.37 | 0.24 |
| Example 121 | Gd(dpm)$_3$ | Cyclohexane | EAB | DIBAH | 40 | 18011 | 50 | 96.9 | 2.5 | 0.6 | 22.0 | 50.7 | 2.31 | 0.43 |

Example 122

A first compounding, in which carbon black, zinc oxide, stearic acid, and an antioxidant were added to a cis-1,4-polybutadiene synthesized according to Example 117 in a compounding formulation shown in Table 26 in a plastomill, and the mixture was kneaded, was performed. Next, a second compounding of addition of a vulcanization accelerator and sulfur through a roller was performed to produce a compounded rubber. The compounded rubber was molded according to desired physical properties. Physical properties of a vulcanized product obtained by press-vulcanization at 150° C. were measured. Measurement results of various physical properties of the formulation were shown in Table 27.

Example 123

A first compounding, in which carbon black, zinc oxide, stearic acid, and an antioxidant were added to a cis-1,4-polybutadiene synthesized according to Example 118 in a compounding formulation shown in Table 26 in a plastomill, and the mixture was kneaded, was performed. Next, a second compounding of addition of a vulcanization accelerator and sulfur through a roller was performed to produce a compounded rubber. The compounded rubber was molded according to desired physical properties. Physical properties of a vulcanized product obtained by press-vulcanization at 150° C. were measured. Measurement results of various physical properties of the formulation were shown in Table 27.

Example 124

A first compounding, in which carbon black, zinc oxide, stearic acid, and an antioxidant were added to a cis-1,4-polybutadiene synthesized according to Example 119 in a compounding formulation shown in Table 26 in a plastomill, and the mixture was kneaded, was performed. Next, a second compounding of addition of a vulcanization accelerator and sulfur through a roller was performed to produce a compounded rubber.

The compounded rubber was molded according to desired physical properties. Physical properties of a vulcanized product obtained by press-vulcanization at 150° C. were measured. Measurement results of various physical properties of the formulation were shown in Table 27.

Example 125

A first compounding, in which carbon black, zinc oxide, stearic acid, and an antioxidant were added to a cis-1,4-polybutadiene synthesized according to Example 120 in a compounding formulation shown in Table 26 in a plastomill, and the mixture was kneaded, was performed. Next, a second compounding of addition of a vulcanization accelerator and sulfur through a roller was performed to produce a compounded rubber. The compounded rubber was molded according to desired physical properties. Physical properties of a vulcanized product obtained by press-vulcanization at 150° C. were measured. Measurement results of various physical properties of the formulation were shown in Table 27.

Example 126

A first compounding, in which carbon black, zinc oxide, stearic acid, and an antioxidant were added to a cis-1,4-polybutadiene synthesized according to Example 121 in a compounding formulation shown in Table 26 in a plastomill, and the mixture was kneaded, was performed. Next, a second compounding of addition of a vulcanization accelerator and sulfur through a roller was performed to produce a compounded rubber. The compounded rubber was molded according to desired physical properties. Physical properties of a vulcanized product obtained by press-vulcanization at 150° C. were measured. Measurement results of various physical properties of the formulation were shown in Table 27.

Comparative Example 14

A first compounding, in which carbon black, zinc oxide, stearic acid, and an antioxidant were added to UBEPOL-BR150L (a conjugated diene polymer obtained by a polymerization using a Co catalyst), manufactured by Ube Industries, Ltd., in a compounding formulation shown in Table 26 in a plastomill, and the mixture was kneaded, was performed. Next, a second compounding of addition of a vulcanization accelerator and sulfur through a roller was performed to produce a compounded rubber. The compounded rubber was molded according to desired physical properties. Physical properties of a vulcanized product obtained by press-vulcanization at 150° C. were measured. Measurement results of various physical properties of the formulation were shown in Table 27.

The compounding formulations are shown in Table 26.

TABLE 26

|  | Example 122 | Example 123 | Example 124 | Example 125 | Example 126 | Compatative Example 14 |
|---|---|---|---|---|---|---|
| Example 117 | 50 | | | | | |
| Example 118 | | 50 | | | | |
| Example 119 | | | 50 | | | |
| Example 120 | | | | 50 | | |
| Example 121 | | | | | 50 | |
| BR150L | | | | | | 50 |
| NR | 50 | 50 | 50 | 50 | 50 | 50 |
| Carbon black | 50 | 50 | 50 | 50 | 50 | 50 |
| Aroma Oil | 3 | 3 | 3 | 3 | 3 | 3 |
| Zinc oxide | 3 | 3 | 3 | 3 | 3 | 3 |
| Stearic acid | 2 | 2 | 2 | 2 | 2 | 2 |
| Antioxidant | 2 | 2 | 2 | 2 | 2 | 2 |
| Valcanization accelerator | 1 | 1 | 1 | 1 | 1 | 1 |
| Powdery sulfur | 1.5 | 1.5 | 1.5 | 1.5 | 1.5 | 1.5 |

Evaluation results of the obtained formulations are shown in Table 27.

TABLE 27

|  | Comparative Example 14 | Example 122 | Example 123 | Example 124 | Example 125 | Example 126 |
|---|---|---|---|---|---|---|
| Tensile stress (100%) | 100 | 103 | 105 | 103 | 104 | 104 |

TABLE 27-continued

| | Comparative Example 14 | Example 122 | Example 123 | Example 124 | Example 125 | Example 126 |
|---|---|---|---|---|---|---|
| Tensile stress (300%) | 100 | 103 | 106 | 105 | 100 | 109 |
| Rebound Resilience | 100 | 103 | 105 | 105 | 103 | 104 |
| Elongation fatigue resistance | 100 | 108 | 110 | 125 | 132 | 133 |
| Low exothermic property | 100 | 107 | 108 | 110 | 108 | 115 |
| Permanent set | 100 | 117 | 129 | 122 | 122 | 143 |
| tanδ (60° C.) | 100 | 110 | 110 | 109 | 107 | 108 |

Numeric values in Table 27 are shown as an index relative to a value in each physical property in Comparative Example 14 (defined as 100) which is produced using UBEPOL-BR150L manufactured by Ube Industries, Ltd. The larger the numeric value, the better the property.

As shown in Table 27, the compositions of Example 122 to Example 126 using the cis-1,4-polybutadienes obtained in Example 117 to Example 121 have more excellent tensile stress, rebound resilience, elongation fatigue resistance, low exothermic property, and low fuel consumption than the composition of Comparative Example 14.

The invention claimed is:

1. A method for producing a conjugated diene polymer comprising:
   polymerizing a conjugated diene compound using a catalyst for a conjugated diene polymerization including a non-metallocene type gadolinium compound (A) represented by the following general formula (1), an ionic compound (B) formed of a non-coordinating anion and a cation, and an organic metal compound (C) of an element selected from the group consisting of a group 2, a group 12, and a group 13 of the periodic table to obtain a conjugated diene polymer,

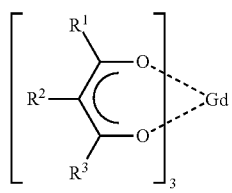

(1)

wherein $R^1$, $R^2$, and $R^3$ each shows a hydrogen or a substituent having 1 to 12 carbon atoms, O shows an oxygen atom, and Gd shows a gadolinium atom.

2. The method for producing a conjugated diene polymer according to claim 1, wherein the organic metal compound (C) is an organic aluminum compound.

3. The method for producing a conjugated diene polymer according to claim 1, wherein the ionic compound (B) is a boron-containing compound.

4. The method for producing a conjugated diene polymer according to claim 1, wherein the molecular weight is adjusted with a compound selected from the group consisting of (1) a hydrogen, (2) a metal hydride compound, and (3) a hydrogenated organic metal compound in the polymerization of the conjugated diene compound.

5. A method for producing a modified conjugated diene polymer comprising:
   polymerizing a conjugated diene compound using a catalyst for a conjugated diene polymerization including a non-metallocene type gadolinium compound (A) represented by the following general formula (1), an ionic compound (B) formed of a non-coordinating anion and a cation, and an organic metal compound (C) of an element selected from the group consisting of a group 2, a group 12, and a group 13 of the periodic table to obtain a conjugated diene polymer; and
   modifying the conjugated diene polymer with at least one compound selected from the group consisting of amino group-containing carbonyl compounds, halogenated benzyl compounds, and aldehyde compounds to obtain a modified conjugated diene polymer,

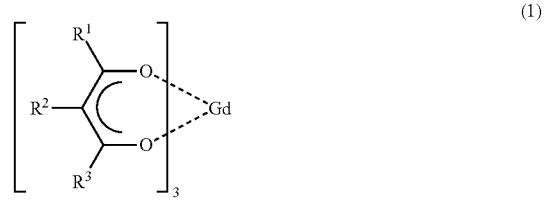

(1)

wherein $R^1$, $R^2$, and $R^3$ each shows a hydrogen or a substituent having 1 to 12 carbon atoms, O shows an oxygen atom, and Gd shows a gadolinium atom.

6. The method for producing a modified conjugated diene polymer according to claim 5, wherein the amino group-containing carbonyl compound is a 4,4'-bis-dialkylaminobenzophenone.

7. The method for producing a modified conjugated diene polymer according to claim 5, wherein the halogenated benzyl compound is a piperonyl chloride, a dimethoxybenzyl bromide, or a methoxybenzyl chloride.

8. The method for producing a modified conjugated diene polymer according to claim 5, wherein the aldehyde compound is a heliotropin or a veratrum aldehyde.

9. A method for producing a vinyl·cis-polybutadiene comprising performing a cis-1,4 polymerization of a 1,3-butadiene, and performing a subsequent syndiotactic-1,2 polymerization in the resulting polymerization system,
   wherein a catalyst for a conjugated diene polymerization including a non-metallocene type gadolinium compound (A) represented by the following general formula (1), an ionic compound (B) formed of a non-coordinating anion and a cation, and an organic metal compound (C) of an element selected from the group consisting of a group 2, a group 12, and a group 13 of the periodic table is used as a catalyst in the cis-1,4 polymerization, and a catalyst system containing a sulfur compound is used as a catalyst in the syndiotactic-1,2 polymerization,

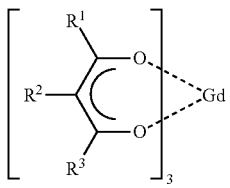

(1)

wherein $R^1$, $R^2$, and $R^3$ each shows a hydrogen or a substituent having 1 to 12 carbon atoms, O shows an oxygen atom, and Gd shows a gadolinium atom.

10. The method for producing a vinyl•cis-polybutadiene according to claim 9, wherein the organic metal compound (C) is an organic aluminum compound.

11. The method for producing a vinyl•cis-polybutadiene according to claim 9, wherein the ionic compound (B) is a boron-containing compound.

12. The method for producing a vinyl•cis-polybutadiene according to claim 9, wherein a catalyst system including a cobalt compound, a trialkyl aluminum compound, and a sulfur compound is used as the catalyst in the syndiotactic-1,2 polymerization.

13. A method for producing a conjugated diene polymer composition comprising:

polymerizing a conjugated diene compound using a catalyst for a conjugated diene polymerization including a non-metallocene type gadolinium compound (A) represented by the following general formula (1), an ionic compound (B) formed of a non-coordinating anion and a cation, and an organic metal compound (C) of an element selected from the group consisting of a group 2, a group 12, and a group 13 of the periodic table to obtain a conjugated diene polyme (α);

adding a diene polymer (β) other than the (α) and a rubber-reinforcing agent to the (α) to form a mixture; and kneading the mixture to form a conjugated diene polymer composition,

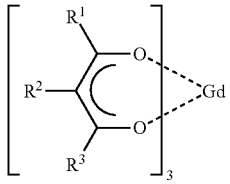

(1)

wherein $R^1$, $R^2$, and $R^3$ each shows a hydrogen or a substituent having 1 to 12 carbon atoms, O shows an oxygen atom, and Gd shows a gadolinium atom.

14. The method for producing a conjugated diene polymer composition according to claim 13, wherein the organic metal compound (C) is an organic aluminum compound.

15. The method for producing a conjugated diene polymer composition according to claim 13, wherein the ionic compound (B) is a boron-containing compound.

16. A method for producing a modified conjugated diene polymer composition comprising:

polymerizing a conjugated diene compound using a catalyst for a conjugated diene polymerization including a non-metallocene type gadolinium compound (A) represented by the following general formula (1), an ionic compound (B) formed of a non-coordinating anion and a cation, and an organic metal compound (C) of an element selected from the group consisting of a group 2, a group 12, and a group 13 of the periodic table to obtain a conjugated diene polymer;

modifying the conjugated diene polymer with at least one compound selected from the group consisting of amino group-containing carbonyl compounds, halogenated benzyl compounds, and aldehyde compounds to obtain a modified conjugated diene polymer (α');

adding a diene polymer (β) other than the (α') and a rubber-reinforcing agent to the (α') to form a mixture; and kneading the mixture to form a modified conjugated diene polymer composition,

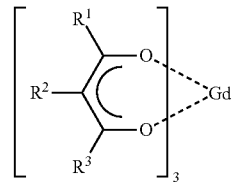

(1)

wherein $R^1$, $R^2$, and $R^3$ each shows a hydrogen or a substituent having 1 to 12 carbon atoms, O shows an oxygen atom, and Gd shows a gadolinium atom.

17. The method for producing a modified conjugated diene polymer composition according to claim 16, wherein the amino group-containing carbonyl compound is a 4,4'-bis-dialkylaminobenzophenone.

18. The method for producing a modified conjugated diene polymer composition according to claim 16, wherein the halogenated benzyl compound is a piperonyl chloride, a dimethoxybenzyl bromide, or a methoxybenzyl chloride.

19. The method for producing a modified conjugated diene polymer composition according to claim 16, wherein the aldehyde compound is a heliotropin or a veratrum aldehyde.

20. The method for producing a modified conjugated diene polymer composition according to claim 16, wherein the molecular weight is adjusted with a compound selected from the group consisting of (1) a hydrogen, (2) a metal hydride compound, and (3) a hydrogenated organic metal compound in the polymerization of the conjugated diene compound.

21. A method for producing a vinyl•cis-polybutadiene composition comprising:

performing a cis-1,4 polymerization of a 1,3-butadiene;

performing a subsequent syndiotactic-1,2 polymerization in the resulting polymerization system to obtain a vinyl•cis-polybutadiene;

adding a diene polymer other than the vinyl•cis-polybutadiene and a rubber-reinforcing agent to the (α') to form a mixture; and kneading the mixture to form a vinyl•cis-polybutadiene composition, wherein a catalyst for a conjugated diene polymerization including a non-metallocene type gadolinium compound (A) represented by the following general formula (1), an ionic compound (B) formed of a non-coordinating anion and a cation, and an organic metal compound (C) of an element selected from the group consisting of a group 2, a group 12, and a group 13 of the periodic table is used as a catalyst in the cis-1,4 polymerization, and a catalyst system containing a sulfur compound is used as a catalyst in the syndiotactic-1,2 polymerization,

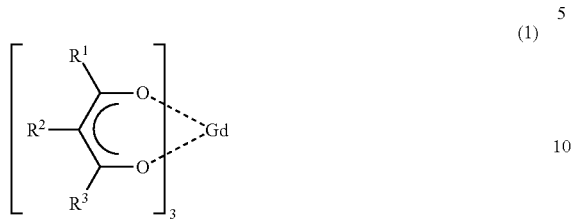
(1)

wherein $R^1$, $R^2$, and $R^3$ each shows a hydrogen or a substituent having 1 to 12 carbon atoms, O shows an oxygen atom, and Gd shows a gadolinium atom.

22. The method for producing a vinyl•cis-polybutadiene composition according to claim 21, wherein the organic metal compound (C) is an organic aluminum compound.

23. The method for producing a vinyl•cis-polybutadiene composition according to claim 21, wherein the ionic compound (B) is a boron-containing compound.

24. The method for producing a vinyl•cis-polybutadiene composition according to 21, wherein a catalyst system including a cobalt compound, a trialkyl aluminum compound, and a sulfur compound is used as the catalyst in the syndiotactic-1,2 polymerization.

* * * * *

UNITED STATES PATENT AND TRADEMARK OFFICE
CERTIFICATE OF CORRECTION

PATENT NO. : 10,633,470 B2
APPLICATION NO. : 16/403880
DATED : April 28, 2020
INVENTOR(S) : Koji Shiba et al.

Page 1 of 1

It is certified that error appears in the above-identified patent and that said Letters Patent is hereby corrected as shown below:

On the Title Page

Item (54) and In the Specification, Column 1, Line 4, Title, between 'VINYL' and 'CIS-' insert -- · --

In the Claims

Column 83, Line 41, Claim 13, delete "polyme" and insert -- polymer --

Column 85, Line 24, Claim 24, after "to" insert -- claim --

Signed and Sealed this
Nineteenth Day of January, 2021

Andrei Iancu
*Director of the United States Patent and Trademark Office*